(12) United States Patent
Mak

(10) Patent No.: US 11,645,034 B2
(45) Date of Patent: May 9, 2023

(54) MATCHING CONTENT TO A SPATIAL 3D ENVIRONMENT

(71) Applicant: Magic Leap, Inc., Plantation, FL (US)

(72) Inventor: Genevieve Mak, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/324,828

(22) Filed: May 19, 2021

(65) Prior Publication Data

US 2021/0272537 A1 Sep. 2, 2021

Related U.S. Application Data

(63) Continuation of application No. 16/431,033, filed on Jun. 4, 2019, now Pat. No. 11,043,193.

(60) Provisional application No. 62/688,936, filed on Jun. 22, 2018, provisional application No. 62/681,043, filed on Jun. 5, 2018.

(51) Int. Cl.
| | | |
|---|---|---|
| *G06F 3/147* | (2006.01) | |
| *G06T 7/70* | (2017.01) | |
| *G06T 19/00* | (2011.01) | |
| *G09G 5/38* | (2006.01) | |
| *G09G 5/373* | (2006.01) | |
| *G09G 5/14* | (2006.01) | |

(52) U.S. Cl.
CPC ............... *G09G 5/38* (2013.01); *G06F 3/147* (2013.01); *G06T 7/70* (2017.01); *G09G 5/14* (2013.01); *G09G 5/373* (2013.01); *G06T 19/006* (2013.01); *G09G 2340/0464* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 10,306,292 B2* | 5/2019 | Drouin | ............ H04N 21/43072 |
| 2012/0188148 A1 | 7/2012 | Dejong | |
| 2014/0225924 A1 | 8/2014 | Loxam et al. | |
| 2014/0368535 A1 | 12/2014 | Salter et al. | |
| 2014/0372957 A1 | 12/2014 | Keane et al. | |
| 2014/0375683 A1 | 12/2014 | Salter et al. | |
| 2015/0062163 A1 | 3/2015 | Lee et al. | |

(Continued)

FOREIGN PATENT DOCUMENTS

| | | |
|---|---|---|
| CN | 106255943 | 12/2016 |
| WO | WO 2015/192117 | 12/2015 |
| WO | WO 2015192117 | 12/2015 |

OTHER PUBLICATIONS

Non-Final Office Action for U.S. Appl. No. 16/431,033 dated May 15, 2020.
Final Office Action for U.S. Appl. No. 16/431,033 dated Dec. 1, 2020.
Amendment Response to NFOA for U.S. Appl. No. 16/431,033 dated Aug. 17, 2020.

(Continued)

*Primary Examiner* — Jeffrey J Chow
(74) *Attorney, Agent, or Firm* — Vista IP Law Group, LLP

(57) ABSTRACT

Systems and methods for adjusting display of virtual content when a wearable display device detects a trigger event to change display of content that is relative to a physical or virtual surface. The method includes displaying content relative to a first surface, detecting a trigger that is one of motion or content driven; and adjusting display of the content to a user-centric virtual surface in the user's field of view.

20 Claims, 48 Drawing Sheets

(56) References Cited

U.S. PATENT DOCUMENTS

| | | | |
|---|---|---|---|
| 2015/0235447 A1* | 8/2015 | Abovitz | G01B 11/303 |
| | | | 345/633 |
| 2015/0277699 A1* | 10/2015 | Algreatly | G02B 27/017 |
| | | | 715/850 |
| 2015/0317831 A1 | 11/2015 | Ebstyne et al. | |
| 2015/0317832 A1 | 11/2015 | Ebstyne et al. | |
| 2016/0259977 A1 | 9/2016 | Asbun et al. | |
| 2016/0337289 A1 | 11/2016 | Duca et al. | |
| 2016/0379418 A1 | 12/2016 | Osborn et al. | |
| 2017/0061691 A1* | 3/2017 | Scott | G06T 7/50 |
| 2017/0103583 A1 | 4/2017 | Poulos et al. | |
| 2017/0109936 A1 | 4/2017 | Powderly et al. | |
| 2018/0045963 A1 | 2/2018 | Hoover et al. | |
| 2018/0095276 A1 | 4/2018 | Ng-Thow-Hing | |
| 2018/0315248 A1 | 11/2018 | Bastov et al. | |
| 2019/0188895 A1* | 6/2019 | Miller, IV | G06F 3/0304 |
| 2019/0313059 A1* | 10/2019 | Agarawala | G06T 13/40 |
| 2021/0074068 A1* | 3/2021 | Spivack | G10L 15/22 |

OTHER PUBLICATIONS

Amendment Response to FOA for U.S. Appl. No. 16/431,033 dated Feb. 19, 2021.

Notice of Allowance for U.S. Appl. No. 16/431,033 dated Feb. 19, 2021.

Zollman, S., et al., "FlyAR: Augmented Reality Supported Micro Aerial Vehicle Navigation", ResearchGate, dated Apr. 2014 (10 pages).

PCT International Search Report and Written Opinion for International Patent Appln. No. PCT/US2019/035375, Applicant Magic Leap, Inc., dated Aug. 26, 2019 (12 pages).

Foreign OA for CN Patent Appln. No. 201980037197.7 dated Oct. 15, 2021 with English translation.

Foreign OA for CN Patent Appln. No. 201980037197.7 dated Apr. 24, 2022 with English translation.

Extended European Search Report for EP Patent Appln. No. 19814854.6 dated Jul. 7, 2021.

Foreign Response for EP Patent Appln. No. 19814854.6 dated Feb. 3, 2022.

* cited by examiner

| Content Element Priority Attribute | Element A | Element B | Element C |
|---|---|---|---|
| Dot Product Surface Relationship | 1 | 0.5 | 0.5 |
| Texture | 0.5 | 1 | 0.5 |
| Color | 0.5 | 0 | 1 |

| Surface Priority Attribute | Surface A | Surface B | Surface C |
|---|---|---|---|
| Dot Product Surface Relationship | 1 | 0 | 0.5 |
| Texture | 0 | 1 | 0.5 |
| Color | 0 | 0 | 0.5 |

Simple Summation:
Element A to Surface A: (1x1)+(0.5x0)+(0.5x0)=1
Element A to Surface B= (1x0)+(0.5x1)+(0.5x0)=0.5
Element A to Surface C= (1x0.5)+(0.5x0.5)+(0.5x0.5)=1
Element B to Surface A: = (0.5x1)+(1x0)+(0x0)=0.5
Element B to Surface B= (0.5x0)+(1x1)+(0x0)=1
Element B to Surface C= (0.5x0.5)+(1x0.5)+(0x0.5)=0.75
Element C to Surface A: (0.5x1)+(0.5x0)+(1x0)=0.5
Element C to Surface B= (0.5x0)+(0.5x1)+(1x0)=0.5
Element C to Surface C= (0.5x0.5)+(0.5x0.5)+(1x0.5)=1

| Element ID | Preference Attribute | Parent Element ID | Child Element ID | Multiple Entity |
|---|---|---|---|---|
| 1220 | Main | 1260 | 1230 | N |
| 1230 | Horizontal | 1220 | | Y |
| 1240 | Vertical | | | Y |
| 1250 | Secondary Tab | | | Y |
| 1260 | Main Tab | | 1220 | N |
| * * * | | | | |

FIG. 14A

| Surface ID | W | H | Orientation | Real/ Virtual | Multiple | Position (center of surface) | Dot Protect orientation | ... |
|---|---|---|---|---|---|---|---|---|
| 1182 | 48 | 36 | Vertical | R | Single | $(2.5, 2.3, 1.2)_{user}$ | -1 | |
| 1192 | 24 | 24 | Horizontal | R | Single | $(x, y, z)_{user}$ | 0 | |
| 1186 | 24 | 36 | Vertical | R | Single | $(1.3, 2.3, 1.3)_{world}$ | -0.2 | |
| 1190 | 12 | 12 | Vertical | V | Multiple | $(x, y, z)_{1182}$ | -0.2 | |
| 1194 | 16 | 16 | Horizontal | V | Multiple | $(x, y, z)_{frame}$ | -0.5 | |
| * * * | | | | | | | | |

| Element ID | Surface ID | * * * |
|---|---|---|
| 1220 | 1182 | |
| 1230 | 1192 | |
| 1240 | 1186 | |
| 1250 | 1190 | |
| * * * | | |

FIG. 18

MATCHING CONTENT TO A SPATIAL 3D ENVIRONMENT

CROSS REFERENCE TO RELATED APPLICATIONS

The present disclosure is a continuation of U.S. patent application Ser. No. 16/431,033, filed on Jun. 4, 2019 and entitled "MATCHING CONTENT TO A SPATIAL 3D ENVIRONMENT", which further claims the benefit of priority to U.S. Prov. Pat. App. Ser. No. 62/681,043, filed on Jun. 5, 2018, entitled "MATCHING CONTENT TO A SPATIAL 3D ENVIRONMENT", and U.S. Prov. Pat. App. Ser. No. 62/688,936, filed on Jun. 22, 2018, entitled "MATCHING CONTENT TO A SPATIAL 3D ENVIRONMENT", each of which are hereby incorporated by reference in their entirety. The present disclosure is related to co-owned U.S. Pat. No. 9,671,566, issued on Jun. 6, 2017, entitled, "PLANAR WAVEGUIDE APPARATUS WITH DIFFRACTION ELEMENT(S) AND SYSTEM EMPLOYING SAME," U.S. Pat. No. 9,761,055, issued on Sep. 12, 2017 entitled, "USING OBJECT RECOGNIZERS IN AN AUGMENTED OR VIRTUAL REALITY SYSTEM," U.S. patent application Ser. No. 15/597,694, claiming priority to Jun. 30, 2016, entitled, "ESTIMATING POSE IN 3D SPACE," U.S. patent application Ser. No. 15/725,801, claiming priority to Oct. 5, 2016, entitled, "SURFACE MODELING SYSTEMS AND METHODS," U.S. Prov. Pat. App. Ser. No. 62/599,620, filed on Dec. 15, 2017, entitled, "ENHANCED POSE DETERMINATION FOR DISPLAY DEVICE," and U.S. patent application Ser. No. 15/968,673, claiming priority to May 1, 2017, entitled, "MATCHING CONTENT TO A SPATIAL 3D ENVIRONMENT." The contents of the aforementioned U.S. patents, U.S. patent applications, and U.S. provisional patent applications are hereby explicitly and fully incorporated by reference in their entireties for all purposes, as though set forth in the present disclosure in full.

FIELD OF THE DISCLOSURE

The disclosure relates to systems and methods for displaying content in a spatial 3D environment.

BACKGROUND

A typical way to view content is to open an application that will display the content on a display screen (e.g., a monitor of a computer, smartphone, tablet, etc.) of a display device. A user would navigate the application to view the content. Normally, when the user is looking at the display screen of the display, there is a fixed format as to how the content is displayed within the application and on the display screen of the display device.

With virtual reality (VR), augmented reality (AR), and/or mixed reality (MR) systems (hereinafter collectively referred to as "mixed reality" systems), an application will display content in a spatial three-dimensional (3D) environment. Conventional approaches to display content on a display screen do not work very well when used in a spatial 3D environment. One reason is because, with conventional approaches, a display area of a display device is a 2D medium limited to a screen area of a display screen that the content is displayed on. As a result, conventional approaches are configured to only know how to organize and display the content within that screen area of the display screen. In contrast, the spatial 3D environment is not limited to the strict confines of the screen area of the display screen. Therefore, conventional approaches may perform sub-optimally when used in the spatial 3D environment since conventional approaches do not necessarily have the functionality or capability to take advantage of the spatial 3D environment for displaying the content.

Therefore, there is a need for an improved approach to display content in a spatial 3D environment.

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represent different approaches, which in and of themselves may also be disclosures.

SUMMARY

Embodiments of the disclosure provide an improved system and methods to display information in a spatially organized 3D environment. The method includes displaying virtual content in one of a world-centric mode and a user-centric mode, detecting a trigger to adjust display of the virtual content, and displaying virtual content in the other of the world-centric mode and the user-centric mode. Additional embodiments of present disclosure provide an improved system and methods to change a position of a displayed virtual object in response to a change in a pose of a user.

In one embodiment, a method includes displaying a virtual content to a user using a wearable display device in a world-centric mode. The method also includes detecting a trigger to adjust display of the virtual content. The method further includes displaying the virtual content to the user using the wearable display device in a user-centric mode in response to detecting the trigger.

In one or more embodiments, the trigger includes movement of a field of view of the user. The movement of the field of view may include movement of the field of view such that no suitable surfaces for display of the virtual content are within the field of view. The movement of the field of view may include a translation or rotation of the field of view. The movement of the field of view may include a translation or rotation of the field of view in excess of a threshold. The threshold may be a predetermined amount of translation or rotation of the field of view in a predetermined amount of time. The threshold may be a predetermined amount of continuous translation or rotation of the field of view for a predetermined amount of time. The threshold may be an occurrence of a predetermined number of translational or rotational maxima of the field of view in a predetermined amount of time.

In one or more embodiments, the trigger includes user selection of an interface object. The trigger may include detection of a type of the virtual content. Detection of the type of the virtual content may include detection of display or imminent display of the virtual content of the type. The method may also include changing a size of the virtual content between displaying the virtual content to the user using the wearable display device in the world-centric mode and the user-centric mode. The size of the virtual content after the change may be related to an extent of a field of view of the user. Displaying the virtual content to the user using the wearable display device in the user-centric mode may include displaying the virtual content adjacent a center or off center in a field of view of the user.

In another embodiment, a method includes displaying a virtual content to a user using a wearable display device in a user-centric mode. The method also includes detecting a trigger to adjust display of the virtual content. The method further includes displaying the virtual content to the user using the wearable display device in a world-centric mode in response to detecting the trigger.

In one or more embodiments, the trigger includes detection of a continuous presence of a surface in a field of view of the user for a predetermined amount of time. The trigger may include user selection of an interface object. The trigger may include detection of a type of the virtual content. Detection of the type of the virtual content may include detection of display or imminent display of the virtual content of the type. The method may also include changing a size of the virtual content between displaying the virtual content to the user using the wearable display device in the user-centric mode and the world-centric mode.

In still another embodiment, a method includes displaying a virtual content to a user using a wearable display device at a first position in a first field of view of the user. The method also includes detecting a change in a pose of the user resulting in a second field of view. The method further includes displaying the virtual content to the user using the wearable display device at a second position in the second field of view of the user in response to detecting the change in the pose of the user.

In one or more embodiments, the first position corresponds to a first surface in the first field of view and the second position corresponds to a second surface in the second field of view. The method may also include displaying an animation of the virtual content moving from the first position to the second position. The animation may move the virtual content from the first position to the second position at an animation speed equal to a percentage of a speed of the change in the pose of the user. The animation speed may be selected from the group consisting of 90%, 70%, 50%, and 10%. The animation speed may be determined based on the speed of the change in the pose of the user. The animation speed may be a first value when the speed of the change in the pose of the user is at or below a threshold, and a second value when the speed of the change in the pose of the user is above the threshold. The speed of the change in the pose of the user may be the speed of a rotational change.

In one or more embodiments, the animation includes changing an orientation of the virtual object such that it appears to tilt out of a plane orthogonal to an optical axis of the user. Changing the orientation of the virtual object may include first tilting a leading edge of the virtual object away from the user, then tilting a trailing edge of the virtual object away from the user. The first position relative to the first field of view may be substantially similar to the second position relative to the second field of view. The first position relative to the first field of view may be different from the second position relative to the second field of view.

In yet another embodiment, a method includes displaying a content to a wearable user display device relative to a first surface. The method also includes detecting a trigger to adjust display of the content to the user wearable display device. The method further includes adjusting display of the content to a user-centric virtual surface.

In one or more embodiments, detecting the trigger includes detecting motion of the wearable display device. Detecting motion may include detecting one of a translation or rotation within a threshold duration. Detecting a trigger may include receiving a notification from the content. Adjusting display of the content may include adjusting at least one attribute of the content to a parameter of the wearable display device. Adjusting the display of content may include positioning the user-centric virtual surface to a fixed position within a field of view of the wearable display device.

In one embodiment, a method includes receiving content. The method also includes identifying one or more elements in the content. The method further includes determining one or more surfaces. Moreover, the method includes matching the one or more elements to the one or more surfaces. Additionally, the method includes displaying the one or more elements as virtual content onto the one or more surfaces.

In one or more embodiments, the content comprises at least one of a pulled content or pushed content. Identifying the one or more elements may include determining one or more attributes for each of the one or more elements. The one or more attributes include at least one of a priority attribute, an orientation attribute, an aspect ratio attribute, a dimension attribute, an area attribute, a relative viewing position attribute, a color attribute, a contrast attribute, a position type attribute, a margin attribute, a type of content attribute, a focus attribute, a readability index attribute, or a type of surface to place attribute. Determining the one or more attributes for each of the one or more elements is based on explicit indications in the content.

In one or more embodiments, determining the one or more attributes for each of the one or more elements is based on placement of the one or more elements within the content. The method further includes storing the one or more elements into one or more logical structures. The one or more logical structures comprise at least one of an ordered array, a hierarchical table, a tree structure, or a logical graph structure. The one or more surfaces comprise at least one of physical surfaces or virtual surfaces. Determining the one or more surfaces comprises parsing an environment to determine at least one of the one or more surfaces.

In one or more embodiments, determining the one or more surfaces includes receiving raw sensor data, simplifying the raw sensor data to produce simplified data, and creating one or more virtual surfaces based on the simplified data. The one or more surfaces comprise the one or more virtual surfaces. Simplifying the raw sensor data includes filtering the raw sensor data to produce filtered data, and grouping the filtered data into one or more groups by point cloud points. The simplified data includes the one or more groups. Creating the one or more virtual surfaces includes iterating through each of the one or more groups to determine one or more real world surfaces, and creating the one or more virtual surfaces based on the one or more real world surfaces.

In one or more embodiments, determining the one or more surfaces comprises determining one or more attributes for each of the one or more surfaces. The one or more attributes include at least one of a priority attribute, an orientation attribute, an aspect ratio attribute, a dimension attribute, an area attribute, a relative viewing position attribute, a color attribute, a contrast attribute, a position type attribute, a margin attribute, a type of content attribute, a focus attribute, a readability index attribute, or a type of surface to place attribute. The method also includes storing the one or more surfaces into one or more logical structures. Matching the one or more elements to the one or more surfaces includes prioritizing the one or more elements, for each element of the one or more elements, comparing one or more attributes of the element to one or more attributes of each of the one or more surfaces, calculating a match score based on the one or more attributes of the element and the one or more attributes of each of the one or more surfaces, and identifying a best matching surface having a highest match score. Additionally, for each of the one or more elements, storing an association between the element and the best matching surface.

In one or more embodiments, one element is matched to one or more surfaces. Furthermore, displaying each surface of the one or more surfaces to a user. In addition, receiving a user selection indicating a winning surface from the one or more surfaces displayed. Yet even furthermore, saving, from the user selection, surface attributes of the winning surface in a user preferences data structure. The content is data streamed from a content provider. The one or more elements are displayed to a user through a mixed reality device.

In one or more embodiments, the method further includes displaying one or more additional surface options for displaying the one or more elements based at least in part on a changed field of view of a user. The displaying of the one or more additional surface options is based at least in part on a time threshold corresponding to the changed field of view. the displaying of the one or more additional surface options is based at least in part on a headpose change threshold.

In one or more embodiments, the method also includes overriding displaying the one or more elements onto the one or more surfaces that were matched. Overriding the displaying of the one or more elements onto the one or more surfaces is based at least in part on historically frequently used surfaces. The method even further includes moving the one or more elements displayed on the one or more surfaces to a different surface based at least in part on a user selecting a particular element displayed at the one or more surfaces to be moved to the different surface. The particular element is moved to the different surface is at least viewable by the user.

In one or more embodiments, the method additionally includes in response to a change to a field of view of a user from a first field of view to a second field of view, lazily moving the displaying of the one or more elements onto new surfaces to follow the change of the user's field of view to the second field of view. The one or more elements may only move directly in front of the user's second field of view upon confirmation from received from the user to move the content directly in front of the user's second field of view. The method includes pausing displaying of the one or more elements onto the one or more surfaces at a first location and resuming displaying of the one or more elements onto one or more other surfaces at a second location is based at least in part on a user moving from the first location to the second location. The pausing of the displaying of the one or more elements is automatic based at least in part on a determination that the user is moving or has moved from the first location to the second location. the resuming of the displaying of the one or more elements is automatic based at least in part on an identification and matching of the one or more other surfaces to the one or more elements at the second location.

In one or more embodiments, determining the one or more surfaces comprises identifying one or more virtual objects for displaying the one or more elements. Identifying the one or more virtual objects is based at least in part on data received from one or more sensors indicating a lack of suitable surfaces. An element of the one or more elements is a TV channel. A user interacts with an element of the one or more elements displayed by making a purchase of one or more items or services displayed to the user.

In one or more embodiments, the method also includes detecting a change of environment from a first location to a second location, determining one or more additional surfaces at the second location, matching the one or more elements currently being displayed at the first location to the one or more additional surfaces, and displaying the one or more elements as virtual content onto the one or more additional surfaces at the second location. Determination of the one or more additional surfaces is initiated after the change of environment exceeds a temporal threshold. A user pauses active content displayed at the first location and resumes the active content to be displayed at the second location, the active content resuming at a same interaction point as where the user paused the active content at the first location.

In one or more embodiments, the method also includes transitioning spatialized audio delivered to a user from a location associated with displayed content at the first location to audio virtual speakers directed to a center of a head of the user as the user leaves the first location, and transitioning from the audio virtual speakers directed to the center of the head of the user to spatialized audio delivered to the user from the one or more additional surfaces displaying the one or more elements at the second location.

In another embodiment, a method for pushing content to a user of a mixed reality system includes receiving one or more available surfaces from an environment of a user. The method also includes identifying one or more contents that match a dimension of one available surface from the one or more available surfaces. The method further includes calculating a score based on comparing one or more constraints of the one or more contents to one or more surface constraints of the one available surface. Moreover, the method includes selecting a content from the one or more contents having the highest score. Yet furthermore, the method includes storing a one-to-one matching of the content selected to the one available surface. Furthermore, displaying on the available surface, to the user, the content selected.

In one or more embodiments, an environment of a user is a personal residence of the user. The one or more available surfaces from the environment of the user is peripheral to a focal view area of the user. The one or more contents are advertisements. The advertisements are targeted to a specific group of users located at a particular environment. The one or more contents are notifications from an application. The application is a social media application. One of the constraints of the one or more constraints of the one or more contents is an orientation. The content selected is a 3D content.

In another embodiment, an augmented reality (AR) display system includes a head-mounted system that includes one or more sensors, and one or more cameras comprising outward facing cameras. The system also includes a processor to execute a set of program code instructions. Moreover, the system includes a memory to hold the set of program code instructions, in which the set of program code instructions comprises program code to perform receiving content. The program code also performs identifying one or more elements in the content. Furthermore, the program code also performs determining one or more surfaces. In addition, the program code also performs matching the one or more elements to the one or more surfaces. Yet even further, the program code also performs displaying the one or more elements as virtual content onto the one or more surfaces.

In one or more embodiments, the content comprises at least one of a pulled content or pushed content. Identifying the one or more elements comprises parsing the content to identify the one or more elements. Identifying the one or more elements comprises determining one or more attributes for each of the one or more elements. In addition, the program code also performs storing the one or more elements into one or more logical structures. The one or more surfaces comprise at least one of physical surfaces or virtual surfaces. Determining the one or more surfaces comprises parsing an environment to determine at least one of the one or more surfaces.

In one or more embodiments, determining the one or more surfaces includes receiving raw sensor data, simplifying the raw sensor data to produce simplified data, and creating one or more virtual surfaces based on the simplified data, wherein the one or more surfaces comprise the one or more virtual surfaces. Determining the one or more surfaces comprises determining one or more attributes for each of the one or more surfaces. In addition, the program code also performs storing the one or more surfaces into one or more logical structures.

In one or more embodiments, matching the one or more elements to the one or more surfaces includes prioritizing the one or more elements, for each element of the one or more elements: comparing one or more attributes of the element to one or more attributes of each of the one or more surfaces, calculating a match score based on the one or more attributes of the element and the one or more attributes of each of the one or more surfaces, and identifying a best matching surface having a highest match score. One element is matched to one or more surfaces. The content is data streamed from a content provider.

In one or more embodiments, the program code also performs displaying one or more surface options for displaying the one or more elements based at least in part on a changed field of view of the user. The program code also performs overriding displaying the one or more elements onto the one or more surfaces that were matched. The program code also performs moving the one or more elements displayed on the one or more surfaces to a different surface based at least in part on a user selecting a particular element displayed at the one or more surfaces to be moved to the different surface. The program code also performs in response to a change to a field of view of a user from a first field of view to a second field of view, lazily moving the displaying of the one or more elements onto new surfaces to follow the change of the user's field of view to the second field of view.

In one or more embodiments, the program code also performs pausing displaying of the one or more elements onto the one or more surfaces at a first location and resuming displaying of the one or more elements onto one or more other surfaces at a second location is based at least in part on a user moving from the first location to the second location. Determining the one or more surfaces comprises identifying one or more virtual objects for displaying the one or more elements. An element of the one or more elements is a TV channel.

In one or more embodiments, the user interacts with an element of the one or more elements displayed by making a purchase of one or more items or services displayed to the user. The program code also performs detecting a change of environment from a first location to a second location, determining one or more additional surfaces at the second location, matching the one or more elements currently being displayed at the first location to the one or more additional surfaces, and displaying the one or more elements as virtual content onto the one or more additional surfaces at the second location.

In another embodiment, an augmented reality (AR) display system includes a head-mounted system includes one or more sensors, and one or more cameras comprising outward facing cameras. The system also includes a processor to execute a set of program code instructions. The system further includes a memory to hold the set of program code instructions, in which the set of program code instructions comprises program code to perform receiving one or more available surfaces from an environment of a user. The program code also performs identifying one or more contents that match a dimension of one available surface from the one or more available surfaces. The program code further performs calculating a score based on comparing one or more constraints of the one or more contents to one or more surface constraints of the one available surface. The program code additionally performs selecting a content from the one or more contents having the highest score. Moreover, the program code performs storing a one-to-one matching of the content selected to the one available surface. The program code also performs displaying on the available surface, to the user, the content selected.

In one or more embodiments, an environment of a user is a personal residence of the user. The one or more available surfaces from the environment of the user is peripheral to a focal view area of the user. The one or more contents are advertisements. The one or more contents are notifications from an application. One of the constraints of the one or more constraints of the one or more contents is an orientation. The content selected is a 3D content.

In another embodiment, a computer-implemented method for deconstructing 2D content includes identifying one or more elements in the content. The method also includes identifying one or more surrounding surfaces. The method further includes mapping the one or more elements to the one or more surrounding surfaces. Moreover, the method includes displaying the one or more elements as virtual content onto the one or more surfaces.

In one or more embodiments, the content is a web page. An element of the one or more elements is a video. The one or more surrounding surfaces comprise physical surfaces within a physical environment or virtual objects not physically located within the physical environment. A virtual object is a multi-stack virtual object. A first set of results of the one or more elements identified and a second set of results of the one or more surrounding surfaces identified are stored in database tables within a storage device. The storage device is a local storage device. A database table storing the results of the one or more surrounding surfaces identified, comprises: a surface id, a width dimension, a height dimension, an orientation description and a position relative to a frame of reference.

In one or more embodiments, identifying the one or more elements in the content includes identifying attributes from tags corresponding to placement of elements, extracting hints from the tags for the one or more elements, and storing the one or more elements. Identifying one or more surrounding surfaces includes identifying user current surrounding surfaces, determining a pose of a user, identifying dimensions of surrounding surfaces, and storing the one or more surrounding surfaces. Mapping the one or more elements to the one or more surrounding surfaces includes looking up pre-defined rules for identifying candidate surrounding surfaces for mapping, and choosing a best fit surface for each of the one or more elements. The displaying of the one or more elements onto the one or more surrounding surfaces is performed by an augmented reality device.

Each of the individual embodiments described and illustrated herein has discrete components and features that may be readily separated from or combined with the components and features of any of the other several embodiments.

Further details of features, objects, and advantages of the disclosure are described below in the detailed description, drawings, and claims. Both the foregoing general description and the following detailed description are exemplary and explanatory, and are not intended to be limiting as to the scope of the disclosure.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

Figures (FIGS. 1A-1B illustrate example systems and computer implemented methods of matching content elements of content to a spatial three-dimensional (3D) environment, according to some embodiments.

FIG. 8 illustrates matching score methodologies, according to some embodiments.

FIGS. 14A-14B show examples of different structures for storing content elements from content, according to some embodiments.

FIG. 15 shows an example of a table to store an inventory of surfaces identified from a user's local environment, according to some embodiments.

FIG. 16 shows an example 3D preview for weblinks, according to some embodiments.

FIG. 17 shows an example of a web page having 3D volumes etched into the webpage, according to some embodiments.

FIG. 18 shows an example of a table to store the matching/mapping of content elements to surfaces, according to some embodiments.

DETAILED DESCRIPTION

Figure 1A:
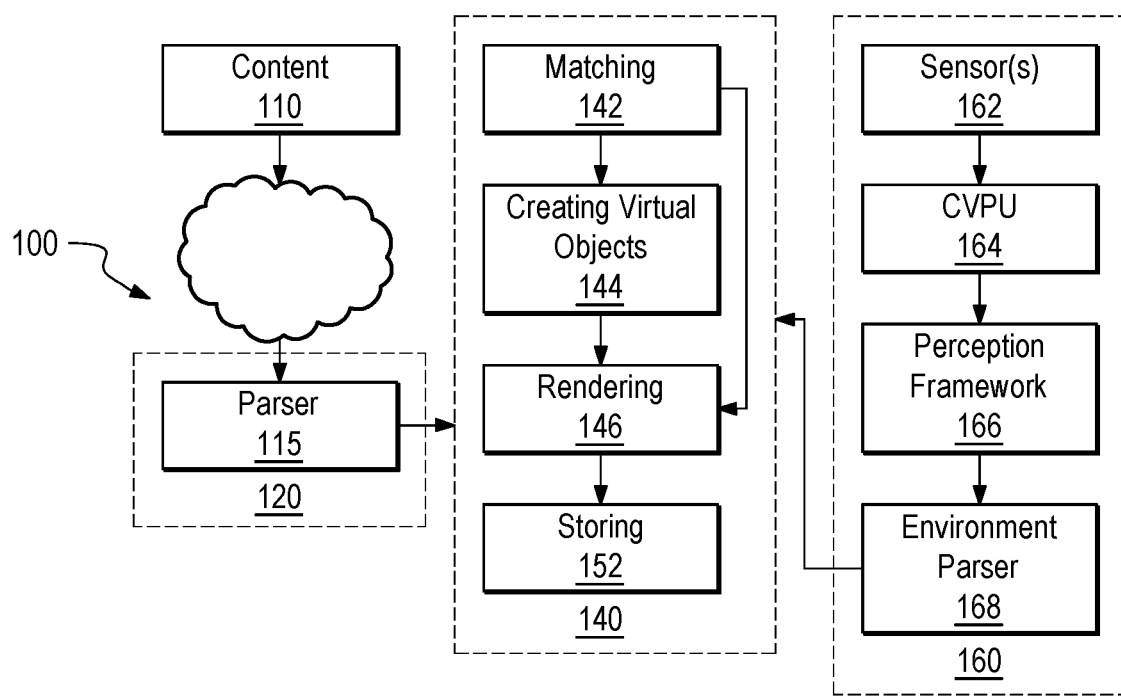

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Embodiments of the disclosure display content or content elements in a spatially organized 3D environment. For example, the content or content elements may include pushed content, pulled content, first party content, and third party content. Pushed content is content that a server (e.g., content designer) sends to a client (e.g., user), where an initial request originates from the server. Examples of pushed content may include (a) notifications from various applications such as stocks notification, newsfeeds, (b) prioritized content such as, for example, updates and notifications from social media applications, email updates, and the like, and/or (c) advertisements targeting broad target groups and/or specific target groups, and the like. Pulled content is content that a client (e.g., user) requests from a server (e.g., content designer), where the initial request originates from the client. Examples of pulled content may include (a) web pages requested by a user using, for example, a browser, (b) streaming data from a content provider requested by a user using, for example, a data streaming application such as a video and/or audio streaming application, (c) and/or any digital format data that a user may request/access/query. First party content is content that is generated by a client (e.g., user) on any device the client owns/uses (e.g., client devices such as mobile device, tablet, camera, head-mounted display device, and the like). Examples of first party content include photos, videos, and the like. Third party content is content that is generated by a party that is not a client (e.g., television network, movie streaming service providers, web pages developed by someone other than the user, and/or any data not generated by the user). Examples of third party content may include a web page generated by someone other than the user, data/audio/video streams and associated content received from one or more sources, any data generated by someone other than the user, and the like.

The content may originate from a web page and/or an application on a head-mounted system, a mobile device (e.g., cell phone), a tablet, a television, from a server, and the like. In some embodiments, the content may be received from another application or device such as a laptop computer, a desktop computer, an email application with a link to the content, an electronic message referencing or including a link to the content and the like. The following detailed description includes an example of a web page as the content. However, the content may be any content and the principles disclosed herein will apply.

Block Diagrams

Figure (FIG. 1A illustrates an example system and computer implemented method of matching content elements of content to a spatial three-dimensional (3D) environment, according to some embodiments. System 100 includes a content structurization process 120, an environment structurization process 160, and an environment compositing process. The system 100, or portions thereof, may be implemented on a device, such as a head-mounted display device.

The content structurization process 120 is a process that reads content 110 and organizes/stores the content 110 into logical structures to make the content 110 accessible and easier to programmatically extract content elements from the content 110. The content structurization process 120 includes a parser 115. The parser 115 receives the content 110. For example, the parser 115 receives the content 110 from an entity (e.g., a content designer). The entity may be, for example, an application. The entity may be external to the system 100. The content 110 may be, for example, pushed content, pulled content, first party content, and/or third party content, as described above. An external web server may serve the content 110 when the content 110 is requested. The parser 115 parses the content 110 to identify content elements of the content 110. The parser 115 may identify and subsequently organize and store the content elements in logical structures such as a table of content for inventorying the content 110. The table of content may be, for example, a tree structure such as a document tree or graph, and/or a database table such as a relational database table.

The parser 115 may identify/determine and store attributes for each of the content elements. The attributes of each of the content elements may be explicitly indicated by a content designer of the content 110 or may be determined or inferred by the parser 115, for example, based on the placement of the content elements within the content 110. For example, the attributes of each of the content elements may be determined or inferred by the parser 115 based on placement of the content elements within the content 110 relative to one another. The attributes of the content elements are described in further detail below. The parser 115 may generate a list of all the content elements, along with respective attributes, parsed from the content 110. After parsing and storing the content elements, the parser 115 may order the content elements based on associated priorities (e.g., from highest to lowest).

Some benefits of organizing and storing the content elements in logical structures is that once the content elements are organized and stored into the logical structures, the system 100 may query and manipulate the content elements. For example, in a hierarchical/logical structure represented as a tree structure having nodes, if a node is deleted, everything under the deleted node may get deleted as well. Likewise, if the node is moved, everything under the node may move along with it.

The environment structurization process 160 is a process that parses environment related data to identify surfaces. The environment structurization process 160 may include sensor(s) 162, a computer vision processing unit (CVPU) 164, a perception framework 166 and an environment parser 168. The sensor(s) 162 provide raw data (e.g., point clouds of the objects and structures from the environment) regarding real world surfaces to the CVPU 164 to process. Examples of sensor(s) 162 may include a global positioning system (GPS), wireless signal sensors (WiFi, Bluetooth, etc.), cameras, depth sensors, inertial measurement unit (IMU) including an accelerometer triad and an angular rate sensor triad, magnetometer, radar, barometer, altimeter, accelerometer, light meter, gyroscopes, and/or the like.

The CVPU 164 simplifies or filters the raw data. In some embodiments, the CVPU 164 may filter out noise from the raw data to produce simplified raw data. In some embodiments, the CVPU 164 may filter out data from the raw data and/or the simplified raw data that may not be used and/or may be unrelated to a current environment scanning task to produce filtered data. The CVPU 164 may alter the remaining data into group point cloud points by distance and planarity making extracting/identifying/determining surfaces easier downstream. The CVPU 164 provides the processed environment data to the perception framework 166 for further processing.

The perception framework 166 receives group point cloud points from the CVPU 164 and prepares environmental data for the environment parser 168. The perception framework 166 creates/determines structures/surfaces/planes (e.g., a list of surfaces) and populates one or more data storages, such as, for example, an external database, a local database, a dedicated local storage, local memory, and the like. For example, the perception framework 166 iterates through all grouped point cloud points received from the CVPU 164 and creates/determines virtual structures/surfaces/planes that correspond to the real world surfaces. A virtual plane may be four vertices (picked from the grouped point cloud points) that create a virtually constructed rectangle (e.g. divided into two triangles in a rendering pipeline). The structures/surfaces/planes created/determined by the perception framework 166 are referred to as environmental data. When rendered and superimposed over the real world surfaces, the virtual surface lays substantially over its corresponding one or more real world surfaces. In some embodiments, the virtual surface lays perfectly over its corresponding one or more real world surfaces. The perception framework 166 may maintain the one to one or one to many matching/ mapping of virtual surfaces to corresponding real world surfaces. The one to one or one to many matching/mapping may be used for querying. The perception framework 166 may update the one to one or one to many matching/mapping when the environment changes.

The environment parser 168 parses the environmental data from the perception framework 166 to determine surfaces in the environment. The environment parser 168 may use object recognition to identify objects based on the environment data received from the perception framework 166. More details regarding object recognition are described in U.S. Pat. No. 9,671,566 entitled "PLANAR WAVE-GUIDE APPARATUS WITH DIFFRACTION ELEMENT(S) AND SYSTEM EMPLOYING SAME", and U.S. Pat. No. 9,761,055, entitled "USING OBJECT RECOGNIZERS IN AN AUGMENTED OR VIRTUAL REALITY SYSTEM", which are incorporated by reference. The environment parser 168 may organize and store the surfaces in logical structures such as a table of surfaces for inventorying the surfaces. The table of surfaces may be, for example, an ordered array, a hierarchical table, a tree structure, a logical graph structure, and/or the like. In one example, an ordered array may be iterated linearly until a good fit surface is determined. In one example, for a tree structure ordered by a specific parameter (e.g., largest surface area), a best fit surface may be determined by continuously comparing whether each surface in the tree is smaller or larger than a requested area. In one example, in a logical graph data structure, a best fit surface may be searched based on a related adjacency parameter (e.g., distance from viewer) or has table with a quick search for a specific surface request.

The data structures described above may be where the environment parser 168 stores data corresponding to the determined surfaces into at runtime (and updates the data if needed based on environment changes) to process surface matching and run any other algorithms on. In one embodiment, the data structures described above with respect to the environment parser 168 may not be where the data is stored more persistently. The data may be stored more persistently by the perception framework 166 when it receives and processes the data—could be runtime memory RAM, an external database, a local database, and the like. Before processing the surfaces, the environment parser 168 may receive the surface data from the persistent storage and populate logical data structures from them, and then run the matching algorithm on the logical data structures.

The environment parser 168 may determine and store attributes for each of the surfaces. The attributes of each of the surfaces may be meaningful with respect to the attributes of the content elements in the table of content from the parser 115. The attributes of the surfaces are described in further detail below. The environment parser 168 may generate a list of all the surfaces, along with respective attributes, parsed from the environment. After parsing and storing the surfaces, the environment parser 168 may order the surfaces based on associated priorities (e.g., from highest to lowest). The associated priorities of the surfaces may be established when the environment parser 168 receives the surface data from the persistent storage and populates logical data structures from them. For example, if the logical data structures include a binary search tree, then for each surface from the storage (received in a regular enumerated list), the environment parser 168 may calculate a priority first (e.g., based on one or more attributes of the surface) and then insert the surface into the logical data structure at its appropriate location. The environment parser 168 may parse through the point clouds and extracts surfaces and/or planes based on a proximity of points/relation in space. For example, the environment parser 168 may extract horizontal and vertical planes and associate a size to the planes.

The content structurization process 120 parses through the content 110 and organizes the content elements into logical structures. The environment structurization process 160 parses through data from the sensor(s) 162 and organizes the surfaces from the environment into logical structures. The logical structures including the content elements and the logical structures including the surfaces are used for matching and manipulation. The logical structures including the content elements may be different (in type) from the logical structures including the surfaces.

Figure 1B:
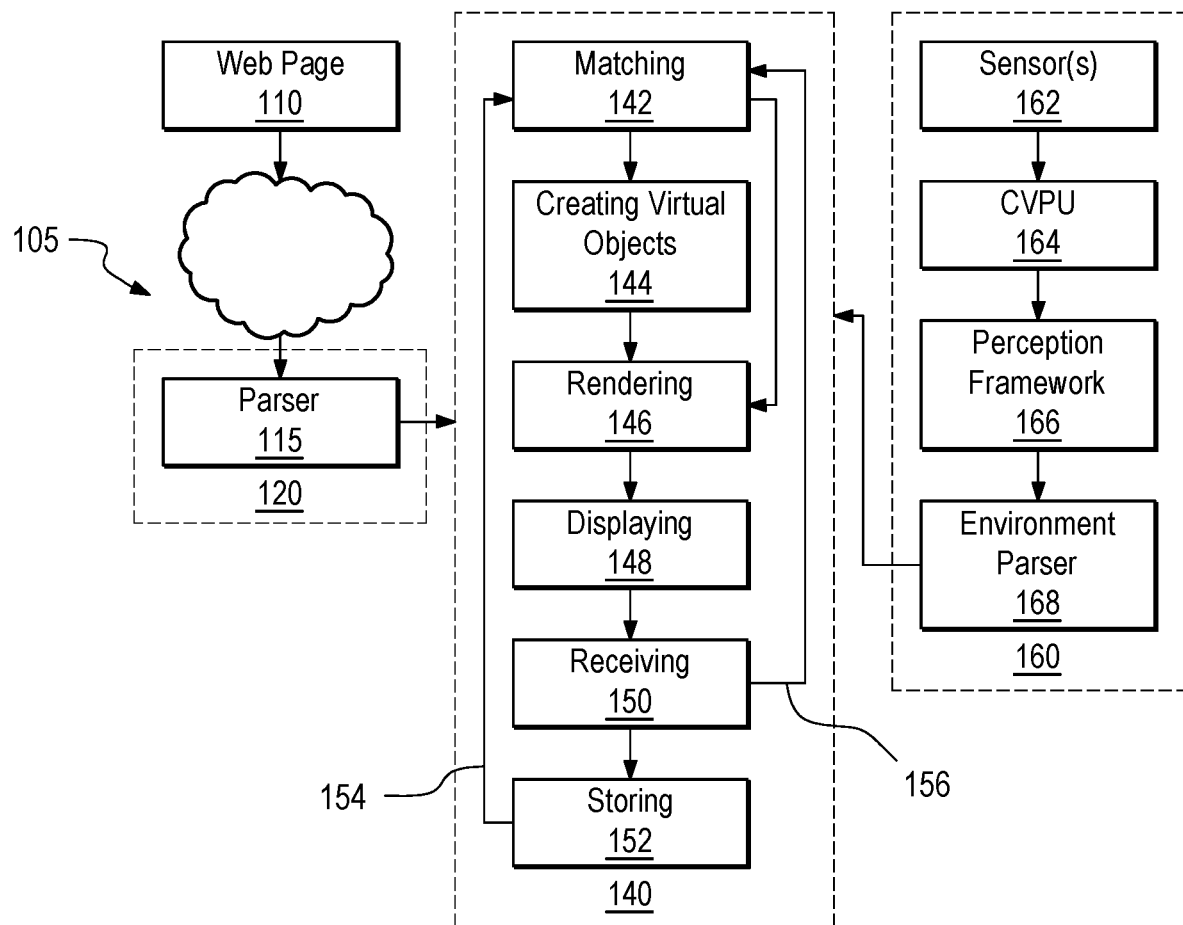

The environment compositing process 140 is a process that matches the content elements from the parser 115 (e.g., a table of content elements, stored in logical structures) with the surfaces from the environment from the environment parser 168 (e.g., table of surfaces, stored in logical structures) to determine which content element should be rendered/mapped/displayed onto which surfaces of the environment. In some embodiments, as illustrated in FIG. 1A, the environment compositing process 140 may include a matching module 142, a rendering module 146, and an optional creating virtual objects module 144. In some embodiments, as illustrated in FIG. 1B, the environment compositing process 140 may further include a displaying module 148 and a receiving module 150.

The matching module 142 pairs/matches content elements stored in logical structures to surfaces stored in logical structures. The matching may be a one-to-one or a one-to-many matching of content elements to surfaces (e.g., one content element to one surface, one content element to two or more surfaces, two or more content elements to one surface, etc.). In some embodiments, the matching module 142 may pair/match a content element to a portion of a surface. In some embodiments, the matching module 142 may pair/match one or more content elements to one surface. The matching module 142 compares attributes of the content elements to attributes of the surfaces. The matching module 142 matches content elements to surfaces based on the content elements and the surfaces sharing similar and/or opposing attributes. Having such an organized infrastructure of the content elements stored in logical structures and the surfaces stored in logical structures allows matching rules, policies and constraints to be easily created, updated and implemented to support and improve the matching process performed by the matching module 142.

The matching module 142 may access one or more preferences data structures such as user preferences, system preferences, and/or passable preferences, and may use the one or more preferences data structures in the matching process. The user preferences may be a model based on, for example, aggregate preferences based on past actions and may be specific to particular content element types. The system preferences may include, for one content element, a top two or more surfaces, wherein a user may have the ability to navigate through the two or more surfaces to select a preferred surface. The top two or more surfaces may be based on the user preferences and/or the passable preferences. The passable preferences may be retrieved from a cloud database wherein the passable preference may be a model based on, for example, a grouping of other users, similar users, all users, similar environments, content element types, and/or the like. The passable preference database may be pre-populated with consumer data (e.g., aggregate consumer data, consumer testing data, etc.) to provide reasonable matching, even before a large data set (e.g., a data set of the user) is accumulated.

The matching module 142 matches one content element to one or more surfaces based at least in part on content vector (e.g., orientation attribute), headpose vector (e.g., attribute of VR/AR device, not surface), and surface normal vector of the one or more surfaces. The content vector, headpose vector, and the surface normal vector are described in detail below.

The matching module 142 generates matching results having at least a one-to-one or one-to-many matching/mapping of content elements to surfaces (e.g., one content element to one surface, one content element to two or more surfaces, two or more content elements to one surface, etc.). The results may be stored in cache memory or a persistent storage for further processing. The results may be organized and stored in a table for inventorying the matches.

In some embodiments, the matching module 142 may generate matching results wherein one content element may be matched/mapped to multiple surfaces such that the content element may be rendered and displayed on any one of the multiple surfaces. For example, the content element may be matched/mapped to five surfaces. A user may then select a surface from the five surfaces as a preferred surface that the content element should then be displayed on. In some embodiments, the matching module 142 may generate matching results wherein one content element may be matching/mapped to a top three of the multiple surfaces.

In some embodiments, when the user chooses or selects a preferred surface, the selection made by the user may update the user preferences so that the system 100 may make a more accurate and precise recommendation of content elements to surfaces.

If the matching module 142 matches all the content elements to at least one surface, or discards content elements (e.g., for mapping to other surfaces, or does not find a suitable match), the environment compositing process 140 may proceed to the rendering module 146. In some embodiments, for content elements that do not have a matching surface, the matching module 142 may create a matching/mapping for the content elements to virtual surfaces. In some embodiments, the matching module 142 may dismiss the content elements that do not have a matching surface.

The optional creating virtual objects module 144 may create virtual objects for displaying content elements, such as a virtual planar surface. During the matching process of the matching module 142, it may be determined that a virtual surface may be an optional surface to display certain content elements onto. This determination may be based on a texture attribute, an occupied attribute, and/or other attributes of the surfaces determined by the environment parser 168 and/or the attributes of the content elements determined by the parser 115. The texture attribute and the occupied attribute of the surfaces are described in detail below. For example, the matching module 142 may determine that a texture attribute and/or an occupied attribute may be disqualifying attributes for a potential surface. The matching module 142 may determine, based at least on the texture attribute and/or occupied attribute, that the content element may alternatively be displayed on a virtual surface instead. A position of the virtual surface may be relative to a position of one or more (real) surfaces. For example, the position of the virtual surface may be a certain distance away from a position of the one or more (real) surfaces. In some embodiments, the matching module 142 may determine that there are no suitable (real) surfaces, or the sensors 162 may not detect any surfaces at all, and thus, the optional creating virtual objects module 144 may create virtual surfaces to display content elements onto.

In some embodiments, creating virtual objects for displaying content elements may be based on data received from a particular sensor or sensors of sensors 162, or by a lack of sensor input from particular sensor or sensors. The data received from environmental-centric sensors of sensors 162 (such as cameras or depth sensors) may indicate a lack of suitable surfaces based on the user's current physical environment, or such sensors may be unable to discern the presence of a surface at all (for example, a highly absorptive surface may make surface identification difficult depending on the quality of depth sensor, or a lack of connectivity make preclude access to certain shareable maps that could provide surface information).

In some embodiments, if the environment parser 168 does not receive data from sensors 162 or perception framework 166 within a certain timeframe, the environment parser 168 may passively determine no suitable surfaces are present. In some embodiments, sensors 162 may actively confirm that environmental-centric sensors cannot determine surfaces and may pass such determination to environment parser 168 or to rendering module 146. In some embodiments, if the environment structurization process 160 has no surfaces to provide to the environment compositing process 140, either by passive determination by environment parser 168 or active confirmation by sensors 162, the environment compositing process 140 may create a virtual surface or access a stored or registered surface such as from a storage module 152. In some embodiments, environment parser 168 may receive surface data directly, such as from a hot spot or third-party perception framework or storing module, without input from the device's own sensors 162.

In some embodiments, certain sensors, such as a GPS may determine a user is in a location that does not have suitable surfaces for displaying content elements such as, for example, an open space park or a beach, or the only sensor that provides data is one that does not provide mapping information but orientation information instead (such as a magnetometer). In some embodiments, a certain type of display content elements may require a type of display surface that may not be available, or is not detectable, in a user's physical environment. For example, a user may want to view a map displaying walking directions to a location from the user's hotel room. In order for the user to maintain a view of the walking map as the user navigates to the location, the AR system may need to consider creating a virtual object such as a virtual surface or screen to display the walking map because based on data received (or not received) from sensors 162, there may not be adequate surfaces available or detectable by the environment parser 168 that would allow the user to continuously view the walking map from the starting position of the user's room in the hotel to the destination location on the walking map. For example, the user may have to enter an elevator where network connectivity may be limited or blocked, leave the hotel, walk through an open area such as a park where there may be no available surfaces for displaying content elements, or too much noise for a sensor to accurately detect a desired surface. In this example, the AR system may determine that based on the content to be displayed and the potential issues that may include a lack of network connectivity or a lack of suitable display surfaces (e.g., based on GPS data of the user's current location) the AR system may determine it may be best to create a virtual object to display the content elements as opposed to relying on the environment parser 168 to find suitable display surfaces using the information received the sensors 162. In some embodiments, a virtual object created to display the content elements may be a Prism. More details regarding Prisms are described in co-owned U.S. Provisional Patent Application No. 62/610, 101 filed on Dec. 22, 2017, entitled "METHODS AND SYSTEM FOR MANAGING AND DISPLAYING VIRTUAL CONTENT IN A MIXED REALITY SYSTEM", which is incorporated in its entirety by reference. One of ordinary skill in the art may appreciate many more examples of when it may be more beneficial to create virtual surfaces to display content elements onto, as opposed to display content elements on the (real) surfaces.

The rendering module 146 renders the content elements to their matched surfaces. The matched surfaces may include real surfaces and/or virtual surfaces. In some embodiments, although a match is made between a content element and a surface, the match may not be a perfect match. For example, the content element may require a 2D area of 1000×500. However, the best-matched surface may have a dimension of 900×450. In one example, the rendering module 146 may render the 1000×500 content element to best fit the 900×450 surface, which may include, for example, a scaling of the content element while keeping the aspect ratio constant. In another example, the rendering module 146 may crop the 1000×500 content element to fit within the 900×450 surface.

In some embodiments, the device implementing the system 100 may move. For example, the device implementing the system 100 may move from a first room to a second room.

In some embodiments, content elements that are matched to surfaces (real and/or virtual) in the first room may remain matched to the surfaces in the first room. For example, the device implementing the system 100 may move from the first room to the second room, and the content elements that are matched to the surfaces in the first room would not be matched to, and therefore would not be rendered on, surfaces in the second room. If the device were to then move from the second room to the first room, the content elements that were matched to the surfaces in the first room would be rendered to/displayed on the corresponding surfaces in the first room. In some embodiments, content would continue to render in the first room, though not displayed as it would be out of the device's field of view, but certain features would continue to operate such as audio play or time of play such that when the device returned to having matched content in the field of view the rendering would seamless resume (similar effect as if a user left a room with a movie playing on a conventional TV).

In some embodiments, the content elements that are matched to surfaces in the first room may be matched to surfaces in the second room. For example, the device implementing the system 100 may move from the first room to the second room, and after the device is in the second room, the environment structurization process 160, and the environment compositing process 140 may occur/run/execute and the content elements may be matched to surfaces (real and/or virtual) in the second room.

In some embodiments, some content elements that are matched to surfaces in the first room may remain in the first room while other content elements that are matched to surfaces in the first room may move to the second room. For example, first set of the content elements that are matched to surfaces in the first room may remain matched to the surfaces in the first room, while a second set of the content elements that are matched to surfaces in the first room may move with the device implementing the system 100 to the second room. The second set of the content elements may move with the device as the device goes from the first room to the second room. Whether a content element is in the first set or the second set may be determined based on an attribute of the content element, an attribute of one or more surfaces in the first room the content element is matched to, user preferences, system preferences, and/or passable world preferences. Underlying these various scenarios is that matching and rendering may be exclusive; content may match to a surface but not render. This may save on computing cycles and power as a user device need not match surfaces constantly, and selective rendering can reduce latency at resumption of viewing content at a matched surface.

FIG. 1B illustrates an example system and computer implemented method of matching content elements of content to a spatial 3D environment, according to some embodiments. System 105 includes a content structurization process 120, an environment structurization process 160 and an environment compositing process 140, similar to FIG. 1A. The environment compositing process 140 of FIG. 1B includes additional modules including a displaying module 148 and a receiving module 150.

As mentioned above, the matching module 142 may generate matching results wherein one content element may be matched/mapped to multiple surfaces such that the content element may be rendered and displayed on any one of the multiple surfaces. The displaying module 148 displays a content element, or an outline of the content element, or reduced resolution version of the content element (each referred to herein as a "candidate view") on multiple surfaces or in multiple portions of a single surface. In some embodiments, the multiple surface display is successive, such that the user sees only a single candidate view at a time and may cycle or scroll through additional candidate view options one by one. In some embodiments all candidate views are displayed simultaneously and the user selects a single candidate view (such as by voice command, input to a hardware interface, eye-tracking, etc.). The receiving module 150 receives a selection of one candidate view on a surface of the multiple surfaces from a user. The selected candidate view may be referred to as a preferred surface. The preferred surface may be saved as user preferences or passable preference in the storage module 152 so that future matchings may benefit from such preference when matching content elements to surfaces, as indicated by information flow 156 from the receiving module 150 to the matching module 142, or information flow 154 from the storage module 152 to the matching module 142. The information flow 156 may be an iterative process such that after several iterations, according to some embodiments, the user preferences may begin to dominate over system and/or passable preferences. By comparison, the information flow 154 may be a fixed output, such that it will always be given matching priority, to the instant user or to other users that enter or wish to display content in the same environment. System and/or passable preferences may dominate over user preferences, but as more information flow 156 continues over a user's usage of the system 100 of FIG. 1A or 105 of FIG. 1B, the user preferences may begin to be preferred by the system through a natural learning process algorithm. Thus, in some embodiments, a content element will render to/display on the preferred surface regardless of the availability of other surfaces or environmental inputs that would otherwise lead the matching module 142 to place a content element elsewhere. Similarly, the information flow 154 may dictate render/display matching to a preferred surface for a second user that has never been in the environment and has not built an iterative information flow 156 preferred surface that a first user has.

Advantageously, as sensor data and virtual models generally are stored in short term computer memory, a persistent storage module that stores a preferred surface may cycle through the environment compositing process 140 more quickly if there has been a device shut down between content placement sessions. For example, if the sensors 162 collect depth information to create virtual mesh reconstructions through the environment structurization process 160 for matching content in a first session, and a system shut down empties the random access memory storing that environment data, the system will have to repeat the environment structurization pipeline on restart for the next matching session. Computing resources are saved, however, by the storage module 152 updating the matching module 142 with the preferred surface information without a complete iteration of the environment structurization process 160.

In some embodiments, the content element may be displayed on the top three surfaces all at once. The user may then select a surface from the top three surfaces as a preferred surface. In some embodiments, the content element may be displayed on only one of the top three surfaces at a time with an indication to the user that the content element may be displayed on two other surfaces. The user may then navigate through the other surface options and as each surface option is activated by the user, the content element may be displayed on the activated surface. The user may then select a surface from the surface options as a preferred surface.

Figure 2A:
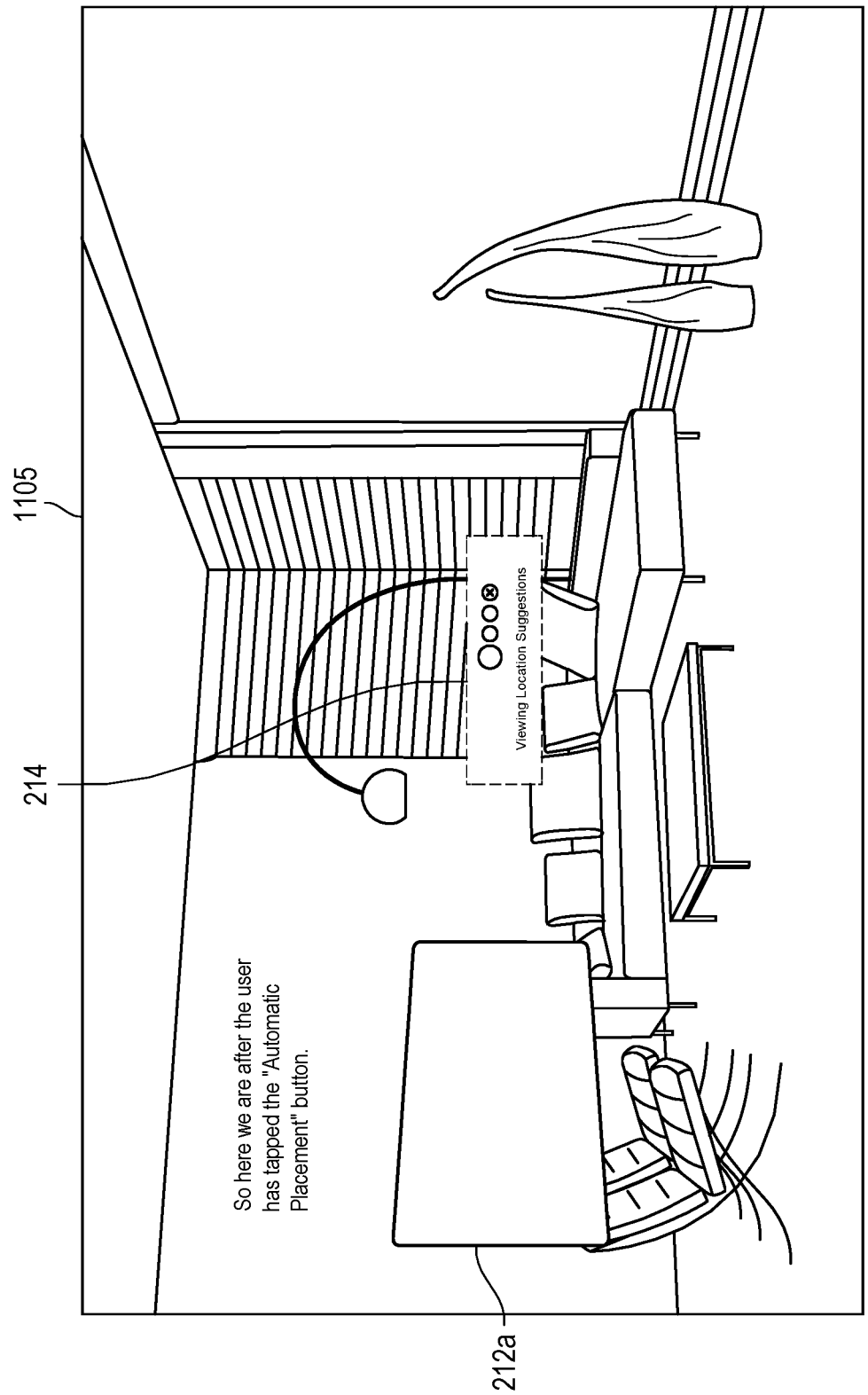
FIGS. 2A-2E illustrate examples for matching content elements to surfaces in a spatial three-dimensional (3D) environment, according to some embodiments.
Figure 2B:
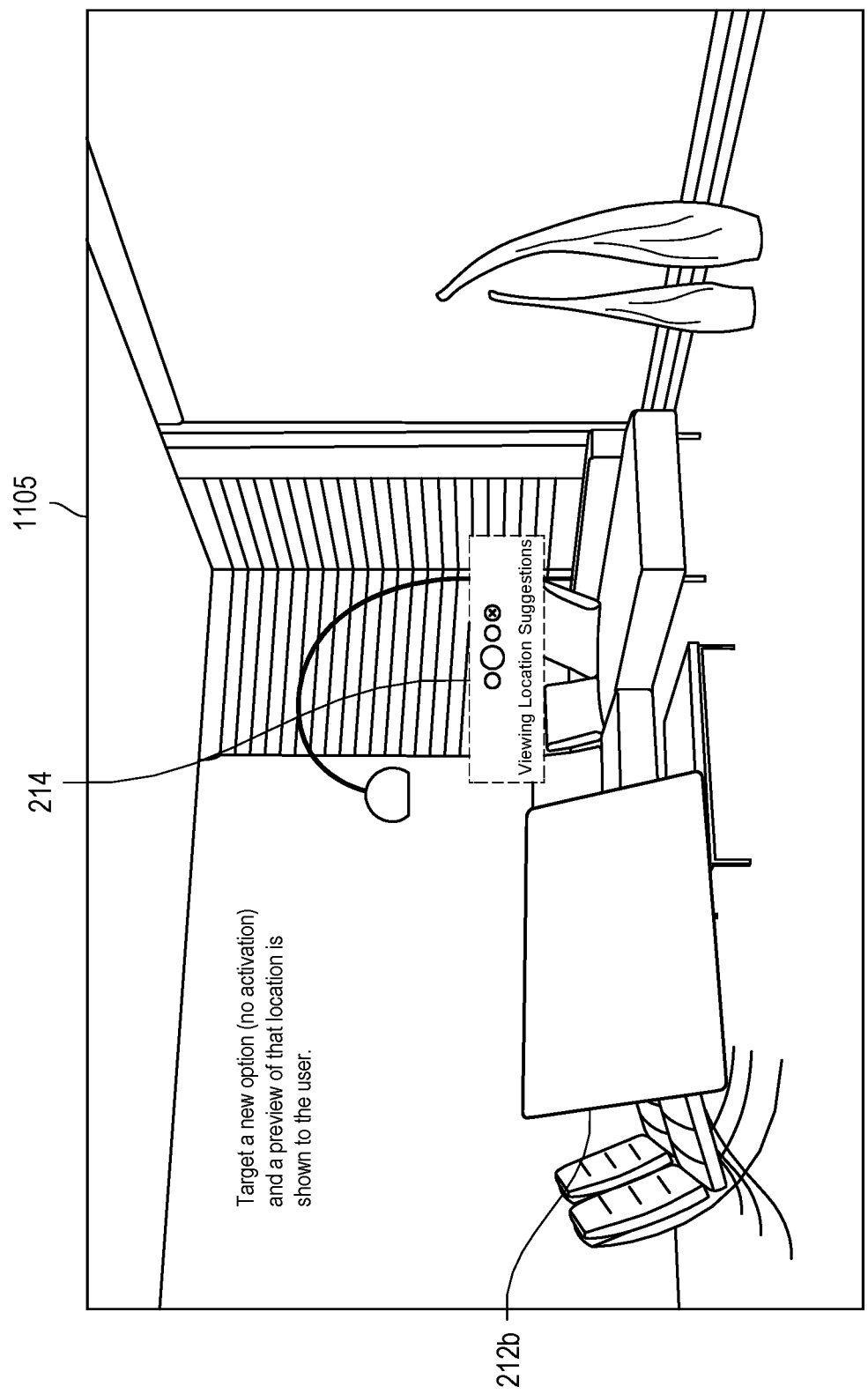
Figure 2C:
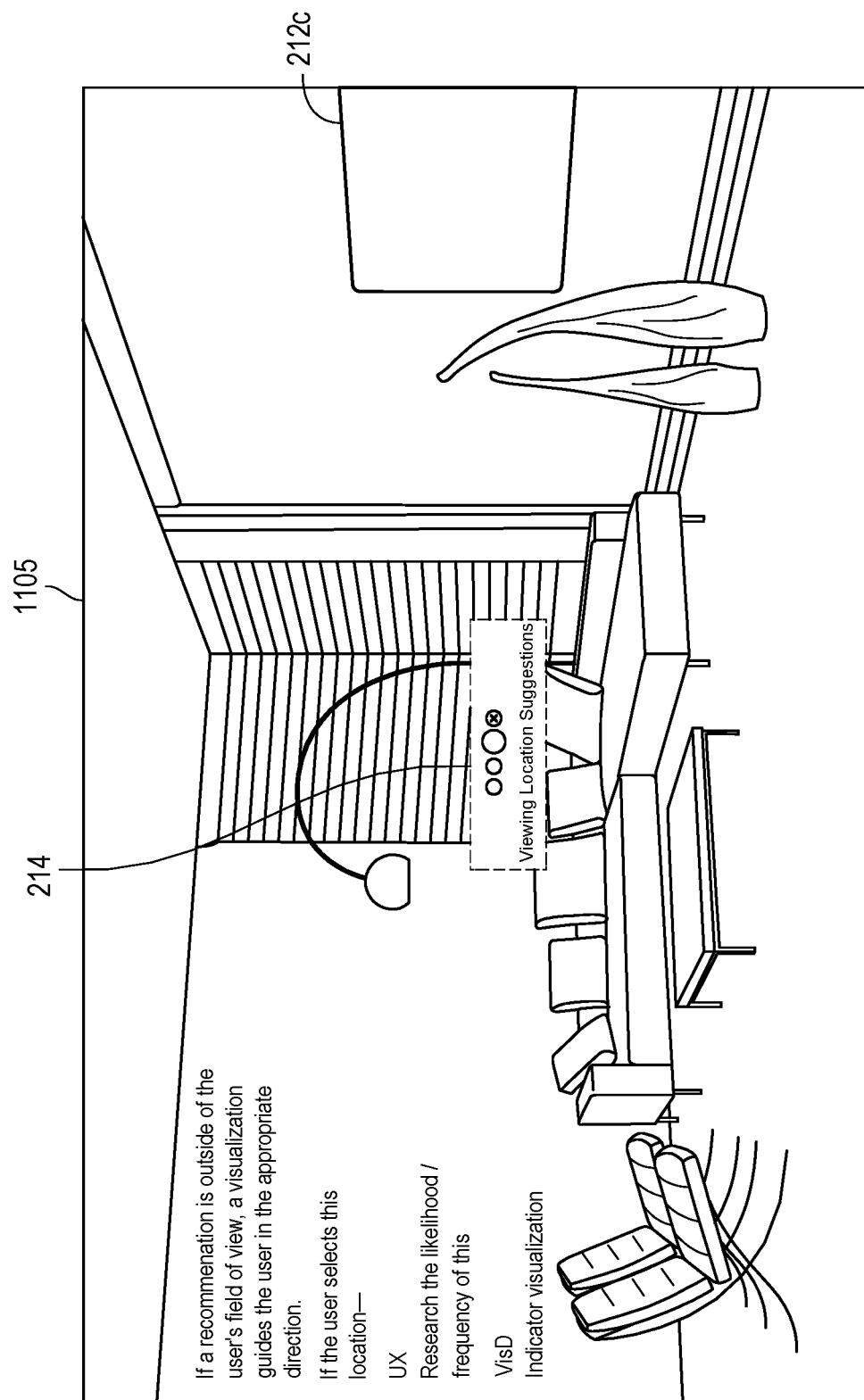

FIGS. 2A-2E depict a content element (e.g., a monitor of a computer, smartphone, tablet, television, web browser, screen etc.) matched to three possible locations within a user's physical environment 1105. FIG. 2A shows the content element being matched/mapped to three possible locations as indicated by view location suggestions 214. The three white dots displayed on the left hand side in the view location suggestions 214 indicate there may be three display locations. The fourth white dot with an "x" may be a close button to close the view location suggestions 214 and to indicate the selection of a preferred display location based on the selected/highlighted display location when the user chooses the "x". Display location 212a is a first option for display the content element as indicated by the highlighted first white dot of the three white dots on the left hand side. FIG. 2B shows the same user's physical environment 1105 wherein a display location 212b is a second option for displaying the content element as indicated by the highlighted second white dot of the three white dots on the left hand side. FIG. 2C shows the same user's physical environment 1105 wherein the display location 212c is a third option for displaying the content element as indicated by the highlighted third white dot of the three white dots on the left hand side. One of ordinary skill in the art may appreciate that there may be other approaches to show display options for a user to choose and that the example illustrated in FIGS. 2A-2C is just one example. For example, another approach may be to display all display options at once and to have the user select a preferred option using a VR/AR device (e.g., a controller, via gaze, etc.).

Figure 2D:
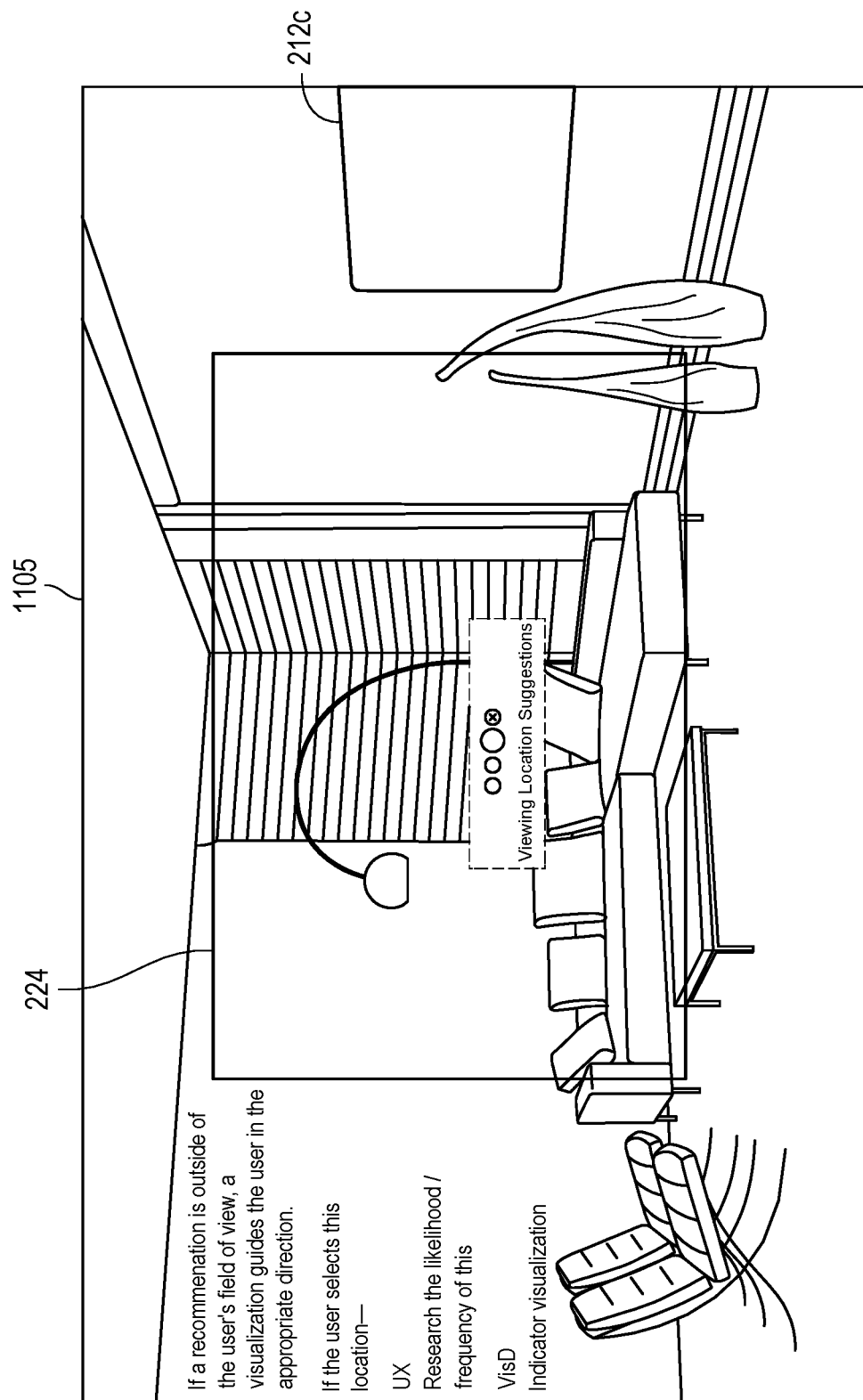

It will be appreciated that AR systems have certain fields of view where virtual content my project, and that such field of field is typically less than a human's full field of view potential. Humans can generally have a natural field of view between 110 and 120 degrees, in some embodiments the display field of view of the AR system 224 as depicted in FIG. 2D is less than this potential, meaning a surface candidate 212c may be within a user's natural field of view, but outside the device's field of view (e.g. the system is capable of rendering content on that surface, but will not actually display the content). In some embodiments, a field of view attribute (attributes are described further below) is assigned to a surface to denote whether a surface is capable of supporting displayed content for the device's field of display. In some embodiments, surfaces outside the field of display are not presented to the user for display options as described above.

Figure 2E:
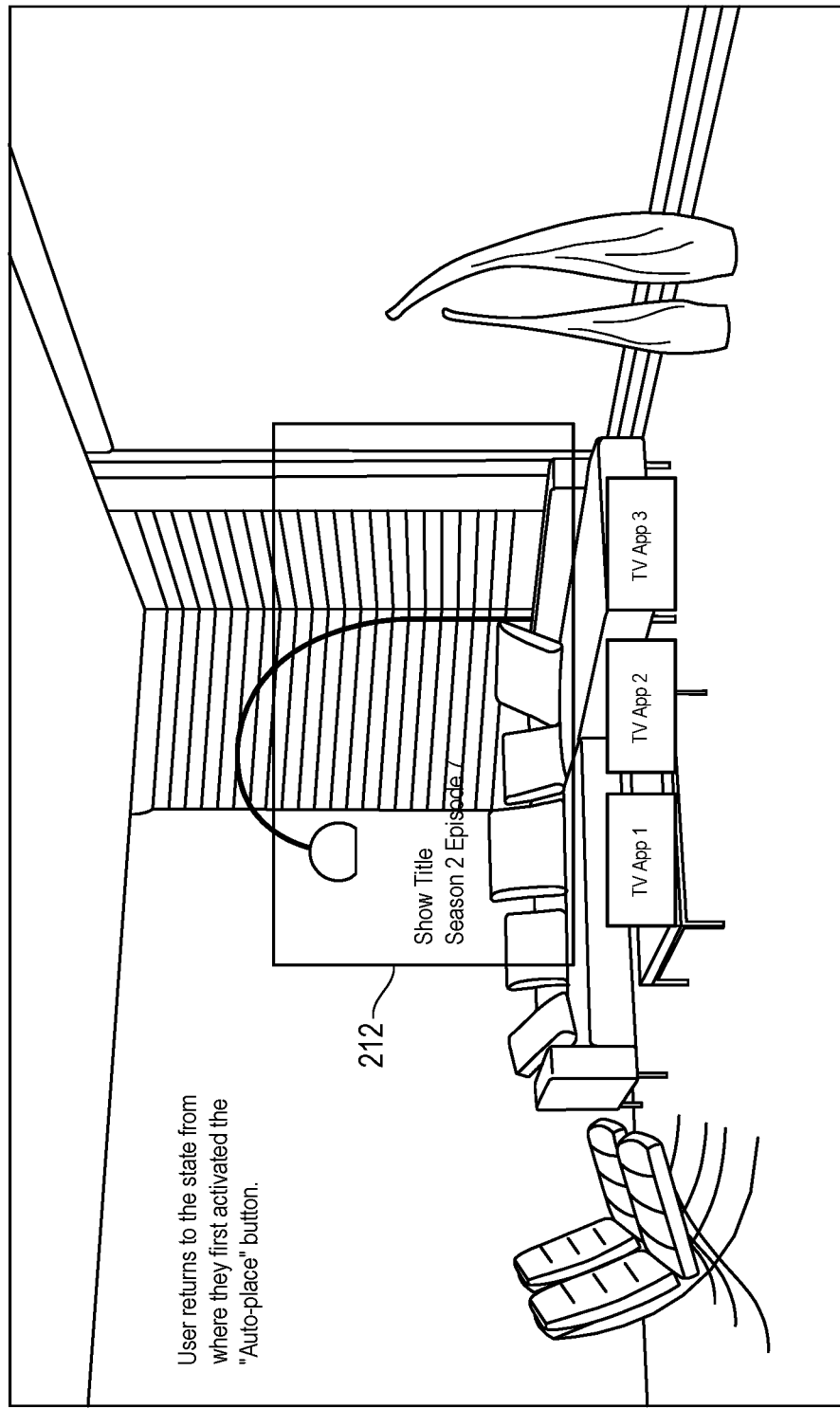

In some embodiments, a default position 212 as depicted in FIG. 2E is directly in front of the user at a prescribed distance (such as at a certain focal length specification of the device's display system) as a virtual surface. A user may then adjust default position 212, such as by headpose or gesture or other input means measured by sensors 162 to a desired position (e.g. either to a registered location from the storage module 152, or a matched surface from the environment compositing process 140) in the environment. In some embodiments, default position may stay fixed relative to the user such that as the user moves through the environment, the default position 212 remains in substantially the same portion of the user's field of view (which is the same as the device field of display in this embodiment).

FIG. 2E also illustrates, as an example, a virtual television (TV) at default position 212 having three TV application previews (e.g., TV App1, TV App2, TV App3) associated with the virtual TV. The three TV applications may correspond to different TV channels or different TV applications corresponding to different TV channels/TV content providers. A user may extract a single channel for TV play by selecting the respective TV application/channel shown below the virtual TV. The user may extract the channel for TV by (a) targeting a channel with a totem, (b) pressing a trigger on the totem to select the channel and holding the trigger for a period of time (e.g., about 1 second), (c) moving the totem around to identify a desired location in an environment for displaying the extracted TV channel, and (d) pressing the trigger on the totem to place the extracted TV channel at the desired location in the environment. Selecting virtual content is further described in U.S. patent application Ser. No. 15/296,869, claiming priority to Oct. 20, 2015, entitled, "SELECTING VIRTUAL OBJECTS IN A THREE-DIMENSIONAL SPACE," the contents of each are hereby incorporated by reference The desired location may be a surface suitable for displaying a TV channel, or other surface identified in accordance with the teachings of this disclosure. In some embodiments, a new Prism may be created at the desired location with the selected channel content loaded and displayed within the new Prism. More details regarding totems are described in U.S. Pat. No. 9,671,566 entitled "PLANAR WAVEGUIDE APPARATUS WITH DIFFRACTION ELEMENT(S) AND SYSTEM EMPLOYING SAME", which is incorporated in its entirety by reference. In some embodiments, the three TV applications may be "channel previews" that are little apertures for seeing what is playing on the respective channels by displaying dynamic or static depictions of the channels content. In some embodiments, while (c) moving the totem around to identify a desired location in an environment for displaying the extracted TV channel, a visual may be shown to a user. The visual may be, for example, a single image illustrating the channel, one or more images illustrating a preview of the channel, a video stream illustrating current content of the channel, and the like. The video stream may be, for example, low resolution or high resolution and may vary (in resolution, frame rate, etc.) as a function of available resources and/or bandwidth.

FIGS. 2A-2E illustrate different display options to display content (e.g., elements as virtual content) within an original field of view of a user (e.g., based on a particular headpose). In some embodiments, the field of view of the user may change (e.g., a user moves their head from one field of view to another field of view). As a result of the changed field of view, additional surface options for displaying content may be made available to the user based at least in part on the change in the field of view of the user (e.g., a change in headpose). The additional surface options for displaying content may also be available based at least in part on other surfaces not originally available in the user's original field of view, but is now visible to the user based on the change in the field of view of the user. Therefore, the view location suggestions 214 of FIGS. 2A-2D may also depict the additional options for displaying content. For example, FIGS. 2A-2D depicts three display options. As the user's field of view changes, more display options may be available which may result in view location suggestions 214 displaying more dots to indicate additional display options. Likewise, if the new field of view has less surface options, view location suggestions 214 may display less than 3 dots, to indicate a number of display options available for the content to be displayed in the new field of view. Therefore, one or more additional surface options for displaying the content based on a changed field of view of a user may be displayed to the user for selection, the changed field of view corresponding to a change in headpose of the user.

In some embodiments, a user may have a first field of view. The first field of view may be used to generate surface options for displaying content on. For example, three surface options in the first field of view may be available for displaying a content element on. The user may then change their field of view from the first field of view to a second field of view. The second field of view may then be used to generate additional surface options for displaying the content on. For example, two surface options in the second field of view may be available for displaying the content element on. Between the surfaces in the first field of view and the surfaces in the second field of view, there may be a total of five surface options. The five surface options may be displayed to the user as viewing location suggestions. If the user is looking in the second field of view and selects a viewing location suggestion in the first field of view, the user may receive an indication (e.g., arrow, glow, etc.) in the direction of the first field of view indicating to the user that they should navigate in the indicated direction back to the first field of view to view the selected surface option/viewing location.

In some embodiments, a user may be viewing content displayed on a first surface in a first field of view. The first field of view may have an associated first headpose. In the event the user changes their field of view from the first field of view to a second field of view, after a period time, the system may provide the user an option to change the display location of the content from the first surface in the first field of view to one or more surface options in the second field of view. The second field of view may have an associated second headpose. In some embodiments, the system may immediately provide the user with the option to move the content once the user's field of view is changed from the first field of view to the second field of view and thus from the first headpose to the second headpose, the first headpose and the second headpose having a change in position that is greater than a headpose change threshold. In some embodiments, a time threshold (e.g., 5 seconds) for the user to remain with the second field of view and thus the second headpose may determine whether the system provides the user with the option to change the display location of the content. In some embodiments, the change in field of view may be a slight change such as less than a corresponding headpose change threshold (e.g., less than 90 degrees in any direction with respect to the first field of view and thus a direction of the first headpose) to trigger the system from providing the options to change the display location of the content. In some embodiments, the change in headpose may be greater than the headpose change threshold (e.g., more than 90 degrees in any direction) before the system provides the user with an option to change the display location of the content. Therefore, one or more additional surface options for displaying the content based on a changed field of view may be displayed based at least in part on a time threshold corresponding to the changed field of view. In some embodiments, the one or more additional surface options for displaying the content based on a changed field of view of the user may be displayed based at least in part on a headpose change threshold.

In some embodiments, a system may render/display content on one or more first surfaces, where a user viewing the content has a first headpose. The user viewing the content may change their headpose from the first headpose to a second headpose. In response to the change in headpose, system may render/display the content on one or more second surfaces, where the user viewing the content has the second headpose. In some embodiments, the system may provide the user an option to change the render/display location of the content from the one or more first surfaces to the one or more second surfaces. In some embodiments, the system may immediately provide the user with the option to move the content once the headpose of the user has changed from the first headpose to the second headpose. In some embodiments, the system may provide the user the option to change the render/display location of the content if the headpose change is greater than a corresponding headpose change threshold (e.g., 90 degrees). In some embodiments, the system may provide the user the option to change the render/display location of the content if the headpose change is maintained for a threshold period of time (e.g., 5 seconds). In some embodiments, the change in the headpose may be a slight change such as less than a corresponding headpose change threshold (e.g., less than 90 degrees) to trigger the system from providing the option to change the render/display location of the content.

Attributes

General Attributes

As mentioned above, the parser 115 may identify/determine and store attributes for each of the content elements and the environment parser 168 may determine and store attributes for each of the surfaces. The attributes of the content elements may be explicitly indicated by a content designer of the content 110 or may be determined or otherwise inferred by the parser 115. The attributes of the surfaces may be determined by the environment parser 168.

Attributes that both the content elements and the surfaces may have include, for example, orientation, aspect ratio, dimension, an area (e.g., size), relative viewing position, color, contrast, readability index, and/or time. Further details regarding these attributes are provided below. One of ordinary skill in the art may appreciate that the content elements and the surface may have additional attributes.

For the content elements and the surfaces, an orientation attribute indicates an orientation. The orientation value may include a vertical, horizontal, and/or specific angle (e.g., 0 degree for horizontal, 90 degree for vertical, or anywhere in between 0-90 degrees for an angled orientation). A specific angle orientation attribute may be specified/determined in a degree or radiant, or it may be specified/determined relative to an x-axis or y-axis. In some embodiments, a tilted surface may be defined for displaying, for example, a water flow of content that flows at an inclined angle to show different artistic works. In some embodiments, for content elements, a navigation bar of an application may be defined as horizontal in orientation, but tilted in a particular angle.

For the content elements and the surfaces, an aspect ratio attribute indicates an aspect ratio. The aspect ratio attribute may be specified as, for example, a 4:3 or 16:9 ratio. A content element may be scaled based on aspect ratio attributes of the content element and corresponding one or more surfaces. In some embodiments, a system may determine an aspect ratio of content elements (e.g., videos) based on other attributes of the content elements (e.g., dimensions and/or area) and scale the content elements based on the determined aspect ratio. In some embodiments, a system may determine an aspect ratio of surfaces based on other attributes of the surfaces.

Within the aspect ratio attribute, there may be a particular property a content designer of content elements may use to recommend a particular aspect ratio for the content elements be maintained or changed. In one example, if this particular property is set to "maintain" or a similar keyword or phrase, an aspect ratio of a content element will be maintained (i.e., not changed). In one example, if this particular attribute is set to, for example, "free", or a similar keyword or phrase, an aspect ratio of a content element may be changed (e.g., scaled or otherwise), for example, to match an aspect ratio of one or more surfaces that the content element is matched to. A default value of the aspect ratio attribute may be to maintain an original aspect ratio of the content element, and the default value of the aspect ratio attribute may be overwritten if the content designer designates some other values or keywords for the aspect ratio attribute of the content element, and/or if a system determines the aspect ratio attribute should be overwritten to better match the content element to one or more surfaces.

For the content elements and the surfaces, a dimension attribute indicates a dimension. The dimension attribute of the content elements may indicate a dimension of the content elements as a function of pixels (e.g., 800 pixels by 600 pixels). The dimension attribute of the surfaces may indicate a dimension of the surfaces as a function of meters (e.g., 0.8 meters by 0.6 meters), or any other measurement unit. The dimension attribute of the surfaces may indicate measurable extents of the surfaces, wherein the measurable extents may include length, breadth, depth, and/or height. For the content elements, the dimension attribute may be specified by the content designer to suggest a certain shape and exterior size of a surface to display the content element on.

For the content elements and the surfaces, an area attribute indicates the area or size. The area attribute of the content elements may indicate an area of the content elements as a function of pixels (e.g., 480,000 square pixels). The area attribute of the surfaces may indicate an area of the surfaces as a function of meters (e.g., 0.48 square meters), or any other measurement unit. For the surfaces, the area may be a perceived area, perceived by a user, or it may be an absolute area. The perceived area may be defined by heighten absolute area along with an angle and distance of the displayed content element from the user such that when the content element is displayed closer to the user, the content element is perceived to be a smaller size and when the content element is further away from the user, the content element may be enlarged accordingly so that it is still perceived by the user to be the same particular size, and vice versa when the content element is brought closer to the user. Absolute area may be defined simply by, for example, square meters, regardless of the distance from the displayed content element in the environment.

For the content elements and the surfaces, a relative viewing position attribute relates to a position with respect to a user's head-pose vector. A head-pose vector may be a combination of a position and orientation of a head-mounted device worn by a user. The position may be a fixed point of the device being worn on the head of the user that is tracked in a real world coordinate system using information received from environment- and/or user-sensing systems. The orientation component of the user's head-pose vector may be defined by a relationship between a three-dimensional device coordinate system, which is local to the head-mounted device, and the three-dimensional real world coordinate system. The device coordinate system may be defined by three orthogonal directions: a forward-facing viewing direction which approximates the user's forward line of sight through the device, an upright direction of the device, and a right direction of the device. Other reference directions may also be chosen. Information obtained by sensors in the environment- and/or user-sensing system may be used to determine orientation of the local coordinate system with respect to the real world coordinate system.

To further illustrate the device coordinate system, if a user is wearing the device and hanging upside down, the upright direction for that user and device is actually in a direction pointing towards the ground (e.g., in the downward direction of gravity). However, from the user's perspective, the relative upright direction of the device still aligns with the user's upright direction; for example, if the user was reading a book in the typical top-to-bottom, left-to-right fashion while hanging upside down, the user would be seen by others who are standing normally and not hanging upside down, as holding the book upside down from the real world coordinate system, but relative to the local device coordinate system which approximates the user's perspective, the book is oriented upright.

For the content elements, the relative viewing position attribute may indicate at what position the content elements should be displayed with respect to the head-pose vector. For the surfaces, the relative viewing position attribute may indicate the position of the surface in the environment with respect to the user's head-pose vector. It will be appreciated that component vectors of the head-pose vector, such as a forward-facing viewing direction vector, may also be used as criteria for determining relative viewing position attributes of a surface and/or for determining relative viewing position attribute for content elements. For example, a content designer may indicate that a content element such as a search bar should always be at most 30 degrees to the left or right of the user, relative to a user's head-pose vector and if the user moves more than 30 degrees to the left or right, the search bar should be adjusted so that it is still within 30 degrees to the left or right of the user's head-pose vector. In some embodiments the content is adjusted instantaneously. In some embodiments, the content is adjusted once a time threshold has been met. For example, the user moves more than 30 degrees to the left or right and the search bar should be adjusted after a time threshold of 5 seconds has passed.

A relative viewing angle may be specified to maintain an angle or a range of angles relative to the user's head-pose vector. For example, a content element such as a video may have a relative viewing position attribute indicating that the video should be displayed on a surface that is approximately orthogonal to the user's forward-facing viewing vector. If the user is standing in front of a surface, such as a wall, looking directly ahead, the wall's relative viewing position attribute with respect to the user's forward-facing viewing vector may satisfy the content element's relative viewing position attribute requirement. However, if the user looks down at the floor, the wall's relative viewing position attribute changes and the floor's relative viewing position attribute better satisfies the content element's relative viewing position attribute requirement. In such a scenario, the content element may be moved such that it is projected on the floor rather than the wall. In some embodiments, the relative viewing position attribute may be a depth or distance from the user. In some embodiments, the relative viewing position attribute may be relative position with respect to a user's current viewing position.

For the content elements and the surfaces, a color attribute indicates a color. For the content elements, the color attribute may indicate one or more colors, whether the colors can be changed, opacity, and the like. For the surfaces, the color attribute may indicate one or more colors, color gradients, and the like. The color attribute may be associated with readability and/or perception of the content elements/how the content elements will be perceived on the surfaces. In some embodiments, the content designer may define the color of the content element as, for example, a white or light color. In some embodiments, the content designer may not want to the system to change the color of the content element (e.g., a company's logo). In these embodiments, the system may change a background of the one or more surfaces on which the content element is displayed to create the necessary contrast for readability.

For the content elements and the surfaces, a contrast attribute indicates a contrast. For the content elements, the contrast attribute may indicate a current contrast, whether the contrast can be changes, direction as to how the contrast can be changed, and the like. For the surfaces, the contrast attribute may indicate a current contrast. The contrast preference attribute may be associated with readability and/or perception of the content elements/how the content elements will be perceived on the surfaces. In some embodiments, the content designer may want the content element to be displayed with a high contrast with respect to a background of the surface. For example, a version of the content element may be presented in a web page on a monitor of a computer, smartphone, tablet, etc., as white text on a black background. A white wall may be matched to display the text content element which is also white. In some embodiments, the system may change the text content element to a darker color (e.g., black) to provide contrast to satisfy the contrast attribute.

In some embodiments, the system may change a background color of the surface to provide color and/or contrast to satisfy the color and/or contrast attributes without changing the content element. The system may change the background color of the (real) surface by creating a virtual surface at the location of the (real) surface, where the color of the virtual surface is the desired background color. For example, if the colors of a logo should not be changed, the system may provide adequate contrast by changing a background color of the surface to provide a color contrast to satisfy the color and/or contrast preference attribute while preserving the logo.

For the content elements and the surfaces, the readability index attribute may indicate a readability metric. For the content elements, the readability index attribute indicates a readability metric that should be maintained for the content element. For the content elements, the system may use the readability index attribute to determine the priorities for other attributes. For example, the system may set the priorities for these attributes to "High" if the readability index as "High" for the content element. In some examples, even if the content element is in focus and there is adequate contrast, the system may scale the content element based on the readability index attribute to ensure the readability metric is maintained. In some embodiments, a high readability index attribute value for a particular content element may take precedent or priority over other explicit attributes for other content elements if the particular content element's priority is set to "High." For the surfaces, the readability index attribute may indicate how content elements including text will be perceived by the user if displayed on the surfaces.

Figure 3A:
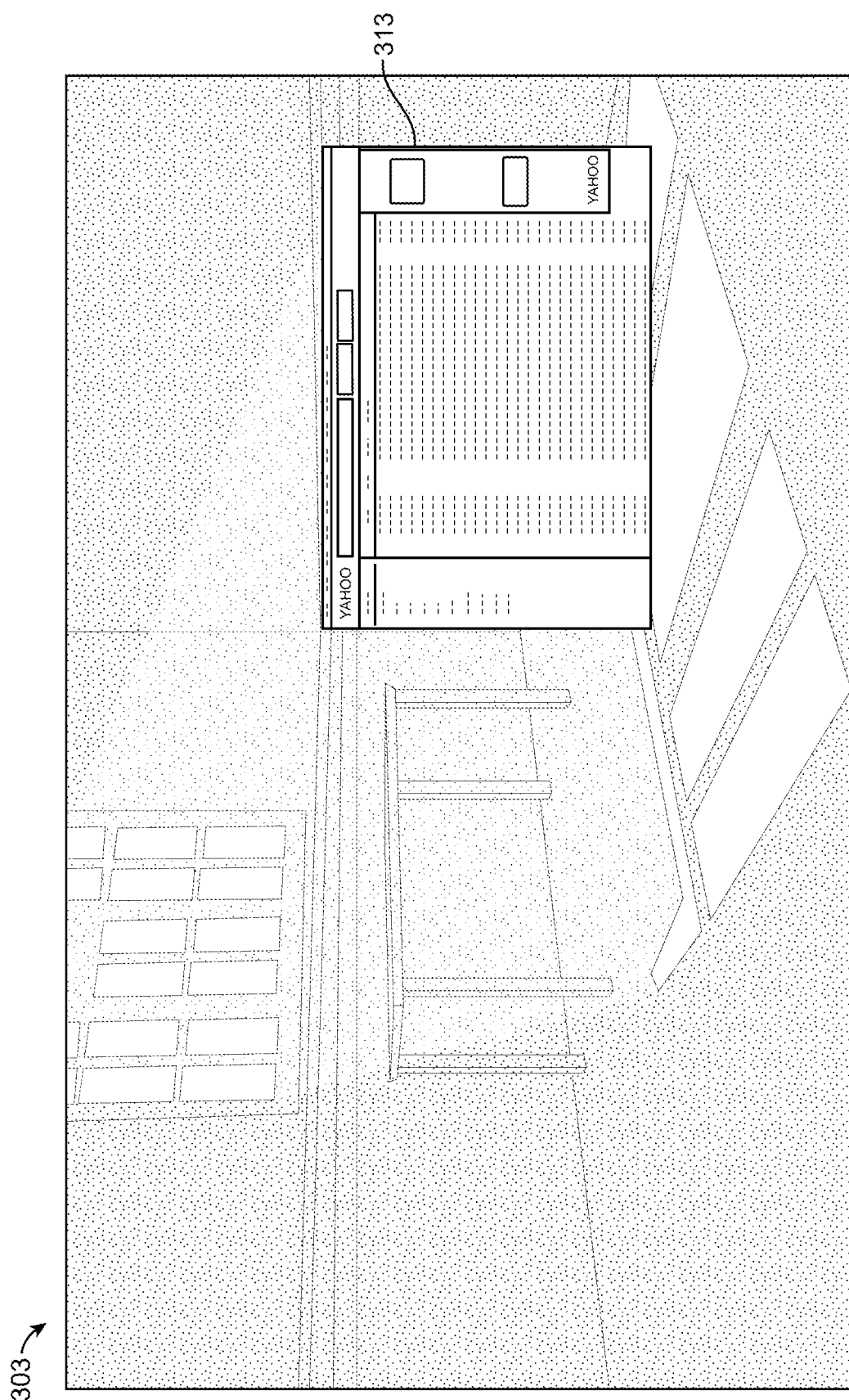
FIGS. 3A-3B illustrate examples of web content adjusted to light and color conditions, according to some embodiments.
Figure 3B:
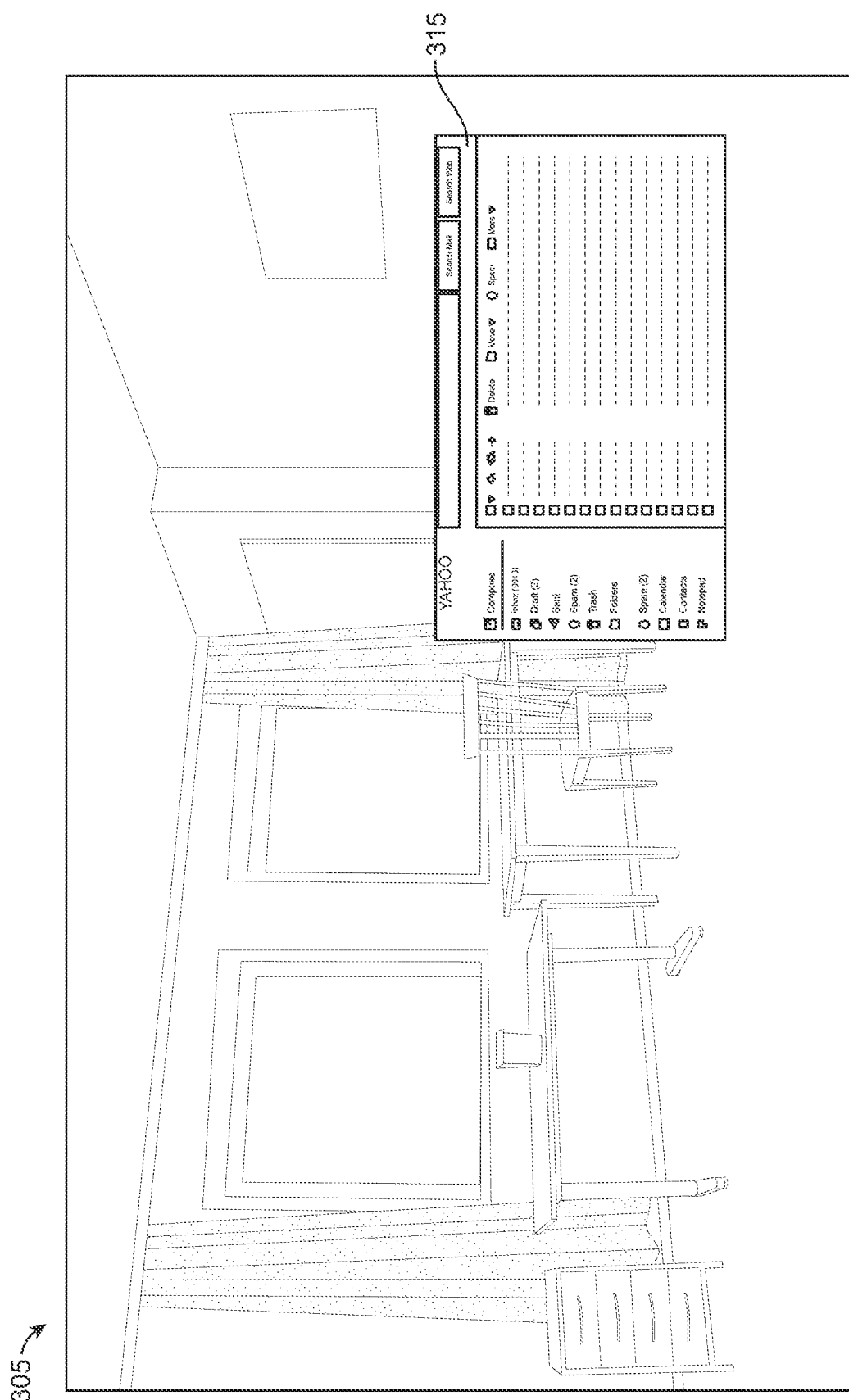

Text legibility is a hard problem to solve for pure VR environment. The problem gets even more complicated in an AR environment as the real-world color, brightness, lighting, reflections and other capabilities directly impact user capabilities to read text rendered by an AR device. For example, web content rendered by a web browser may be primarily text driven. As an example, a set of JavaScript API (e.g., via new extensions of present W3C Camera API) may provide content designers with a current world palette and a contrast alternate palette for font and background colors. The set of JavaScript API may provide a unique capability for content designers to adjust a web content color schema according to a real word color schema to improve content contrast and text legibility (e.g., readability). Content designers may use this information by setting the font color to provide better legibility for web content. These APIs may be used to track this information real time so the web page may adjust its contrast and color schema accordingly to the light changes of the environment. For example, FIG. 3A illustrates web content 313 being adjusted to light and color conditions of a dark real world environment by at least adjusting the text of web content 313 to be displayed in a light color scheme to be legible with respect to the dark real world environment. As illustrated in FIG. 3A, text in the web content 313 has a light color and background in the web content 313 has a dark color. FIG. 3B illustrates web content 315 being adjusted to light and color conditions of a bright real world environment by at least adjusting the text of web content 315 to be displayed in dark color scheme to be legible with respect to the bright real world environment. As illustrated in FIG. 3B, text in the web content 315 has a dark color and background in the web content 315 has a light color. One of ordinary skill in the art may appreciate other factors may also be adjusted such as, for example, a background color of the web content 313 (e.g. darker background and lighter text) or web content 315 (e.g., lighter background and darker text) to provide a contrast in color so that the text may be more legible based at least in part on the light and color conditions of the real world environment. In some embodiments, the user, as opposed to an attribute parser or content designer, may select a background color or adjust a background color based on preferred appearance, such as avoiding a pure white background for displaying text which may produce too much contrast or perceived artifacts. For example, responsive to a user input, a Javascript API may adjust a background color of content, and various associated features, such as text color of the content or color schemes of other content in the user's field of view may then adjust accordingly.

For content elements, the time attribute indicates how long the content element should be displayed. The time attribute may be short (e.g., less than 5 seconds), medium (e.g., between 5 seconds and 30 seconds), long (e.g., more than 30 seconds). In some embodiments, the time attribute may be infinite. If the time attribute is infinite, the content element may remain until dismissed and/or other another content element is loaded. In some embodiments, the time attribute may be a function of input. In one example, if the content element is an article, the time attribute may be a function of input indicating a user has reached the end of the article and remained there for a threshold period of time. In one example, if the content element is a video, the time attribute may be a function of input indicating a user has reached the end of the video.

For surfaces, the time attribute indicates how long the surface will be available. The time attribute may be short (e.g., less than 5 seconds), medium (e.g., between 5 seconds and 30 seconds), long (e.g., more than 30 seconds). In some embodiments, the time attribute may be infinite. In some embodiments, the time attribute may be a function of sensor input, for example, from the sensor(s) 162. The sensor input from the sensor(s) 162, for example from an IMU, an accelerometer, a gyroscope, and the like, may be used to predict availability of a surface relative to a field of view of the device. In one example, if a user is walking, surfaces near the user may have a short time attribute, surfaces a bit further from the user may have a medium time attribute, and surfaces off in the distance may have a long time attribute. In one example, if a user is sitting idle on a coach, a wall in front of the user may have an infinite time attribute until a change in data more than a threshold is received from the sensor(s) 162, after which the time attribute of the wall in front of the user may change from infinite to another value.

Content Element Attributes

The content elements may have attributes that are specific to the content elements, such as, for example, priority, type of surfaces, position type, margin, type of content and/or focus attributes. Further details regarding these attributes are provided below. One of ordinary skill in the art may appreciate that the content elements may have additional attributes.

A priority attribute indicates a priority value for a content element (e.g., a video, a picture, or text). A priority value may include a high, medium or low priority, a numerical value ranging from, for example, 0-100, and/or a required or not required indicator. In some embodiments, a priority value may be specified for the content element itself. In some embodiments, a priority value may be specified for specific attributes. For example, a readability index attribute for a content element may be set to high, indicating that a content designer has placed an emphasis on the readability of the content element.

A type of surfaces attribute or "surface type" attribute indicates a type of surface the content element should be matched to. The surface type attribute may be based on semantics such as whether or not certain content elements should be placed in certain locations and/or on certain surfaces. In some examples, the content designer may suggest to not display a particular content element over a window or a painting. In some examples, the content designer may suggest to always display the particular content element on the largest vertical surface substantially in front of the user.

A position type attribute indicates a position of the content element. The position type attribute may be dynamic or fixed. A dynamic position type may assume, for example, the content element is affixed to a user's hand such that when the user's hand moves, the content element dynamically moves along with the user's hand. A fixed position type assumes, for example, the content element is fixed relative to a surface, a specific position in the environment or virtual world relative to the user's body or head/view position, examples of which are described in more detail as follows.

There may also be different levels of the term "fixed" such as: (a) world fixed, (b) object/surface fixed, (c) body fixed, and (d) head fixed. For (a) world fixed, the content element is fixed relative to the world. For example, if the user moves around in the world, the content element does not move and stays fixed to a location relative to the world. For (b) object/surface fixed, the content element is fixed to an object or a surface such that if the object or surface is moved, the content element moves with the object or surface. For example, the content element may be fixed to a notepad that the user is holding. In this case, the content is object fixed to the surface of the notepad and moves along with the notepad accordingly. For (c) body fixed, the content element is fixed relative to the user's body. If the user moves their body, the content element moves with the user to maintain the fixed position relative to the user's body. For (d) head fixed, the content element is fixed relative to a user's head or pose. If the user rotates their head, the content element will move relative to the user's head movement. Also, if the user walks, the content element will also move relative to the user's head.

A margin (or padding) attribute indicates a margin around the content element. The margin attribute is a layout attribute that describes placement of content elements relative to other content elements. For example, the margin attribute represents a distance from the content element bounds to the nearest permissible bounds of another content element. In some embodiments, the distance is an x, y, z coordinate-based margin and may be measured from vertices of the content element bounds or other designated location; in some embodiments the distance is a polar coordinate-based margin, and may be measured from the center of the content element or other designated locations such as the vertices of the content element. In some embodiments, the margin attribute defines the distance from a content element to the actual content inside the content element. In some embodiments, such as for a decomposed content element, the margin attribute represents how much of a margin is to be maintained with respect to bounds of surfaces the decomposed content element is matched to, such that the margin serves as an offset between the content element and matched surface. In some embodiments, the margin attribute may be extracted from the content element itself.

A type of content attribute or "content type" attribute indicates a type for the content element. The content type may include a reference and/or a link to a corresponding media. For example, the content type attribute may specify the content element as an image, a video, a music file, a text file, a video image, a 3D image, a 3D model, a container content (e.g., any content that may be wrapped within a container), an advertisement, and/or a content designer defined rendering canvas (e.g., 2D canvas or 3D canvas). The content designer defined rendering canvas may include, for example, games, renderings, maps, data visualizations, and the like. An advertisement content type may include attributes that define when a user focuses or is in a vicinity of a particular content element, a sound or an advertisement should be presented to the user. The advertisement may be: (a) an audible such as a jingle, (b) a visual such as a video/image/text, and/or (c) a tactile indicator such as a vibration in a user's controller or headset, and the like.

A focus attribute indicates whether the content element should be in focus or not. In some embodiments, the focus may be a function of distance from the user and the surface on which the content element is displayed. If the focus attribute for the content element is set to always be in focus, then the system keeps the content element in focus no matter how far away the user may be from the content element. If the focus attribute for the content element is not specified, the system may take the content out of focus when the user is at a certain distance from the content element. This may depend on other attributes of the content element, such as, for example, the dimensions attribute, area attribute, relative viewing position attribute, and the like.

Surface Attributes

The surfaces may have attributes that are specific to the surfaces, such as, for example, surface contour, texture, and/or occupied attributes. Further details regarding these attributes are provided below. One of ordinary skill in the art may appreciate that the surfaces may have additional attributes.

In some embodiments, the environment parser 168 may determine surface contour attributes (and associated attributes) such as surface normal vectors, orientation vectors, and/or upright vectors for one and/or all surfaces. In the 3D case, a surface normal, or simply normal, to a surface at a point P is a vector that is perpendicular to a tangent plane to the surface at the point P. The term "normal" may also be used as an adjective; a line normal to a plane, the normal component to a force, the normal vector, and the like.

The surface normal vectors of the environment surfaces surrounding a user and at least one component of the head-pose vector, discussed above, may be important to the matching module 142 because although certain attributes (e.g., size, texture, aspect ratio, etc.) of surfaces may be ideal for displaying certain content elements (e.g., video, three-dimensional models, text, etc.), such surfaces may have poor positioning of the corresponding surface normal with respect to the user's line of sight as approximated by at least one component vector of the user's head-pose vector. By comparing surface normal vectors with the user's head-pose vector, surfaces that may otherwise be appropriate for displayed content may be disqualified or filtered.

For example, the surface normal vector of a surface may be in a substantially same direction as the user's head-pose vector. This means that the user and the surface are facing the same way rather than toward each other. For example, if the user's forward direction is facing north, a surface having a normal vector pointing north is either facing the back of the user, or the user is facing the back of the surface. If the user cannot see the surface because the surface is facing away from the user, that particular surface would not be an optimal surface for displaying content, despite otherwise beneficial attributes values for that surface that may be present.

A comparison between the forward-facing viewing vector of the device, which approximates the user's forward-facing viewing direction, and the surface normal vector may provide a numeric value. For example, a dot product function may be used to compare the two vectors and determine a numeric relationship that describes the relative angle between the two vectors. Such a calculation may result in a number between 1 and −1, with more negative values corresponding to relative angles that are more favorable for viewing because the surface is close to orthogonal to the user's forward-facing viewing direction such that a user would be able to comfortably see virtual content placed on that a surface. Therefore, based on surface normal vectors identified, characteristics for a good surface selection may be relative to a user's head-pose vector, or components thereof, such that the content should be displayed on a surface facing toward a user's forward-facing viewing vector. It will be appreciated that constraints may be placed on the acceptable relationship between the head-pose vector components and the surface normal components. For example, it may be selected that all surfaces that result in a negative dot product with a user's forward-facing viewing vector may be considered for content display. Depending on the content, a content provider or algorithm or user preference may be considered which affects the acceptable range. In instances where a video needs to be displayed substantially normal to the user's forward direction, a smaller range of dot product outputs may be allowed. One of skill in the art will appreciate that many design options are possible depending on other surface attributes, user preferences, content attributes, and the like.

In some embodiments, a surface may be a great fit from a size and location and head-pose perspective, but the surface may not be a good option for selection because the surface may include attributes such as a texture attribute and/or an occupied attribute. A texture attribute may include a material and/or a design that may change a simple appearance of a clean and clear surface for presenting to a cluttered surface that is not ideal for presentation. For example, a brick wall may have large empty area ideal for displaying content. However, because of the red stacked bricks in a brick wall, the system may view the brick wall undesirable for displaying content directly onto. This is because the texture of the surface has a roughness variation as between the brick and mortar and a non-neutral red color that may induce stronger contrast complications with content. Another undesirable texture example may include a surface having a wall paper design, not only for the background design pattern and colors, but imperfections such as air bubbles or uneven application creating surface roughness variations. In some embodiments, the wall paper design may include so many patterns and/or colors that displaying content directly on the wall paper may not display the content in a favorable view. The occupied attribute may indicate that the surface is currently occupied by another content such that displaying additional content at the particular surface having a value that indicates the surface is occupied may result in the new content not being displayed over the occupying content, or vice versa. In some embodiments, the occupied attribute notes the presence of small real world flaws or objects occupying the surface. Such occupying real world objects may include items of negligible surface area (such as cracks, or nails) that may be indiscernible to a depth sensor within sensor suite 162, but noticeable by cameras within sensors 162. Other occupying real world objects may include pictures or posters hanging from walls that have low texture variation with the surface disposed on, and may not be distinguished by some sensors 162 as being different than the surface, but cameras of sensor suite 162 may recognize and the occupied attribute updates the surface accordingly to precluding a determination by the system the surface is an "empty canvas."

In some embodiments, the content may be displayed on a virtual surface whose relative position is related to the (real) surface. For example, if the texture attribute indicates the surface is not simple/clean and/or of the occupied attribute indicates the surface is occupied, the content may be displayed on a virtual surface that is in front of the (real) surface, for example within a margin attribute tolerance. In some embodiments, a margin attribute for a content element is a function of a texture attribute and/or occupied attribute of a surface.

Flows

Matching Content Elements to Surfaces (High Level)

Figure 4:
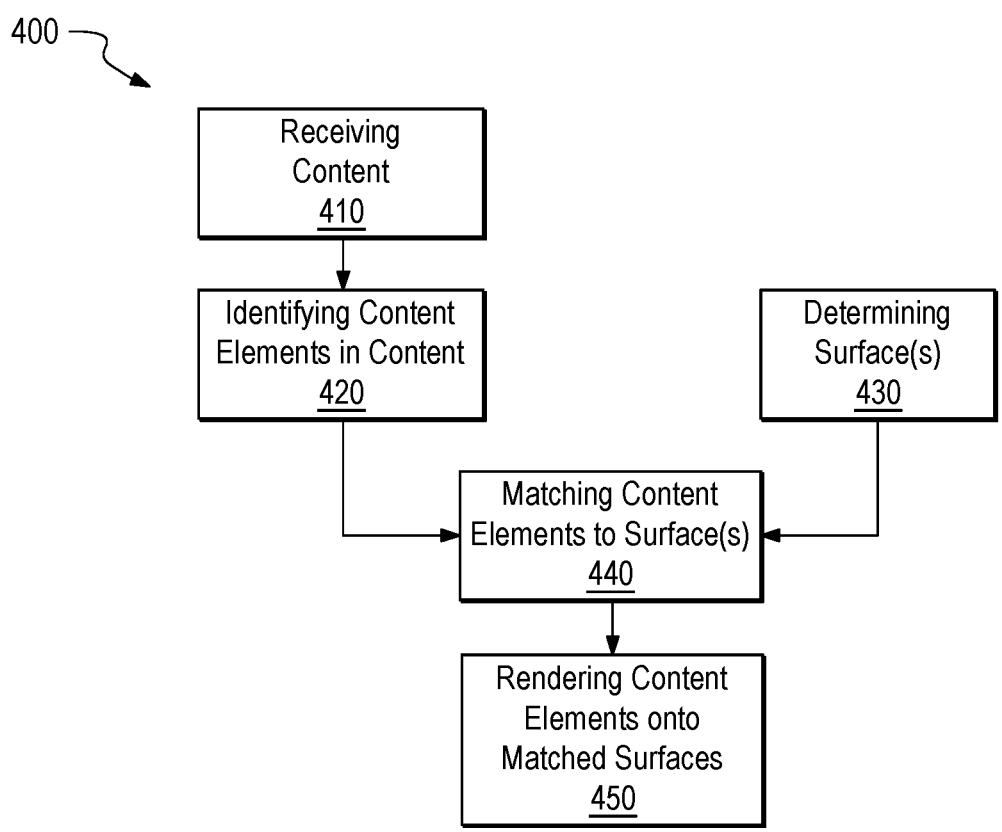
FIG. 4 is a flow diagram illustrating a method for matching content elements to surfaces to be displayed in a 3D environment, according to some embodiments.

FIG. 4 is a flow diagram illustrating a method for matching content elements to surfaces, according to some embodiments. The method includes receiving content at 410, identifying content elements in the content at 420, determining surfaces at 430, matching content elements in surfaces at 440, and rendering content elements as virtual content onto matched surfaces at 450. The parser 115 receives 410 content 110. The parser 115 identifies 420 content elements in the content 110. The parser 115 may identify/determine and store attributes for each of the content elements. The environment parser 168 determines 430 surfaces in the environment. The environment parser 168 may determine and store attributes for each of the surfaces. In some embodiments, the environment parser 168 continuously determines 430 surfaces in the environment. In some embodiments, the environment parser 168 determines 430 surfaces in the environment as the parser 115 receives 410 content 110 and/or identifies 420 content elements in the content 110. The matching module 142 matches 440 the content elements to the surfaces based on the attributes of the content elements and the attributes of the surfaces. The rendering module 146 renders 450 the content elements to their matched surfaces. Storage module 152 registers surfaces for future use, such as by user designation to place content elements on that surface in the future. In some embodiments, the storage module 152 may be in a perception framework 166.

Identifying Content Elements in Content

Figure 5:
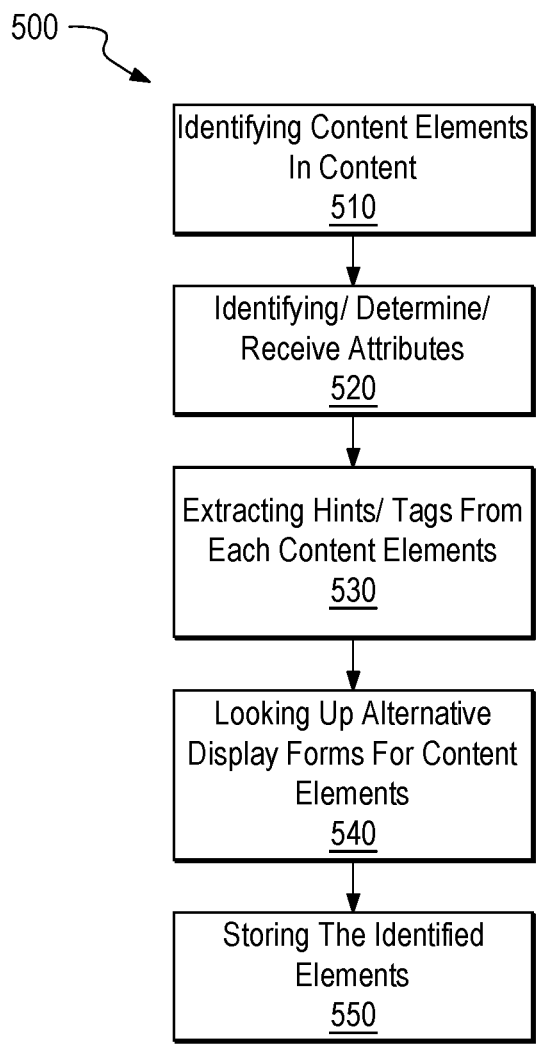
FIG. 5 is a flow diagram illustrating a method for identifying elements in content, according to some embodiments.

FIG. 5 is a flow diagram illustrating a method for identifying content elements in content, according to some embodiments. FIG. 5 is a detailed flow disclosing identifying elements in the content at 420 of FIG. 4, according to some embodiment. The method includes identifying content elements within content at 510, similar to identifying elements in the content at 420 of FIG. 4. The method proceeds to the next step of identifying/determining attributes 520. For example, the attributes may be identified/determined from tags pertaining to placement of content. For example, a content designer, while designing and configuring content, may define where and how to display content elements using attributes (described above). The attributes may pertain to placement of the content elements in particular places with respect to one-another. In some embodiments, the step of identifying/determining attributes 520 may include inferring attributes. For example, the attributes of each of the content elements may be determined or inferred based on placement of the content elements within the content relative to one another. Extracting hints/tags from each content element is performed at 530. The hints or tags may be formatting hints or formatting tags that are provided by the content designer of the content. Looking up/searching alternative display forms for the content elements is performed at 540. Certain formatting rules may be specified for content elements displayed on a particular viewing device. For example, certain formatting rules may be specified for an image on a web page. The system may access the alternative display forms. Storing the identified content elements is performed at 550. The method may store the identified elements into a non-transitory storage medium to be used in the environment compositing process 140 to match the content elements to the surfaces. In some embodiments, the content elements may be stored in a transitory storage medium.

Determining Surfaces in an Environment

Figure 6:
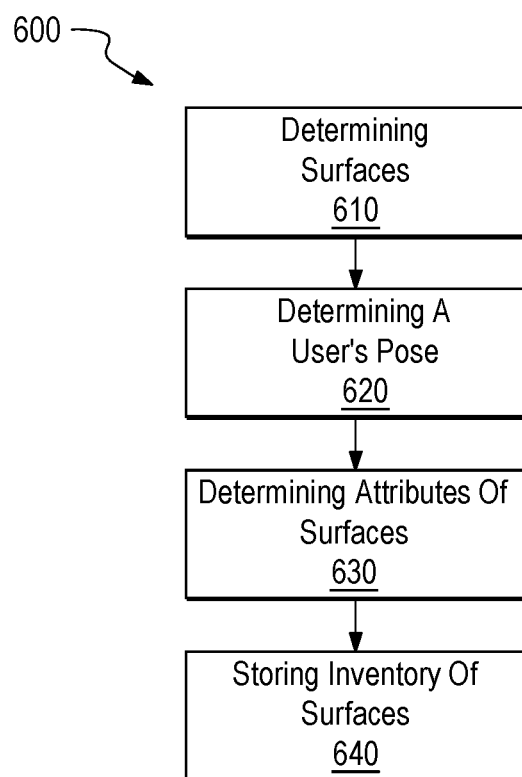
FIG. 6 is a flow diagram illustrating a method for determining surfaces from a user's environment, according to some embodiments.

FIG. 6 is a flow diagram illustrating a method for determining surfaces from a user's environment, according to some embodiments. FIG. 6 is an example detailed flow disclosing the determining surfaces at 430 of FIG. 4. FIG. 6 begins with determining surfaces at 610. Determining surfaces at 610 may comprise collecting depth information of the environment from a depth sensor of sensors 162 and performing a reconstruction and/or surface analysis. In some embodiments, sensors 162 provide a map of points, and system 100 reconstructs a series of connected vertices among the points to create a virtual mesh representative of the environment. In some embodiments, plane extraction or analysis is performed to determine mesh properties indicative of a common surface or interpretation of what a surface may be (e.g. a wall, a ceiling, etc.) The method proceeds to the next step of determining a user's pose at 620, which may include determining a head-pose vector from sensors 162. In some embodiments, sensors 162 collect inertial measurement unit (IMU) data to determine rotation of a device on a user; in some embodiments sensors 162 collect camera images to determine a position of the device on the user relative to the real world. In some embodiments, a head-pose vector is derived from one or both of the IMU and camera image data. Determining the user's pose at 620 is an important step to identifying surfaces because the user's pose will provide perspective for the user in relation to the surfaces. At 630, the method determines attributes of the surfaces. Each surface is tagged and categorized with corresponding attributes. This information will be used when matching the content elements and the surfaces. In some embodiments, the sensor(s) 162, from FIG. 1, provide raw data to the CVPU 164 for processing, and the CVPU 164 provides the processed data to the perception framework 166 for preparing the data for the environment parser 168. The environment parser 168 parses the environment data from the perception framework 166 to determine surfaces in the environment and the corresponding attributes. At 640, the method stores an inventory of the surfaces into a non-transitory storage medium to be used by a compositing process/matching/mapping routine to match/map the extracted elements to particular surfaces. The non-transitory storage medium may include a data storage device. The determined surfaces may be stored in a particular table such as the table disclosed in FIG. 15 described below. In some embodiments, the identified surfaces may be stored in a transitory storage medium. In some embodiments, storing at 640 comprises designating a surface as a preferred surface for future matching of content elements.

Matching Content Elements to Surfaces (Specifics)

Figure 7A:
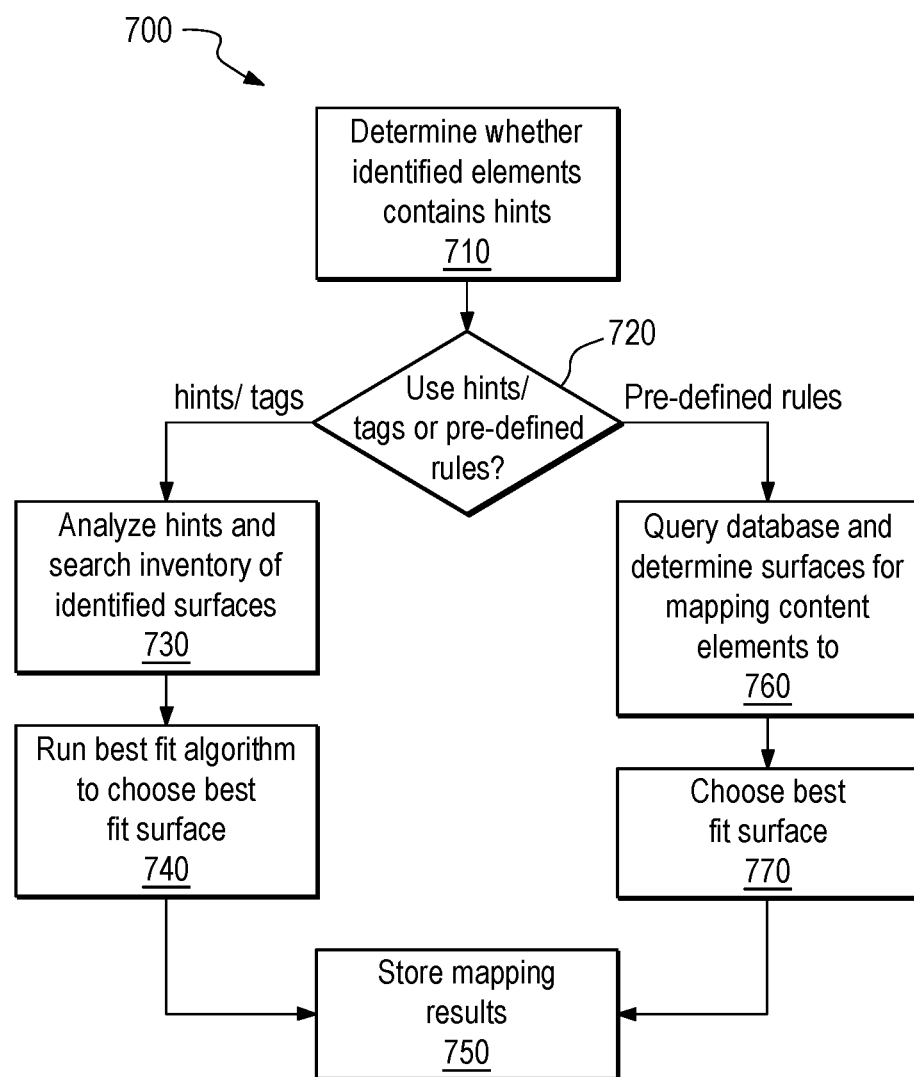
FIGS. 7A-7B are flow diagrams illustrating various methods for matching elements from content to surfaces, according to some embodiments.
Figure 7B:
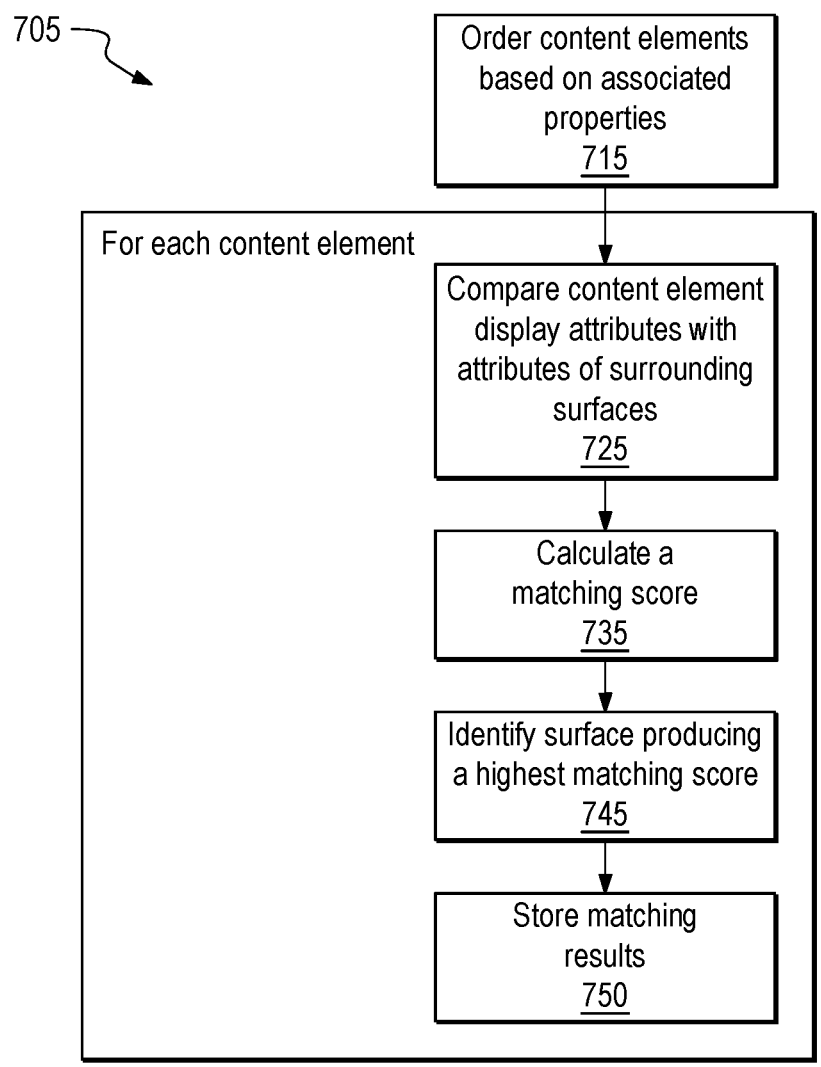

FIGS. 7A-7B are flow diagrams illustrating various methods for matching content elements to surfaces.

FIG. 7A depicts a flow diagram illustrating a method for matching content elements to surfaces, according to some embodiments. FIG. 7A is a detailed flow disclosing the matching of the content elements to the surfaces at 440 of FIG. 4.

At 710, the method determines whether an identified content element contains hints provided by the content designer. The content designer may provide hints as to where to best display the content element.

In some embodiments, this may be accomplished by using existing tag elements (e.g., HTML tag elements) to further define how the content element may be displayed if a 3D environment is available. As another example, the content designer may provide a hint that states that a 3D image is available instead of a 2D image as a resource for a particular content element. For example, in the case of the 2D image, the content designer may, in addition to providing the basic tags to identify the resource for the content element, provide other infrequently used tags to identify the resource including the 3D image corresponding to the 2D image and, in addition, provide a hint that if the 3D image is used, to display it prominently in front of the user's view. In some embodiments, the content designer may provide this additional 'hint' to the resource for the 2D image just in case display device rendering the content may not have 3D displaying functionalities to leverage the 3D image.

At 720, the method determines whether to use hints provided by the content designer or to use pre-defined sets of rules to match/map the content elements to the surfaces. In some embodiments, where there are no hints provided by the content designer for a particular content element, the system and method may determine, using the pre-defined sets of rules, the best way to match/map the particular content element to the surfaces. In some embodiments, even when there may be hints for the content element provided by the content designer, the system and method may determine that it may be best to use the pre-defined sets of rules to match/map the content elements to the surfaces. For example, if a content provider provides a hint to display video content on a horizontal surface, but the system is set for a pre-defined rule to display video content on a vertical surface, the pre-defined rule may override the hint. In some embodiments, the system and method may determine that the hints provided by the content designer are sufficient and thus use the hints to match/map the content elements to the surfaces. In the end, it is the ultimate decision of the system that determines whether to use hints provided by the content designer or to use pre-defined rules to match/map the content elements to the surfaces.

At 730, if the system utilizes the hints provided by the content designer, the system and method analyze the hints and searches the logical structures including identified surrounding surfaces that may be used to display the particular content element based at least in part on the hint.

At 740, the system and method run a best-fit algorithm to choose a best-fit surface for the particular content element based on the provided hints. The best-fit algorithm, for example, may take a hint for a particular content element suggesting a direct view and try to identify surfaces that are front and center with respect to the user's current field of view.

At 750, the system and method store the matching results having matchings of content elements to surfaces. The table may be stored in a non-transitory storage medium to be used by a display algorithm to display the content elements onto their respectively matched/mapped surfaces.

FIG. 7B depicts a flow diagram illustrating a method for matching/mapping elements from content elements to surfaces, according to some embodiments. FIG. 7B is a flow illustrating the matching/mapping of content elements stored in logical structures to surfaces stored in logical structures as disclosed at step 440 of FIG. 4 with references to various elements of FIG. 1.

At 715, the content elements stored in the logical structures resulting from the content structurization process 120 from FIG. 1 are ordered based on associated priorities. In some embodiments, a content designer may define priority attributes for each content element. It may be beneficial for the content designer to set a priority for each content element to ensure that certain content elements are displayed prominently within an environment. In some embodiments, the content structurization process 120 may determine a priority for a content element, for example, if the content designer did not define a priority for the content element. In some embodiments, the system will make a dot product relationship of surface orientation the default priority attribute if no the content element has no developer-provided priority attributes.

At 725, the attributes of the content elements are compared to the attributes of the surfaces to identify whether there are surfaces that match content elements and determine the best matching surface. For example, starting with the content element with the highest associated priority (for example, "main" or parent element ID as described in further detail below with respect to FIG. 14A), the system may compare the attributes of the content element to the attributes of the surfaces to identify the best matching surface, and then proceed to the content element with the second highest associated priority and so on, and thus traverse the logical structures including the content elements serially.

At 735, a matching score is calculated based on how well the attributes of a content element match the attributes of a corresponding best matching surface. One of ordinary skill in the art may appreciate many different scoring algorithms and models may be used to calculate a matching score. For example, in some embodiments, the score is a simple summation of attribute values of the content element with the attribute value of the surface. FIG. 8 illustrates various matching score methodologies.

FIG. 8 depicts three hypothetical content elements and three hypothetical surfaces with attributes as may be in a logical structure, described in further detail below in FIGS. 14A-14B. Element A may have a preference for dot product orientation surface relationships more heavily for surface selection than texture or color; Element B may have a preference for a smooth texture but is multicolored content and has less contrast constraints and does not prioritize color; Element C may be a virtual painting and may have a preference for the color attribute higher than other attributes. One of skill in the art will appreciate that a value in the content element structure may reflect the content itself (e.g. Element C weights color high), or reflects a desired surface attribute (e.g. Element B prefers smoother surfaces to render to). Further, though depicted as numerical values, other attributes values are of course possible, such as explicit color(s) in a color field or precise size or position in a room/to a user.

At 745, a surface having the highest matching score is identified. Returning to the summation example illustrated in FIG. 8, Element A scores highest with surfaces A and C, Element B scores highest with surface B, and Element C scores highest with surface C. In such an illustrative example, the system may render Element A to surface A, Element B to surface B, and Element C to surface C. Element A scored equally well with surface A and C, but Element C's highest score with surface C prompts assignment of Element A to surface A. In other words, the system may iterate a second summation of matched scores to determine the combination of content elements and surfaces that produces the highest aggregate matching score. It should be noted that the sample numbers for dot product in FIG. 8 reflect attribute value rather than objective measurement; for example, a −1 dot product result is a favorable mathematical relationship, but to avoid introducing negative numbers into the equation the surface attribute scores the −1 dot product relationship as a positive 1 for surface attribute.

In some embodiments, identification of highest scores at 745 is by either marking the surface having the highest matching score as the surface list is being evaluated and unmarking a previously marked surface, or by keeping track of the highest matching score and a link to the surface having the highest matching score, or by keeping track of the highest matching score of all content elements matched to a surface. In one embodiment, once a surface with a sufficient matching score is identified, it may be removed from the surface list and thus excluded from further processing. In one embodiment, once a surface having a highest matching score is identified, it may remain in the surface list with an indication that it has been matched to a content element. In this embodiment, several surfaces may be matched with a single content element and a match score for each may be stored.

In some embodiments, as each surface from the surrounding surfaces list is evaluated a matching score is calculated one by one, a match is determined (e.g., 80% or greater of listed attributes of a content element is supported by a surface constitutes a match) and if so, mark the respective surface as the best match and continue on to the next surface and if the next surface is a better match, then mark that one as the best match. Once all surfaces have been evaluated for the content element, the surface still marked as the best match is the best match given the surfaces. In some embodiments, the highest matching score may need to be greater than a predefined threshold to qualify as a good match. For example, if it is determined that the best match surface is only a 40% match (either by number of supported attributes, or by percent of a target matching score), and the threshold to qualify as a good match is above 75%, then it may be best to create a virtual object to display the content element onto as opposed to relying on a surface from the user's environment. This may be particular true when the user's environment is, for example, the beach with no identifiable surfaces other than the beach, the ocean and the sky. One of ordinary skill in the art may appreciate there are many different matching/mapping algorithms that may be defined for this process and that this is just one example of many different types of algorithms.

At 750, the matching/mapping results are stored as disclosed above. In one embodiment, if a surface was removed from the surface list at 745, then the stored matching may be considered final. In one embodiment, if a surface remained in the surface list at 745 and several surfaces matched to a single content element, an algorithm may be run on conflicting content elements and surfaces to disambiguate conflicts and have a one-to-one matching instead of a one-to-many matching or a many-to-one matching. If a high priority content element is not matched to a surface, the high priority content element may be matched/mapped to a virtual surface. If a low priority content element is not matched to a surface, the rendering module 146 may choose to not render the low priority content element. The matching results may be stored in a particular table such as the table disclosed in FIG. 18, described below.

Referring back to FIG. 7A, at 760, assuming it was determined that using the predefined rules is the way to proceed, the method queries a database containing matching rules of content elements to surfaces and determines for a particular content element, which types of surfaces should be considered for matching the content element to. At 770, the pre-defined sets of rules may run a best-fit algorithm to choose from one or more surfaces from the available candidate surfaces, which are the best fit for the content element. Based at least in part on the best-fit algorithm, it is determined that the content element should be matched/mapped to a particular surface because of all of the candidate surfaces, the particular is a surface whose attributes match best with attributes of the content element. Once the matching of the content elements and surfaces are determined, at 750 the method stores the matching results for the content elements to the surfaces in a table in a non-transitory storage medium as described above.

In some embodiments, a user may override the surface that was matched. For example, a user may choose where to override the surface to display the content, even when the surface is determined to be an optimal surface for the content by the matching algorithm. In some embodiments, the user may select a surface from one or more surface options provided by the system, wherein the one or more surface options may include surfaces that are less than optimal surfaces. The system may present the user with one or more display surface options, wherein display surface options may include physical surfaces within the user's physical environment, virtual surfaces for displaying the content in the user's physical environment, and/or virtual screens. In some embodiments, a stored screen (e.g., virtual screen) may be selected by the user to display the content. For example, for a particular physical environment that a user is currently situated, the user may have a preference to display certain types of content (e.g., videos) on certain types of surfaces (e.g., a stored screen having a default screen size, location from the user, etc.). The stored screen may be a historically frequently used surface or the stored screen may be a stored screen identified in a user's profile or preference setting for displaying certain types of content. Therefore, overriding the displaying of the one or more elements onto the one or more surfaces may be based at least in part on a historically frequently used surface and/or a stored screen.

Figure 7C:
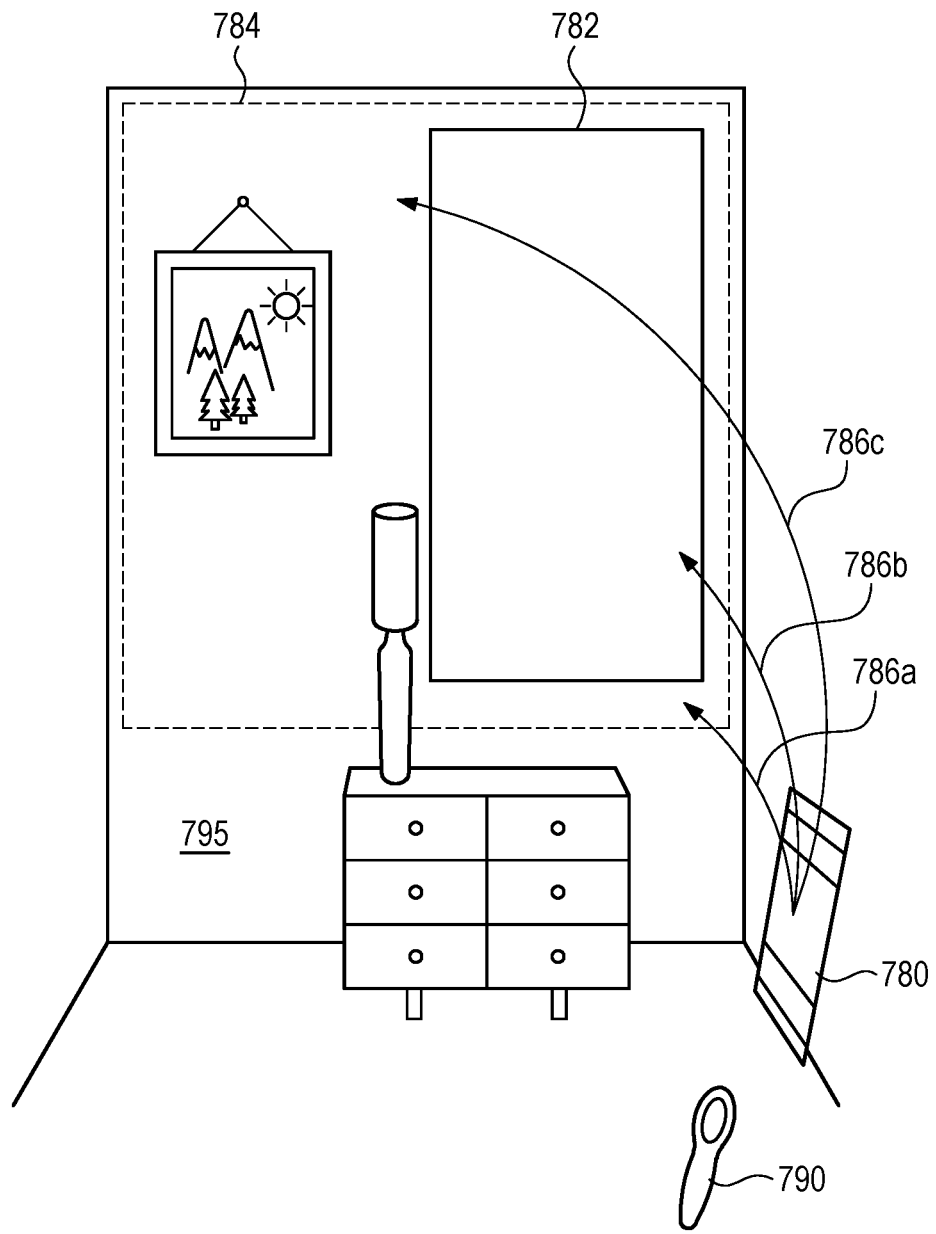
FIG. 7C illustrates an example of a user moving content to a working area where the content is subsequently displayed in a display surface, according to some embodiments.

FIG. 7C illustrates an example where a user may be able to move content 780 from a first surface onto any surface that is available to the user. For example, the user may be able to move the content 780 from the first surface onto a second surface (i.e., a vertical wall 795). The vertical wall 795 may have a working area 784. The working area 784 of the vertical wall 795 may be determined by, for example, the environment parser 168. The working area 784 may have a display surface 782 where content 780 may be displayed, for example, unobstructed by other content/objects. The display surface 782 may be determined by, for example, the environment parser 168. In the example illustrated in FIG. 7C, the working area 784 includes a picture frame and a lamp which may make a display surface of the working area 784 smaller than the entire working area 784, as illustrated by the display surface 782. The movement of the content to the vertical wall 795 (e.g., movements 786a-786c) may not have to be a perfect placement of the content 780 into the center of the display surface 782, the working area 784, and/or to the vertical wall 795. Instead, the content may be moved within at least a portion of a peripheral working space of the vertical wall 795 (e.g., the working area 784 and/or the display surface 782) based on a gesture of the user to move the content to the vertical wall. As long as the content 780 falls within the vertical wall 795, the working area 784, and/or the display surface 782, the system will display the content 780 in the display surface 782.

In some embodiments, the peripheral working space is an abstract boundary that envelops the target display surface (e.g. the display surface 782). In some embodiments, the gesture of the user may be a selection by a totem/controller 790 to select the content 780 at the first surface and move the content 780 such that at least a portion is within the peripheral working space of the display surface 782. The content 780 may then align to the contours and orientation of the display surface 782. Selecting virtual content is further described in U.S. patent application Ser. No. 15/296,869, claiming priority to Oct. 20, 2015, entitled, "SELECTING VIRTUAL OBJECTS IN A THREE-DIMENSIONAL SPACE" and aligning content to selected surfaces is further described in U.S. patent application Ser. No. 15/673,135, claiming priority to Aug. 11, 2016, entitled, "AUTOMATIC PLACEMENT OF A VIRTUAL OBJECT IN A THREE-DIMENSIONAL SPACE," the contents of each are hereby incorporated by reference.

In some embodiments, the gesture of the user may be a hand gesture that may include an indication of (a) selection of the content from a first surface, (b) movement of the content from the first surface to a second surface, and (c) placing the content at the second surface. In some embodiments, the movement of the content from the first surface to a second surface is to a specific portion of the second surface. In some embodiments, the content when placed at the second surface fits/fills (e.g., scale to fit, fill, etc.) the second surface. In some embodiments, the content placed at the second surface maintains the size it was when at the first surface. In these embodiments, the second surface may be larger than the first surface and/or the second surface may be larger than the size needed to display the content. The AR system may display the content at the second surface at or near the position that the user indicated to display the content. In other words, the movement of the content from the first surface to the second surface may not require the system to perfectly place the content into an entire workable space of the second surface. The content may only have to at least end up in a first peripheral area of the second surface that is at least viewable by the user.

Environment Driven Content

What has been disclosed thus far has been content driving where to display content elements in an environment. In other words, the user may be selecting various content (e.g., pulled content from a web page) to be displayed into the user's environment. However, in some embodiments, the environment may drive what content is displayed to the user based at least in part on the environment of the user and/or surfaces in the environment. For example, a list of surfaces is constantly being evaluated by the environment parser 168 based on the data from the sensors 162. Because the list of surfaces is constantly being evaluated by the environment parser 168 as the user moves from one environment to another or moves about within the environment, new/additional surfaces may become available that may be amenable to displaying certain types of content that may be pushed (e.g., pushed content) into the user's environment without the user having to search for or select on the content, and may not originate from a web page. For example, certain types of push content may include (a) notifications from various applications such as stocks notification, newsfeeds, (b) prioritized content such as, for example, updates and notifications from social media applications, email updates, and the like, and/or (c) advertisements targeting broad target groups and/or specific target groups, and the like. Each of these types of push content may have associated attributes, such as, for example, size, dimension, orientation, and the like, in order to display the advertisement in its most effective form. Depending on the environment, certain surfaces may present an opportunity to have these environmental driven content (e.g., push content) displayed. In some embodiments, pulled content may first be matched/mapped to the surfaces in the environment, and pushed content may be matched/mapped to any surfaces in the environment that do not have pulled content matched/mapped thereto.

Taking advertisements as an example of a push content type, consider a scenario where a user is in an environment where there may be many surfaces having various dimensions and orientations. Certain advertisements may be best displayed on surfaces having certain dimensions and orientations, as well as in particular locations (e.g., geographic locations such as at home, at work, at a ballpark, at a grocery store, and the like, and item locations such as in front of certain physical items/products in the environment). In these situations, the system may search through a database of push content to determine which push content may best be matched with the surfaces of the environment. If a match is found, the content may be displayed on the matched surface in the particular location. In some embodiments, the system provides a list of surfaces to an ad server which uses built-in logic to determine pushed content.

Unlike traditional online advertisements which rely on a layout of a web page that a user is viewing to determine what portions on the web page window has available space for online advertisements to be displayed, the present disclosure includes the environment parser 168 that identifies surfaces within the environment and determine candidate surfaces for certain push content such as, for example, advertisements.

In some embodiments, a user may dictate a preference attribute for when and where certain types of push content may be displayed. For example, a user may indicate a preference attribute having high priority content from certain people or organizations be prominently displayed on a surface in front of the user, while other types of push content such as advertisements are to be displayed on smaller surfaces peripheral to the user's primary focus view area, wherein the user's primary focus view area is an area of view that is generally forward toward the direction the user is viewing, as opposed to a peripheral view which is to the side of the user's primary focus view area. In some embodiments, high priority content elements that a user selects (e.g., pulled content, as opposed to pushed content) are displayed on the most prominent surfaces in the user's environment (e.g., within the user's focal viewing area), while other unmatched/unmapped surfaces that are peripheral to the user's focal viewing area may be available for pushed content.

In some embodiments, a world location context API may be provided to content designers/web developers/advertisers to create location aware content. The world location context API may provide a set of capabilities describing a local context specific to a particular location the user is currently in. The world location context API may provide location context information that may include identification of specific kinds of rooms (e.g., living room, gym, office, kitchen), specific queries executed by the user from various locations (e.g., the user tends to search movies from the living room, music from the gym, recipes from the kitchen, etc.) and specific services and applications used by the user various locations (e.g., Mail client is used from the office and Netflix is used from the living room). The content designer may associate certain actions with respect to world location context as an attribute of a content element.

Figure 9:
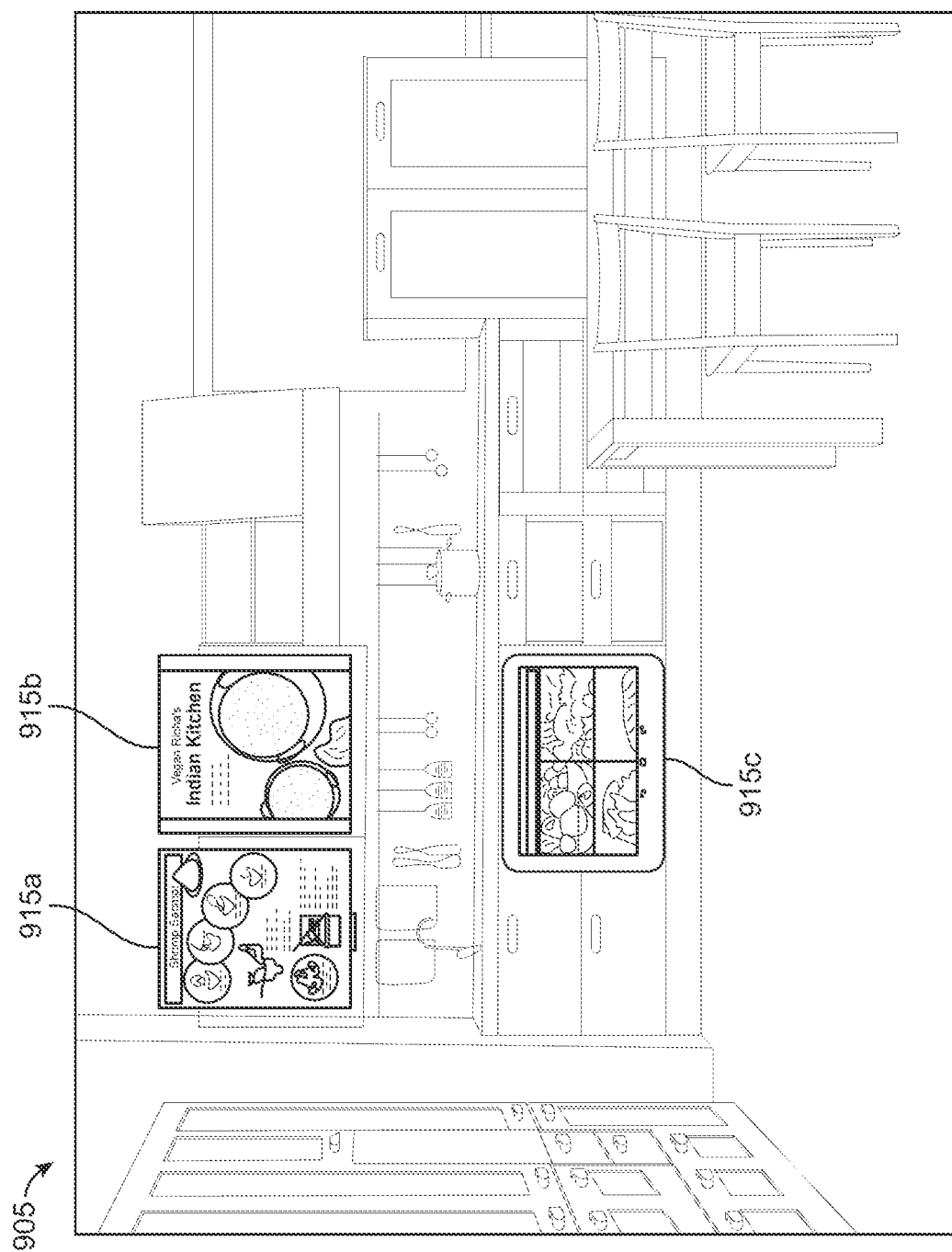
FIG. 9 illustrates an example of a world location context API offering location specific context, according to some embodiments.

Content providers may use this information together with search history, object recognizers and application data to offer location specific content. For example, if a user runs a search in a kitchen, the advertisements and the search results will be primarily food related because the search engine will know the user is running the search from the user's kitchen. The information provided by the world location context API may provide accurate per room or per location, which makes it more accurate than Geolocation and more context aware than Geofencing. FIG. 9 is an example of how a world location context API may be used to offer location specific context. As an example, a user's kitchen 905 may include location specific content 915*a*, 915*b*, and/or 915*c* displayed on certain surfaces within a user's current physical location. Content 915*a* may be a recipe for a particular meal, content 915*b* may be an advertisement of a meal, and/or 915*c* may be suggestions of meals to prepare in the kitchen.

Figure 10:
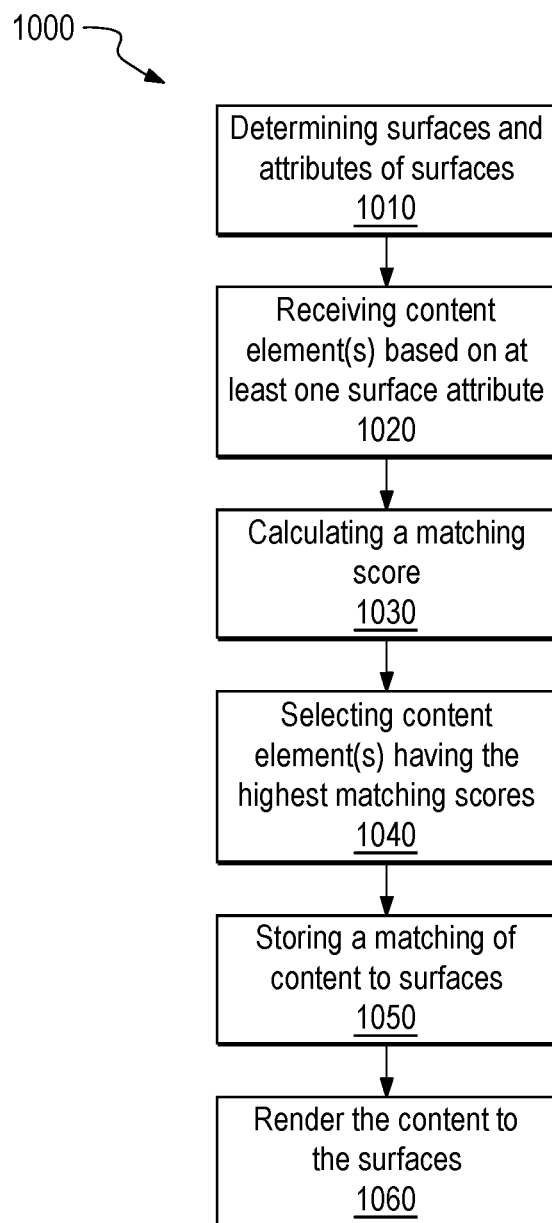
FIG. 10 is a flow diagram illustrating a method for pushing content to a user of a VR/AR system, according to some embodiments.

FIG. 10 is an example of a method 1000 for pushing content to a user of a VR/AR system. At 1010, one or more surfaces and their attributes are determined. The one or more surfaces may be determined from the environment structurization process 160 wherein the environment parser 168 parses environment data to determine surfaces in the environment, and organizes and stores the surfaces in logical structures. The environment of the user may carry a location attribute for a surface, such as personal residence of the user, specific room within a residence, a work location of the user, and the like. One or more surfaces may be peripheral to a focal view area of the user. In some embodiments, one or more surfaces may be within the focal view area of the user, depending on the push content that the user may want to be notified with (e.g., emergency notifications from authoritative entities, whitelisted applications/notifications, etc.). A dimension of the surfaces may be a 2D and/or 3D dimension.

At 1020, one or more content elements that match the one or more surfaces are received. In some embodiments, receiving content elements or a single content element is based on at least one surface attribute. For example, a location attribute of "kitchen" may prompt content elements corresponding to food items to be pushed. In another example, a user may be watching a first content element on a first surface, and that content element has a child content element that will only display on a second surface if a surface with certain surface attributes is available.

At 1030, a matching score is calculated based on how well the attributes of the content elements match the attributes of the surfaces. In some embodiments, the scoring may be based on a scale of 1-100 where a score of 100 is the highest score and a score of 1 is the lowest score. One of ordinary skill in the art may appreciate many different scoring algorithms and models may be used to calculate a matching score. In some embodiments, wherein the content elements include notifications, the matching score calculated based on attributes may indicate a priority of the content element that needs to be notified as opposed to a match with a particular surface. For example, when the content element is a notification from a social media application, the score may be based on the priority level of the notification as defined by the user in the user's social media account, as opposed to a matching score based on the attributes of the social media content and the attributes of the surface.

In some embodiments, when the user is relatively stationary in their environment, the list of surfaces may not change much. However, when the user is in motion, the list of surfaces may change quite rapidly, depending on the speed the user is traveling. In dynamic situations, a low matching score may be calculated if it is determined that the user may not be stationary long enough to be able to completely view the content. This determination of whether the user has enough time to view the entire content may be an attribute that is defined by a content designer.

At 1040, content elements having the highest matching score are selected. When there are competing content elements that would like to be displayed to a user (e.g., advertisements), there may be a requirement to sort through the competing content and pick a preferred content element. Here, one option, as an example, for selecting a preferred content element is to base the competition on how well the attributes of the content element match the attributes of the surfaces. As another example, a winner may be selected based at least in part on an amount of money the content element provider may be willing to pay for displaying the pushed content. In some embodiments, a preferred content element may be selected based on content type (e.g., 3D content or a notification from a social media contact).

At 1050, a matching/mapping of the preferred content to a corresponding surface may be stored in a cache memory or a persistent memory. The storing of the matching may be important because in situations when a user is in motion and the environment changes, it may be important to be able to maintain some history of the user's environment upon the user's return. The matching/mapping may be stored in a table such as the table disclosed in FIG. 18. At 1060, the content is rendered on the corresponding surfaces. The matching may be a one-to-one or one-to-many matching/mapping of content elements to surfaces.

What has been disclosed is a system and methods for deconstructing content for displaying in an environment. Additionally, the system and methods may also push content to surfaces of a user of a virtual reality or augmented reality system.

Examples

Web Page

Figure 11:
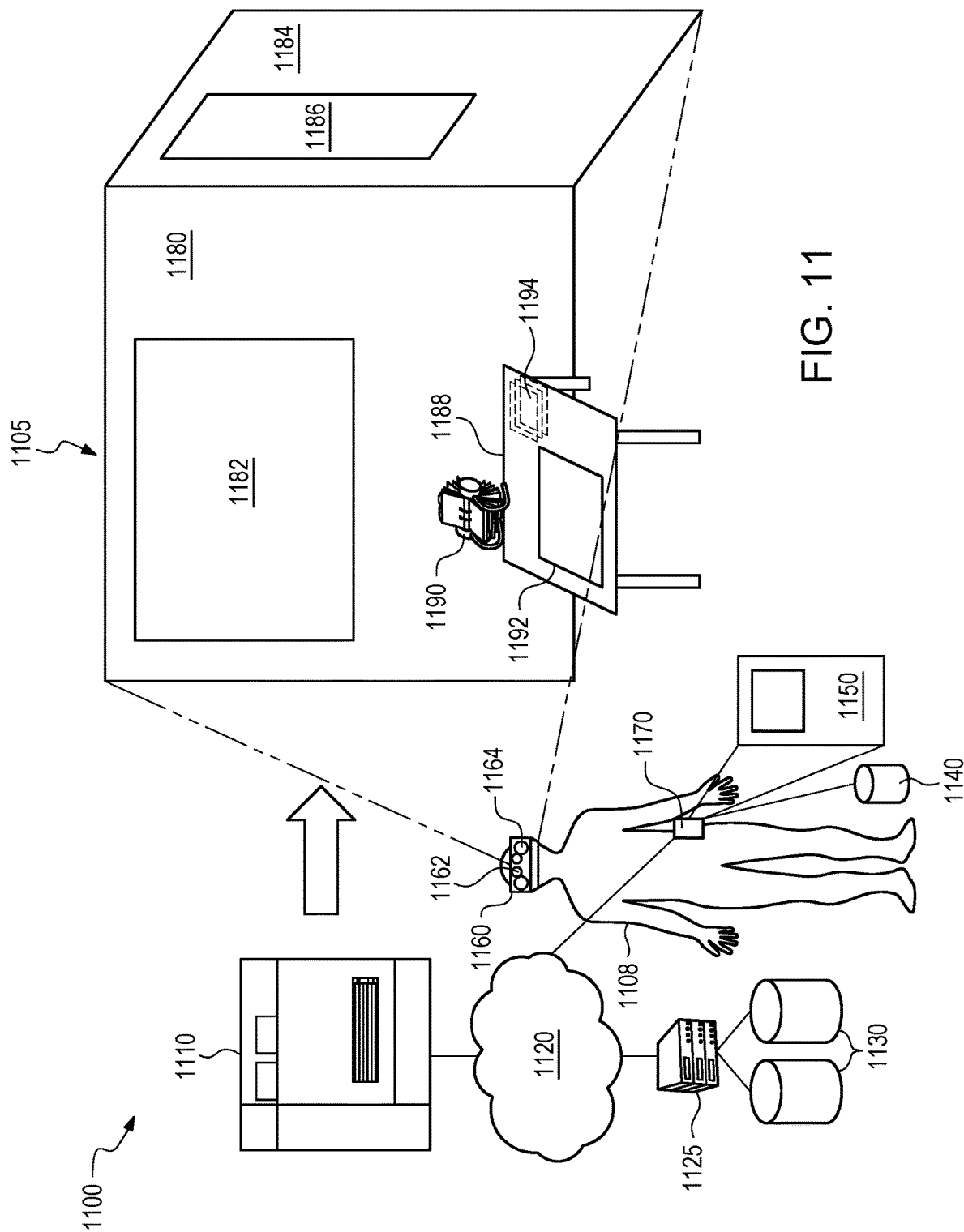
FIG. 11 illustrates an augmented reality environment for matching/displaying content elements to surfaces, according to some embodiments.

Referring to FIG. 11, environment 1100 is representative of a physical environment and systems for implementing processes described herein (e.g., matching content elements from content in a web page to be displayed on surfaces in a user's physical environment 1105). The representative physical environment and system of the environment 1100 includes a user's physical environment 1105 as viewed by a user 1108 through a head-mounted system 1160. The representative system of the environment 1100 further includes accessing content (e.g., a web page) via a web browser 1110 operably coupled to a network 1120. In some embodiments, access to content may be via an application (not shown) such as a video streaming application, wherein the video stream may be the content being accessed. In some embodiments, the video streaming application may be a sports organization and the content being streamed may be an actual live game, summary, recap/highlights, box score, play-by-play, team stats, player stats, related videos, newsfeeds, product information, and the like.

The network 1120 may be the Internet, an internal network, a private cloud network, a public cloud network, etc. The web browser 1110 is also operably coupled to a processor 1170 via the network 1120. Although the processor 1170 is shown as an isolated component separate from the head-mounted system 1160, in an alternate embodiment, the processor 1170 may be integrated with one or more components of the head-mounted system 1160, and/or may be integrated into other system components within the environment 1100 such as, for example, the network 1120 to access a computing network 1125 and storage devices 1130. The processor 1170 may be configured with software 1150 for receiving and processing information such as video, audio and content received from the head-mounted system 1160, a local storage device 1140, the web browser 1110, the computing network 1125, and the storage devices 1130. The software 1150 may communicate with the computing network 1125 and the storage devices 1130 via the network 1120. The software 1150 may be installed on the processor 1170 or, in another embodiment; the features and functionalities of software may be integrated into the processor 1170. The processor 1170 may also be configured with the local storage device 1140 for storing information used by the processor 1170 for quick access without relying on information stored remotely on an external storage device from a vicinity of the user 1108. In other embodiments, the processor 1170 may be integrated within the head-mounted system 1160.

The user's physical environment 1105 is the physical surroundings of the user 1108 as the user moves about and views the user's physical environment 1105 through the head-mounted system 1160. For example, referring to FIG. 1, the user's physical environment 1105 shows a room with two walls (e.g., main wall 1180 and side wall 1184, the main wall and side wall being relative to the user's view) and a table 1188. On the main wall 1180, there is a vertical surface 1182 depicted by a solid black line to show a physical surface with a physical border (e.g., a painting hanging or attached to a wall or a window, etc.) that may be a candidate surface to project certain content onto. On the side wall 1184, there is a second vertical surface 1186 depicted by a solid black line to show a physical surface with a physical border (e.g., a painting hanging or attached to a wall or a window, etc.). On the table 1188, there may be different objects. 1) A virtual Rolodex 1190 where certain content may be stored and displayed; 2) a horizontal surface 1192 depicted by a solid black line to represent a physical surface with a physical border to project certain content onto; and 3) multiple stacks of virtual square surfaces 1194 depicted by a dotted black line to represent, for example, stacked virtual newspaper where certain content may be stored and displayed. One of skill in the art will appreciate the physical borders described above, though helpful for placing content elements as they already break up surfaces into discrete viewing sections and may be a surface attribute themselves, are not necessary to recognize an eligible surface.

The web browser 1110 may also display a blog page from the internet or within an intranet/private network. Additionally, the web browser 1110 may also be any technology that displays digital content. Digital content may include, for example, web pages, blogs, digital pictures, videos, news articles, newsletters, or music. The content may be stored in the storage devices 1130 that is accessible by the user 1108 via the network 1120. In some embodiments, content may also be streaming content, for example, live video feeds or live audio feeds. The storage devices 1130 may include, for example, a database, a file system, a persistent memory device, a flash drive, a cache, etc. In some embodiments, the web browser 1110 containing content (e.g., web page) is displayed via computing network 1125.

The computing network 1125 accesses the storage devices 1130 to retrieve and store content for displaying in a web page on the web browser 1110. In some embodiments, the local storage device 1140 may provide content of interest to the user 1108. The local storage device 1140 may include, for example, a flash drive, a cache, a hard drive, a database, a file system, etc. Information stored in the local storage device 1140 may include recently accessed content or recently displayed content in a 3D space. The local storage device 1140 allows improvements in performance to the systems of the environment 1100 by providing certain content locally to the software 1150 for helping to deconstruct content to display the content on the 3D space environment (e.g., 3D surfaces in the user's physical environment 1105).

The software 1150 includes software programs stored within a non-transitory computer readable medium to perform the functions of deconstructing content to be displayed within the user's physical environment 1105. The software 1150 may run on the processor 1170 wherein the processor 1170 may be locally attached to the user 1108, or in some other embodiments, the software 1150 and the processor 1170 may be included within the head-mounted system 1160. In some embodiments, portions of the features and functions of the software 1150 may be stored and executed on the computing network 1125 remote from the user 1108. For example, in some embodiments, deconstructing content may take place on the computing network 1125 and the results of the deconstructions may be stored within the storage devices 1130, wherein the inventorying of a user's local environment's surfaces for presenting the deconstructed content on may take place within the processor 1170 wherein the inventory of surfaces and matchings/mappings are stored within the local storage device 1140. In one embodiment, the processes of deconstructing content, inventorying local surfaces, matching/mapping the elements of the content to local surfaces and displaying the elements of the content may all take place locally within the processor 1170 and the software 1150.

The head-mounted system 1160 may be a virtual reality (VR) or augmented reality (AR) head-mounted system (e.g., a mixed reality device) that includes a user interface, a user-sensing system, an environment sensing system, and a processor (all not shown). The head-mounted system 1160 presents to the user 1108 an interface for interacting with and experiencing a digital world. Such interaction may involve the user and the digital world, one or more other users interfacing the environment 1100, and objects within the digital and physical world.

The user interface may include receiving content and selecting elements within the content by user input through the user interface. The user interface may be at least one or a combination of a haptics interface devices, a keyboard, a mouse, a joystick, a motion capture controller, an optical tracking device and an audio input device. A haptics interface device is a device that allows a human to interact with a computer through bodily sensations and movements. Haptics refers to a type of human-computer interaction technology that encompasses tactile feedback or other bodily sensations to perform actions or processes on a computing device.

The user-sensing system may include one or more sensors 1162 operable to detect certain features, characteristics, or information related to the user 1108 wearing the head-mounted system 1160. For example, in some embodiments, the sensors 1162 may include a camera or optical detection/scanning circuitry capable of detecting real-time optical characteristics/measurements of the user 1108 such as, for example, one or more of the followings: pupil constriction/dilation, angular measurement/positioning of each pupil, spherocity, eye shape (as eye shape changes over time) and other anatomic data. This data may provide, or be used to calculate information (e.g., the user's visual focal point) that may be used by the head-mounted system 1160 to enhance the user's viewing experience.

The environment-sensing system may include one or more sensors 1164 for obtaining data from the user's physical environment 1105. Objects or information detected by the sensors 1164 may be provided as input to the head-mounted system 1160. In some embodiments, this input may represent user interaction with the virtual world. For example, a user (e.g., the user 1108) viewing a virtual keyboard on a desk (e.g., the table 1188) may gesture with their fingers as if the user were typing on the virtual keyboard. The motion of the fingers moving may be captured by the sensors 1164 and provided to the head-mounted system 1160 as input, wherein the input may be used to change the virtual world or create new virtual objects.

The sensors 1164 may include, for example, a generally outward-facing camera or a scanner for interpreting scene information, for example, through continuously and/or intermittently projected infrared structured light. The environment-sensing system may be used for matching/mapping one or more elements of the user's physical environment 1105 around the user 1108 by detecting and registering the local environment, including static objects, dynamic objects, people, gestures and various lighting, atmospheric and acoustic conditions. Thus, in some embodiments, the environment-sensing system may include image-based 3D reconstruction software embedded in a local computing system (e.g., the processor 1170) and operable to digitally reconstruct one or more objects or information detected by the sensors 1164.

In one exemplary embodiment, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system may include other components other than those discussed above.

As mentioned above, the processor 1170 may, in some embodiments, be integrated with other components of the head-mounted system 1160, integrated with other components of system of the environment 1100, or may be an isolated device (wearable or separate from the user 1108) as shown in FIG. 1. The processor 1170 may be connected to various components of the head-mounted system 1160 through a physical, wired connection, or through a wireless connection such as, for example, mobile network connections (including cellular telephone and data networks), Wi-Fi, Bluetooth, or any other wireless connection protocol. The processor 1170 may include a memory module, integrated and/or additional graphics processing unit, wireless and/or wired internet connectivity, and codec and/or firmware capable of transforming data from a source (e.g., the computing network 1125, and the user-sensing system and the environment-sensing system from the head-mounted system 1160) into image and audio data, wherein the images/video and audio may be presented to the user 1108 via the user interface (not shown).

The processor 1170 handles data processing for the various components of the head-mounted system 1160 as well as data exchange between the head-mounted system 1160 and content from web pages displayed or accessed by web browser 1110 and the computing network 1125. For example, the processor 1170 may be used to buffer and process data streaming between the user 1108 and the computing network 1125, thereby enabling a smooth, continuous and high fidelity user experience.

Deconstructing content from a web page into content elements and matching/mapping the elements to be displayed on surfaces in a 3D environment may be accomplished in an intelligent and logical manner. For example, the content parser 115 may be a document object model (DOM) parser and receive an input (e.g., an entire HTML page) and deconstruct the various content elements within the input and store the deconstructed content elements in a logical structure so that the elements of the content are accessible and easier to programmatically manipulate/extract. A predetermined set of rules may be available to recommend, suggest, or dictate where to place certain types of elements/content identified within, for example, a web page. For example, certain types of content elements may have one or more content elements that may need to be matched/mapped to a physical or virtual object surface amenable for storing and displaying the one or more elements while other types of content elements may be a single object, such as a main video or main article within a web page, in which case, the single object may be matched/mapped to a surface that makes the most sense to display a single object to the user. In some embodiments, the single object may be a video streamed from a video application such that the single content object may be displayed on a surface (e.g., a virtual surface or a physical surface) within an environment of the user.

Figure 12:
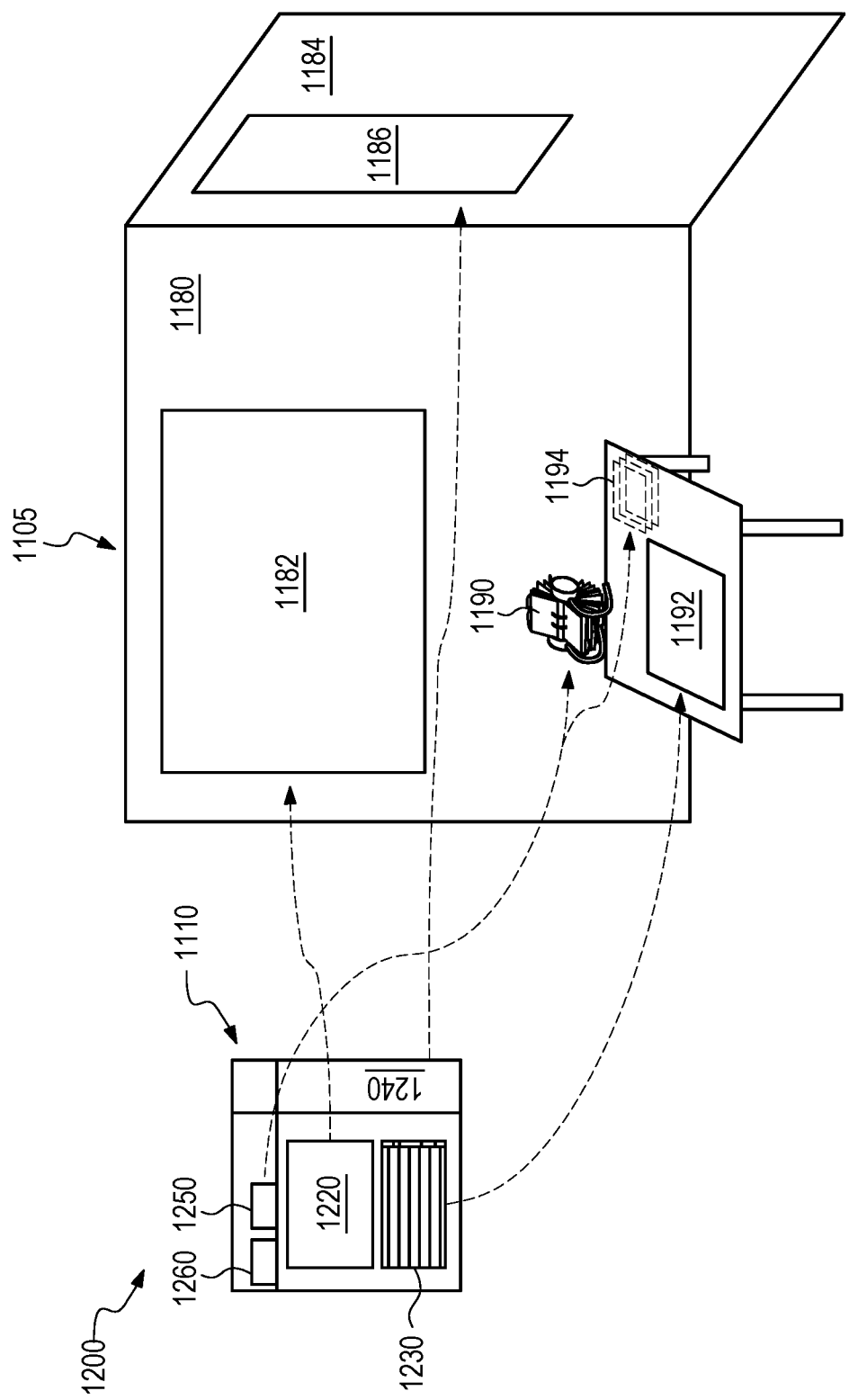
FIG. 12 illustrates an augmented reality environment matching/displaying content elements to surfaces, according to some embodiments.

FIG. 12, environment 1200 depicts a content (e.g., a web page) displayed or accessed by a web browser 1110 and a user's physical environment 1105. The dotted lines with an arrow head depict elements (e.g., particular types of content) from the content (e.g., web page) that are matched/mapped to and displayed upon the user's physical environment 1105. Certain elements from the content are matched/mapped to certain physical or virtual objects in the user's physical environment 1105 based on either web designer hints or pre-defined browser rules.

As an example, content accessed or displayed by the web browser 1110 may be a web page having multiple tabs, wherein a current active tab 1260 is displayed and a secondary tab 1250 is currently hidden until selected upon to display on the web browser 1110. Displayed within the active tab 1260 is typically a web page. In this particular example, the active tab 1260 is displaying a YOUTUBE page including a main video 1220, user comments 1230, and suggested videos 1240. As depicted in this exemplary FIG. 12, the main video 1220 may be matched/mapped to display on vertical surface 1182, the user comments 1230 may be matched/mapped to display on horizontal surface 1192, and suggested videos 1240 may be matched/mapped to display on a different second vertical surface 1186 from the vertical surface 1182. Additionally, the secondary tab 1250 may be matched/mapped to display on or as a virtual Rolodex 1190 and/or on a multi-stack virtual object 1194. In some embodiments, specific content within the secondary tab 1250 may be stored in the multi-stack virtual object 1194. In other embodiments, the entire content residing within the secondary tab 1250 may be stored and/or displayed on the multi-stack virtual object 1194. Likewise, the virtual Rolodex 1190 may contain specific content from the secondary tab 1250 or the virtual Rolodex 1190 may contain the entire content residing within the secondary tab 1250.

In some embodiments, content elements of the web browser 1110 (e.g., content elements of a web page in the secondary tab 1250) may be displayed on a double sided planar window virtual object (not shown) in the user's physical environment 1105. For example, displayed on a first side (e.g., front side) of the planar window virtual object may be primary content of a web page, and displayed on a second side (e.g., back side) of the planar window virtual object may be additional information such as extra content that is related to the primary content. As an example, a merchant web page (e.g., BESTBUY) may be displayed on the first side and a set of coupons and discounts may be displayed on the second side. The discount information may be updating on the second side, reflecting the current context of what user is browsing on first side (e.g. only laptop or home appliances discount on the second side).

Figure 13A:
FIGS. 13A-13B illustrate an example double-sided web page, according to some embodiments.
Figure 13B:
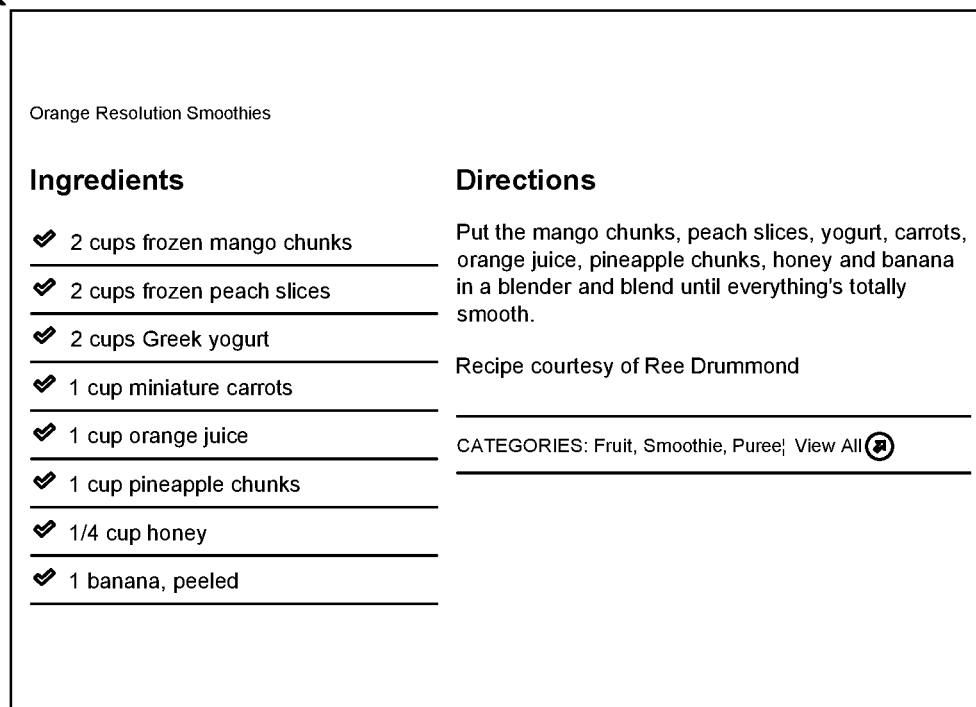

Some web pages when viewed in the web browser 1110 may span multiple pages. When viewed in the web browser 1110, such web pages may be viewed by scrolling in the web browser 1110 or by navigating multiple pages in the web browser 1110. When matching/mapping such web pages from the web browser 1110 to user's physical environment 1105, such web pages may be matched/mapped as double-sided web pages. FIGS. 13A-13B illustrates an example double-sided web pages, according to some embodiments. FIG. 13A shows a smoothie drink while FIG. 13B illustrates an example back side/second side of the smoothie drink including ingredients and directions for making the smoothie. In some embodiments, a front side of the main wall 1180 may include a first side of the double-sided web page and a back side of the main wall 1180 may include a second side of the double-sided web page. In this example, the user 1108 would have to walk around the main wall 1180 to see both sides of the double-sided web page. In some embodiments, the front side of the main wall 1180 may include both sides of the double-sided web page. In this example, the user 1108 may toggle between the two sides of the double-sided web page via user input. The double-sided web page may appear to flip from a first side to a second side in response to user input. Although double-sided web pages are described as being generated from web pages which when viewed in the web browser 1110 span multiple pages, double-sided web pages may be generated from any web page or portions or multiples thereof. The VR and/or AR system may provide a set of easy to use HTML properties which could be added into the existing content (e.g., secondary tab 1250 or a web page) making it available for a rendering module to render the content onto the double sided 2D browser planar window virtual object. Although the example describes a double-sided planar window virtual object, the virtual object may have any number of sides (N-sided). Although the example describes displaying content on a double sided planar window virtual object, content elements may be on multiple surfaces of a real object (e.g., a front side of a door and a back side of a door).

The vertical surface 1182 may be any type of structure which may already be on a main wall 1180 of a room (depicted as the user's physical environment 1105) such as a window pane or a picture frame. In some embodiments, the vertical surface 1182 may be an empty wall where the head-mounted system 1160 determines an optimal size of the frame of the vertical surface 1182 that is appropriate for the user 1108 to view the main video 1220. This determination of the size of the vertical surface 1182 may be based at least in part on the distance the user 1108 is from the main wall 1180, the size and dimension of the main video 1220, the quality of the main video 1220, the amount of uncovered wall space, and/or the pose of the user when looking at the main wall 1180. For instance, if the quality of the main video 1220 is of high definition, the size of the vertical surface 1182 may be larger because the quality of the main video 1220 will not be adversely affected by the vertical surface 1182. However, if the video quality of the main video 1220 is of poor quality, having a large vertical surface 1182 may greatly hamper the video quality, in which case, the methods and systems of the present disclosure may resize/redefine how content is displayed within vertical surface 1182 to be smaller to minimize poor video quality from pixilation.

The second vertical surface 1186, like the vertical surface 1182, is a vertical surface on an adjacent wall (e.g., side wall 1184) in the user's physical environment 1105. In some embodiments, based on the orientation of the user 1108, the side wall 1184 and the second vertical surface 1186 may appear to be slanted surfaces on an incline. The slanted surfaces on an incline may be a type of orientation of surfaces in addition to vertical and horizontal surfaces. The suggested videos 1240 from the YOUTUBE web page may be placed on the second vertical surface 1186 on the side wall 1184 to allow the user 1108 to be able to view suggested videos simply by moving their head slightly to the right in this example.

The virtual Rolodex 1190 is a virtual object created by the head-mounted system 1160 and displayed to the user 1108. The virtual Rolodex 1190 may have the ability for the user 1108 to bi-directionally cycle through a set of virtual pages. The virtual Rolodex 1190 may contain entire web pages or it may contain individual articles or videos or audios. As shown in this example, the virtual Rolodex 1190 may contain a portion of the content from the secondary tab 1250 or in some embodiments, the virtual Rolodex 1190 may contain the entire page of the secondary tab 1250. The user 1108 may bi-directionally cycle through content within the virtual Rolodex 1190 by simply focusing on a particular tab within the virtual Rolodex 1190 and the one or more sensors (e.g., the sensors 1162) within the head-mounted system 1160 will detect the eye focus of the user 1108 and cycle through the tabs within the virtual Rolodex 1190 accordingly to obtain relevant information for the user 1108. In some embodiments, the user 1108 may choose the relevant information from the virtual Rolodex 1190 and instruct the head-mounted system 1160 to display the relevant information onto either an available surrounding surface or on yet another virtual object such as a virtual display in close proximity to the user 1108 (not shown).

The multi-stack virtual object 1194, similar to virtual Rolodex 1190, may contain content ranging from full contents from one or more tabs or particular contents from various web pages or tabs that the user 1108 bookmarks, saves for future viewing, or has open (i.e., inactive tabs). The multi-stack virtual object 1194 is also similar to a real-world stack of newspapers. Each stack within the multi-stack virtual object 1194 may pertain to a particular newspaper article, page, magazine issue, recipe, etc. One of ordinary skill in the art may appreciate that there can be multiple types of virtual objects to accomplish this same purpose of providing a surface to place content elements or content from a content source.

One of ordinary skill in the art may appreciate that content accessed or displayed by the web browser 1110 may be more than just a web page. In some embodiments, content may be pictures from a photo album, videos from movies, TV shows, YOUTUBE videos, interactive forms, etc. Yet in other embodiments, content may be e-books, or any electronic means of displaying a book. Finally, in other embodiments, content may be other types of content not yet described because content is generally how information is presented currently. If an electronic device can consume a content, then the content can be used by the head-mounted system 1160 to deconstruct and display the content in a 3D setting (e.g., AR).

In some embodiments, matching/mapping the accessed content may include extracting the content (e.g., from the browser) and putting it on a surface (such that the content is no longer in the browser and only on the surface), and in some embodiments, the matching/mapping can include replicating content (e.g., from the browser) and putting it on a surface (such that the content is both in the browser and on the surface). Deconstructing content is a technical problem that exists in the realm of the Internet and computer-related technology. Digital contents, such as web pages, are constructed using certain types of programming languages such as HTML to instruct computer processors and technical components where and how to display elements within the web pages on a screen for a user. As discussed above, a web designer typically works within the limitation of a 2D canvas (e.g., a screen) to place and display elements (e.g., content) within the 2D canvas. HTML tags are used to determine how an HTML document or portions within the HTML document are formatted. In some embodiments, the (extracted or replicated) content can maintain the HTML tag reference, and in some embodiments, the HTML tag reference may be redefined.

Referring briefly to FIG. 4 with respect to this example, receiving content at 410 may involve the use of the head-mounted system 1160 to search for digital content. Receiving content at 410 may also include accessing digital content on servers (e.g., the storage devices 1130) connected to the network 1120. Receiving content at 410 may include browsing the Internet for web pages that are of interest to the user 1108. In some embodiments, receiving content at 410 may include voice-activated commands given by the user 1108 for searching content on the Internet. For example, the user 1108 may be interacting with a device (e.g., head-mounted system 1160) wherein the user 1108 is searching for a particular video on the Internet by asking the device to search for the particular video by saying a command to search for a video and then saying the name of the video and a brief description of the video. The device may then search the Internet and pull up the video on a 2D browser to allow the user 1108 to see the video as displayed on the 2D browser of the device. The user 1108 may then confirm that the video is a video that the user 1108 would like to view in the spatial 3D environment.

Once the content is received, the method identifies content elements in the content at 420 to take inventory of the content elements within the content for displaying to the user 1108. The content elements within the content, for example, may include videos, articles and newsletters posted on a web page, comments and postings on a social media website, blog posts, pictures posted on various websites, audio books, etc. These elements within the content (e.g., a web page) may be discernible by HTML tags within the script for the content, and may further comprise HTML tags, or HTML-like tags, having attributes provided by a content designer to define where on a particular element is placed and, in some cases, when and how the element is to be displayed. In some embodiments, the methods and systems of the present disclosure will utilize these HTML tags and attributes as hints and suggestions provided by the content designer to aid in the matching/mapping process at 440 to determine where and how to display the element in a 3D setting. For example, below is an example HTML Web Page code provided by the content designer (e.g., web page developer).

Example HTML Web Page Code Provided by a Content Designer

/*
measurement values can be given in cm since ml objects are meant to work in the real world environment
type: hint for preference in surface type to match to;
priority: hint for preference in getting the desired surface during matching, with range [1,100], where 1 is low priority and 100 is top priority.
algorithm. higher value is higher priority (like z-index CSS property);
distance-depth: for the stack layout, distance between adjacent stacked objects;
<!DOCTYPE HTML>
<html>
<head> . . . </head>
<body>
. . . .
<ml-layout id="video" layout="plane" style="type:vertical; priority:100;">
  <ml-container width="200 cm" height="120 cm">
    <div id="current_video" . . . >
      <video . . . >
      . . . .
      </video>
    </div>
  </ml-container>
</ml-layout>
<ml-layout id="recommendations" layout="stack" style="type: horizontal;
priority:90; distance-depth:20 cm;">
  <ml-container width="50 cm" height="50 cm;">
    <div id="video_recommendation_1">
    . . . .
    </div>
  </ml-container>
  <ml-container width="50 cm" height="50 cm">
    <div id="video_recommendation_2">
    . . . .
    </div>
  </ml-container>
</ml-layout>
. . . .
</body>
</html>

The example HTML Web Page code provided by the content designer includes a preference on how to display a main video on a web page, and a preference on how to display recommended (or suggested videos). The preferences may be conveyed as one or more attributes in the tags. Example attributes for content elements are described above and below. The attributes may be determined or inferred as described above. In particular, this HTML web page code uses the tag of "style" to specify how to display the main video using a type value of "vertical" to designate a vertical surface to display the video. Additionally, within the "style" tag, additional hints provided by the content designer may include a "priority" preference attribute for a matching algorithm to use to prioritize which HTML element/content within the web page (e.g., the main video) should be matched/mapped to which potential surface area. In the example HTML Web Page code, the priority was set at a value of 100 for the video having a vertical plane layout, wherein in this example, a higher priority value indicates a higher priority. Additionally, in this example, a preference attribute is indicated by the content designer to place the suggested videos in a stack having a type value of "horizontal" in a stack layout, wherein the distance between the stacked objects (e.g., in this case, a suggested video in relation to another suggested video) should be 20 cm.

In some embodiments, a tag, such as, for example, <ml-container>, may allow a content designer to provide specific preference attributes (e.g., hints) on where and how content elements should be displayed in an environment (e.g., a 3D spatial environment) so that a parser (e.g., the parser 115) may be able to interpret attributes specified within the tag to determine where and how the content elements should be displayed in the 3D spatial environment. The specific preference attributes may include one or more attributes for defining display preferences for the content elements. The attributes may include any of the attributes described above.

One of ordinary skill in the art may appreciate that these suggestions, hints, and/or attributes defined by a content designer may be defined within a tag, such as, for example, <ml-container>, that may indicate similar properties for displaying content elements in a 3D spatial environment. Additionally, one of ordinary skill in the art may also appreciate that a content designer may specify attributes in any combination. The embodiments disclosed herein may interpret the desired displaying result by use of a parser (e.g., the parser 115) or other similar technologies to analyze content of a web page to determine how and where to best display content elements within the content.

Referring briefly to FIG. 5, with respect to this example, identifying elements within content at 510 may be similar to identifying elements in the content at 420 of FIG. 4. The method proceeds to the next step of identifying attributes from tags pertaining to placement of content at 520. As discussed above, a content designer, while designing and configuring a web page, may associate content elements within the web page to HTML tags to define where and how to display each content element. These HTML tags may also include attributes pertaining to placement of the content element onto a particular portion of the web page. It is these HTML tags and their attributes that the head-mounted system 1160 will detect and coordinate with other components of the system to use as input as to where the particular element could be displayed. In some embodiments, a tag, such as, for example, <ml-container>, may include attributes specified by the content designer to suggest display preference attributes of the content elements in a 3D spatial environment, where the tags are associated with the content elements.

Extracting hints or tags from each element is performed at 530. The hints or tags are typically formatting hints or formatting tags that are provided by the content designer of the web page. As discussed above, the content designer may provide instructions or hints, for example, in the form of HTML tags as shown in the "Example HTML Web Page code provided by the web page developer", to instruct the web browser 1110 to display the content elements in a particular portion of the page or screen. In some embodiments, the content designer may use additional HTML tag attributes to define additional formatting rules. For example, if the user has a reduced sensitivity to a specific color (e.g., red), do not display red and instead use another color, or if a video that had a preference to be displayed on a vertical surface cannot be displayed on a vertical surface, alternatively display the video on another (physical) surface or create a virtual surface and display the video on the virtual surface. Below is an example HTML Page parser implemented in a browser for parsing through an HTML page to extract hints/tags from each element within the HTML page.

```
Example HTML Page parser implemented in a browser
vector<WorldSurface> m_world_surfaces;
vector<MLLayout> m_layouts;
struct WorldSurface {
    // world position of the planar surface (x, y, z)
    vec3 position;
    // world orientation of the planar surface (x, y, z)
    vec3 rotation;
    // width and height of the planar surface
    float width;
    float height;
    // type = vertical, horizontal, inclined, etc.
    string type;
}
void PopulateWorldSurfaceList( ) {
    QueryWorldSurfacesFromEnvironment( );
    while (is_world_scan_in_progress) {
        WorldSurface surface;
        surface.width = CalculateLatestSurfaceSize( ).width( );
        surface, height = CalculateLatestSurfaceSize( ).height( );
        surface, position = CalculateLatestSurfaceTransform( ).pos( );
        surface, rotation = CalculateLatestSurfaceTransform( ).rot( );
        float distance_to_surface =
            (Camera( ).position - surface.position).distance( );
        vec3 gravity_direction = vec3(0, -1, 0); / always down
        vec3 surface_normal = CalculateLatestSurfaceNormal( );
        // determines surface type based on the angle between surface
        // normal and gravity vector
        surface.type = DetermineLatestSurfaceType(gravity, surface_normal);
        m_world_surfaces.push_back(surface);
    }
}
struct MLContainer {
    float width;
    float height;
}
struct MLLayout {
    // planar, list, grid, stack, etc.
    string layout;
    // hint used for matching algorithm
    int priority;
    // hint used for matching algorithm: vertical, horizontal
    string type;
    // any extra layout specific properties: e.g distance-depth
    string[ ] properties;
    // each layout consists of 1 + layout objects
    vector<MLContainer> objects;
}
void ParseHTMLDocumet(string url) {
    WebDocument document = LoadURL(url);
    Tag [ ] tags = document.ParseTags( );
    for (int i = 0; i < tags.size( ); i++) {
        if (tags[i].name = = "ml-layout") {
            MLLayout ml_layout;
            ml_layout. layout = tags[i].propertyValue("layout");
            ml_layout. priority = tags[i].propertyValue("priority");
            ml_layout.type = tags[i].propertyValue("type");
            ml_layouts.push_back(ml_layout);
            while (tags[i].children( ) != NULL) {
                if (tags[i].GetNextChild( ).name == "ml-container") {
                    MLContainer ml_container;
```

```
        ml_container.width =
           tags[i].propertyValue("width");
        ml_container.height =
           tags[i].propertyValue("height");
        ml_layout.objects.push_back(ml_container);
      }
    }
  }
 }
}
void main( ) {
  // url is loaded already into the page from user input
  string url = GetWebPageURL( );
  ParseHTMLDocument(url);
  // world is already being scanned while a device with sensors is running
  PopulateWorldSurfaceList( );
  DoMatchLayoutsToSurfaces(ml_layouts, m_world_surfaces);
}
```

The example HTML Page parser shows how an HTML page containing HTML tags used to provide display preference attributes for particular content elements can be parsed and identified and/or extracted/replicated. As disclosed in the example HTML Page parser, content elements can be parsed using the sample code disclosed. Certain HTML tags using various element names and values may be identified/extracted by the HTML Page parser (e.g., ML.layout, ML.container, etc.) to determine how the particular element is to be displayed to a user in a 3D environment (e.g., by matching the content element to a particular surface).

Looking up/searching alternative display forms for the content elements is performed at 540. Certain formatting rules may be specified for content elements displayed on a particular viewing device. For example, certain formatting rules may be specified for an image on a web page. The system may access the alternative display forms. For example, if the web browser 1110 is capable of displaying a 3D version of the image (or 3D asset or 3D media more generally), the web page designer may place an additional tag or define certain attributes of a particular tag to allow the web browser 1110 to recognize that the image may have an alternative version of the image (e.g., a 3D version of the image). The web browser 1110 may then access the alternative version of the image (e.g., the 3D version of the image) to be displayed in the 3D enabled browser.

In some embodiments, the 3D image within the web page may not be extractable or copied from the web page to be displayed on surfaces in the 3D environment. In these embodiments, the 3D image may be displayed within the 3D environment of the user wherein the 3D image appears to rotate, glow, etc., and the user may interact with the 3D image, but only within the web page including the 3D image. In these embodiments, since the 3D image was not extracted or copied from the web page, the display of the 3D image is displayed within the web page. In this case, the entire web page is extracted and displayed in the 3D environment of the user and some content elements within the web page, such as, for example, the 3D image, although not extracted or copied from the web page, may appear in 3D with respect to the rest of the web page and may be interactable within the web page.

In some embodiments, the 3D image within the web page may be copied but not extracted from the web page. In these embodiments, the 3D image may be displayed within the 3D environment of the user wherein the 3D image appears to rotate, glow, etc., and the user may interact with the 3D image, not only within the web page including the 3D image, but also in the 3D environment outside of the web page including a copy of the 3D image. The web page appears the same with the 3D image and there is a copy of the 3D image outside of the web page.

In some embodiments, the 3D image within the web page may be extracted from the web page. In these embodiments, the 3D image may be displayed within the 3D environment of the user wherein the 3D image appears to rotate, glow, etc., and the user may interact with the 3D image, but only outside the web page as the 3D image is extracted from the web page. Since the 3D image was extracted from the web page, the 3D image is only displayed in the 3D environment and not without the web page. In these embodiments, the web page may be reconfigured after the 3D image is extracted from the web page. For example, a version of the web page may be presented to the user including a blank section within the web page where the 3D image was prior to being extracted.

Although the previous embodiments and examples are described with respect to a 3D image within a web page, one of ordinary skill in the art may appreciate that the description can be similarly applied to any content element.

Storing the identified content elements is performed at 550. The method may store the identified elements into a non-transitory storage medium to be used in the environment compositing process 140 to match the content elements to the surfaces. The non-transitory storage medium may include a data storage device such as the storage device 1130 or the local storage device 1140. The content elements may be stored in a particular table such as the table disclosed in FIG. 14A, described below. In some embodiments, the content elements may be stored in a hierarchical structure represented, for example, as a tree structure as disclosed in FIG. 14B, described below. In some embodiments, the content elements may be stored in a transitory storage medium.

Figure 14B:
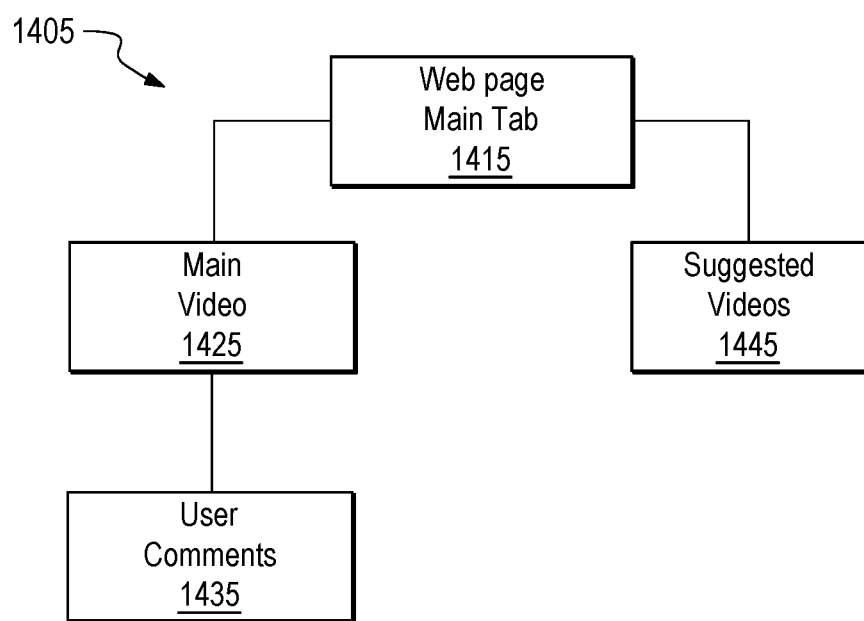

FIGS. 14A-14B show examples of different structures for storing content elements deconstructed from content, according to some embodiments. In FIG. 14A, elements table 1400 is an exemplary table that can store the results of the identifying content elements within content at 510 of FIG. 5 in a database. The elements table 1400 includes, for example, information about the one or more content elements within the content including an element identification (ID) 1410, a preference attribute indicator 1420 (e.g., priority attribute, orientation attribute, position type attribute, content type attribute, surface type attribute, and the like, or some combination thereof) for the content element, a parent element ID 1430 if the particular content element is included within a parent content element, a child content element ID 1440 if the content element may contain a child content element, and a multiple entity indicator 1450 to indicate whether the content element contains multiple embodiments that may warrant the need to have the surface or virtual object that is used to display the content element be compatible with displaying multiple versions of the content elements. A parent content element is a content element/object within the content that may contain sub-content elements (e.g., child content elements). For example, the Element ID having a value of 1220 (e.g., main video 1220) has a Parent Element ID value of 1260 (e.g., active tab 1260), which indicates that the main video 1220 is a child content element of the active tab 1260. Or stated in a different way, the main video 1220 is included within the active tab 1260. Continuing with the same example, the main video 1220 has a Child Element ID 1230 (e.g., user comments 1230) which indicates that the user comments 1230 is associated with the main video 1220. One of ordinary skill in the art may appreciate the elements table 1400 may be a table in a relational database or in any type of database. Additionally, the elements table 1400 may be an array in a computer memory (e.g., a cache) containing the results of the identifying content elements within a content at 510 of FIG. 5.

Each row of rows 1460 in the elements table 1400 corresponds to a content element from within a web page. The element ID 1410 is a column containing a unique identifier for each content element (e.g., an element ID). In some embodiments, a content element's uniqueness may be defined as a combination of the element ID 1410 column and another column within the table (e.g., the preference attribute 1420 column if there are more than one preference attributes identified by the content designer). The preference attribute 1420 is a column whose value may be determined based at least in part on the tags and attributes defined therein by the content designer and identified by the system and method as disclosed in extracting hints or tags from each content element at 530 of FIG. 5. In other embodiments, the preference attribute 1420 column may be determined based at least in part on predefined rules to specify where certain types of content elements should be displayed within an environment. These predefined rules may provide suggestions to the systems and methods to determine where to best place the content element in the environment.

The parent element ID 1430 is a column that contains the element ID of a parent content element that this particular content element in the current row is displayed within or is related to. A particular content element may be embedded, placed within another content element of the page, or related to another content element on the web page. For example, in the current embodiment, a first entry of the element ID 1410 column stores a value of element ID 1220 corresponding to the main video 1220 of FIG. 12. A value in the preference attribute 1420 column corresponding to the main video 1220 is determined based on the tags and/or attributes and, as illustrated, is that this content element should be placed in the "Main" location of a user's physical environment 1105. Depending on the current location of the user 1108, that main location may be a wall in a living room, or a stove top hood in a kitchen that the user 1108 is currently looking at, or if in a wide-open space, may be a virtual object that is projected in front of the line of site of the user 1108 that the main video 1220 may be projected onto. More information on how the content elements are displayed to the user 1108 will be disclosed elsewhere in the detailed description. In continuing with the current example, the parent element ID 1430 column stores a value of element ID 1260 corresponding to the active tab 1260 of FIG. 12. Therefore, the main video 1220 is a child of the active tab 1260.

The child element ID 1440 is a column that contains the element ID of a child content element that this particular content element in the current row has displayed within or is related to. A particular content element within a web page may be embedded, placed within another content element, or related to another content element. In continuing with the current example, the child element ID 1440 column stores a value of element ID 1230 corresponding to the user comments 1230 of FIG. 12.

The multiple entity indicator 1450 is a column that indicates whether the content element contains multiple entities that may warrant the need to have the surface or virtual object that is used to display the element be compatible with displaying multiple versions of the content elements (e.g., the content element may be the user comments 1230, wherein for the main video 1220, there may be more than one comment available). In continuing with the current example, the multiple entity indicator 1450 column stores a value of "N" to indicate that the main video 1220 does not have or correspond to multiple main videos in the active tab 1260 (e.g., "No" multiple versions of the main video 1220).

In continuing with the current example, a second entry of the element ID 1410 column stores a value of element ID 1230 corresponding to the user comments 1230 of FIG. 12. A value in the preference attribute 1420 column corresponding to the user comments 1230 shows a preference of "Horizontal" to indicate that the user comments 1230 should be placed on a horizontal surface somewhere in the user's physical environment 1105. As discussed above, the horizontal surface will be determined based on available horizontal surfaces in the user's physical environment 1105. In some embodiments, the user's physical environment 1105 may not have a horizontal surface, in which case, the systems and methods of the current disclosure may identify/create a virtual object with a horizontal surface to display the user comments 1230. In continuing with the current example, the parent element ID 1430 column stores a value element ID 1220 corresponding to the main video 1220 of FIG. 12, and the multiple entity indicator 1450 column stores a value of "Y" to indicate that user comments 1230 may contain more than one value (e.g., more than one user comment).

The remaining rows within the elements table 1400 contain information for the remaining content elements of interest to the user 1108. One of ordinary skill in the art may appreciate that storing the results of the identifying content elements within the content at 510 improves the functioning of the computer itself because once this analysis has been performed on the content, it may be retained by the system and method for future analysis of the content if another user is interested in the same content. The system and method for deconstructing this particular content may be avoided since it has already been completed before.

In some embodiments, the element table 1400 may be stored in the storage devices 1130. In other embodiments, the element table 1400 may be stored in the local storage device 1140 for quick access to recently viewed content or for possible revisit to the recently viewed content. Yet in other embodiments, the element table 1400 may be stored at both the storage devices 1130 located remotely from the user 1108 and the local storage device 1140 located local to the user 1108.

In FIG. 14B, tree structure 1405 is an exemplary logical structure that can be used to store the results of the identifying elements within content at 510 of FIG. 5 into a database. Storing content elements in a tree structure may be advantageous when various content has a hierarchical relationship to one another. The tree structure 1405 includes a parent node—web page main tab node 1415, a first child node—main video node 1425, and a second child node—suggested videos node 1445. The first child node—main video node 1425, includes a child node—user comments node 1435. The user comments node 1435 is a grandchild of the web page main tab node 1415. As an example, with reference to FIG. 12, the web page main tab node 1415 may be the web page main tab 1260, the main video node 1425 may be the main video 1220, the user comments node 1435 may be the user comments 1230, and the suggested videos node 1445 may be the suggested videos 1240. Here, the tree structure organization of the content elements shows a hierarchical relationship between the various content elements. It may be advantageous to organize and store the content elements in a tree structure type of logical structure. For example, if the main video 1220 is being displayed on a particular surface, it may be useful for the system to know that the user comments 1230 is a child content of the main video 1220 and that it may be beneficial to display the user comments 1230 relatively close to the main video 1220 and/or display the user comments 1230 on a surface nearby the main video 1220 so that a user may easily see and understand the relationship between the user comments 1230 and the main video 1220. In some embodiments, it may be beneficial to be able to hide or close user comments 1230 if the user decides to hide or close the main video 1220. In some embodiments, it may be beneficial to be able to move the user comments 1230 to another surface if the user decides to move the main video 1220 to a different surface. The system may move the user comments 1230 when the user moves the main video 1220 by moving both the parent node—the main video node 1425, and the child node—the user comments node 1435, at the same time.

Returning to FIG. 4, the method continues with determining surfaces at 430. The user 1108 may view the user's physical environment 1105 through the head-mounted system 1160 to allow the head-mounted system 1160 to capture and identify surrounding surfaces such as a wall, a table, a painting, a window frame, a stove, a refrigerator, a TV, etc. The head-mounted system 1160 is aware of the real objects within the user's physical environment 1105 because of the sensors and cameras on the head-mounted system 1160 or with any other type of similar device. In some embodiments, the head-mounted system 1160 may match the real objects observed within the user's physical environment 1105 with virtual objects stored within the storage devices 1130 or the local storage device 1140 to identify surfaces available with such virtual objects. Real objects are the objects identified within the user's physical environment 1105. Virtual objects are objects that are not physically present within the user's physical environment, but may be displayed to the user to appear as though the virtual objects are present in the user's physical environment. For example, the head-mounted system 1160 may detect an image of a table within the user's physical environment 1105. The table image may be reduced to a 3D point cloud object for comparison and matching at the storage devices 1130 or the local storage device 1140. If a match of the real object and a 3D point cloud object (e.g., of a table) is detected, the system and method will identify the table as having a horizontal surface because the 3D point cloud object representing a table is defined as having a horizontal surface.

In some embodiments, the virtual objects may be extracted objects, wherein an extracted object may be a physical object identified within the user's physical environment 1105, but is displayed to the user as a virtual object in the physical object's place so that additional processing and associations can be made to the extracted object that would not be able to be done on the physical object itself (e.g., to change the color of the physical object to highlight a particular feature of the physical object, etc.). Additionally, extracted objects may be virtual objects extracted from the content (e.g., a web page from a browser) and displayed to the user 1108. For example, a user 1108 may choose an object such as a couch displayed on a web page to be displayed within the user's physical environment 1105. The system may recognize the chosen object (e.g., the couch) and display the extracted object (e.g., the couch) to the user 1108 as if the extracted object (e.g., the couch) is physically present in the user's physical environment 1105. Additionally, virtual objects may also include objects that have surfaces for displaying content (e.g., a transparent display screen in close proximity to the user for viewing certain content) that are not even in the physical presence of the user's physical environment 1105, but from a displaying content perspective, may be an ideal display surface to present certain content to the user.

Referring briefly to FIG. 6, the method begins with determining surfaces at 610. The method proceeds to the next step of determining a user's pose at 620, which may include determining a head-pose vector. Determining the user's pose at 620 is an important step to identifying a user's current surrounding because the user's pose will provide perspective for the user 1108 in relation to the objects within the user's physical environment 1105. For example, referring back to FIG. 11, the user 1108, using the head-mounted system 1160, is observing the user's physical environment 1105. Determining the user's pose at 620 (i.e., head-pose vector and/or origin position information relative to the world) will help the head-mounted system 1160 understand, for example, (1) how tall the user 1108 is in relation to the ground, (2) the angle the user 1108 has to rotate their head to move about and capture the images of the room, and (3) the distance between the user 1108 to the table 1188, the main wall 1180 and the side wall 1184. Additionally, the pose of the user 1108 is also helpful to determine the angle of the head-mounted system 1160 when observing vertical surfaces 1182 and second vertical surfaces 1186, along with other surfaces within user's physical environment 1105.

At 630, the method determines attributes of the surfaces. Each surface within the user's physical environment 1105 is tagged and categorized with corresponding attributes. In some embodiments, each surface within the user's physical environment 1105 is also tagged and categorized with corresponding dimension and/or orientation attributes. This information will be helpful in matching the content elements to the surfaces, based at least in part on the dimension attribute of the surface, the orientation attribute of the surface, the distance the user 1108 is away from the particular surface, and type of information that needs to be displayed for the content element. For example, a video can be shown further away than a blog or an article that may contain an abundance of information where the text size of the article may be too small for a user to see if displayed on a distant wall with small dimensions. In some embodiments, the sensor(s) 162, from FIG. 1B, provide raw data to the CVPU 164 for processing, and the CVPU 164 provides the processed data to the perception framework 166 for preparing the data for the environment parser 168. The environment parser 168 parses the environment data from the perception framework 166 to determine surfaces in the environment.

At 640, the method stores an inventory of the surfaces into a non-transitory storage medium to be used by a compositing process/matching/mapping routine to match/map the extracted elements to particular surfaces. The non-transitory storage medium may include a data storage device such as the storage devices 1130 or the local storage device 1140. The identified surfaces may be stored in a particular table such as the table disclosed in FIG. 15 described below. In some embodiments, the identified surfaces may be stored in a transitory storage medium.

FIG. 15 shows an example of a table to store an inventory of surfaces identified from a user's local environment, according to some embodiments. Surfaces table 1500 is an exemplary table that can store the results of the identifying surrounding surfaces and attributes process in a database.

The surfaces table 1500 includes, for example, information about surfaces within a user's physical environment 1105 having data columns including surface ID 1510, width 1520, height 1530, orientation 1540, real or virtual indicator 1550, multiple 1560, position 1570, and dot product relative surface orientation to user 1580. The surfaces table 1500 may have additional columns representing other attributes of each surface. One of ordinary skill in the art may appreciate the surfaces table 1500 may be a table in a relational database or in any type of database. Additionally, the surfaces table 1500 may be an array in a computer memory (e.g., a cache) storing the results of the determining surfaces at 430 of FIG. 4.

Each row of rows 1590 in the surfaces table 1500 may correspond to a surface from the user's physical environment 1105 or a virtual surface that may be displayed to the user 1108 within the user's physical environment 1105. The surface ID 1510 is a column containing a unique identifier to uniquely identify a particular surface (e.g., a surface ID). The dimensions of the particular surface are stored in the width 1520 and height 1530 columns.

The orientation 1540 is a column indicating an orientation of the surface with respect to the user 1108 (e.g., vertical, horizontal, etc.). The real/virtual 1550 is a column indicating whether the particular surface is located on a real surface/object within the user's physical environment 1105 as perceived by the user 1108 using the head-mounted system 1160, or if the particular surface is located on a virtual surface/object that will be generated by the head-mounted system 1160 and displayed within the user's physical environment 1105. The head-mounted system 1160 may have to generate virtual surfaces/objects for situations where the user's physical environment 1105 may not contain enough surfaces, contain enough appropriate surfaces based on a matching score analysis, or head-mounted system 1160 may not detect enough surfaces to display an amount of content that the user 1108 wishes to display. In these embodiments, the head-mounted system 1160 may search from a database of existing virtual objects that may have appropriate surface dimensions to display certain types of elements identified for display. The database may be from the storage devices 1130 or the local storage device 1140. In some embodiments, a virtual surface is created substantially in front of the user, or offset from a forward vector of the head-mounted system 1160 so as to not occlude the user's primary field of view of the real world.

The multiple 1560 is a column indicating whether the surface/object is compatible with displaying multiple versions of an element (e.g., the element may be the secondary tab 1250 of FIG. 12, wherein for a particular web browser 1110, there may be more than one secondary (i.e., inactive) tab (e.g., one web page per tab). If the multiple 1560 column has a value of "Multiple", such as the case for a fourth entry of the surface ID column storing a value of 1190 corresponding to the virtual Rolodex 1190 of FIG. 12, and a fifth entry of the surface ID column storing a value of 1194 corresponding to the multi-stack virtual object 1194 of FIG. 12), the system and method will know that if there is an element that may have multiple versions of the element, as is the case for inactive tabs, these are the types of surfaces that can accommodate the multiple versions.

The position 1570 is a column indicating the position of the physical surface relative to a frame of reference or a reference point. The position of the physical surface may be pre-determined to be the center of the surface as shown in the column header of position 1570 in FIG. 15. In other embodiments, the position may be pre-determined to be another reference point of the surface (e.g., the front, back, top or bottom of the surface). The position information may be represented as a vector and/or positional information from the center of the physical surface relative to some frame of reference or reference point. There may be several ways to represent position in the surfaces table 1500. For example, the value of the position for surface ID 1194 in surfaces table 1500 is represented in the abstract to illustrate vector information and frame of reference information (e.g., the 'frame' subscript). The x, y, z are 3D coordinates in each spatial dimension and frame denotes which frame of reference the 3D coordinates are with respect to.

For example, second vertical surface ID 1186 shows a position of the center of the second vertical surface 1186 to be (1.3, 2.3, 1.3) with respect to a real world origin. As another example, surface ID 1192 shows a position of the center of the surface 1192 to be (x, y, z) with respect to a user frame of reference and surface ID 1190 shows a position of the center of the surface 1190 to be (x, y, z) with respect to another vertical surface 1182. The frame of reference is important to disambiguate which frame of reference is currently being used. In the case of a real world origin as the frame of reference, it is generally a static frame of reference. However, in other embodiments when the frame of reference is a user frame of reference, the user may be a moving reference frame, in which case, the plane (or vector information) may be moving and changing with the user if the user is moving and the user frame of reference is used as the frame of reference. In some embodiments, the frame of reference for each surface may be the same (e.g., user frame of reference). In other embodiments, the frame of reference for surfaces stored within a surfaces table 1500 may be different, depending on surface (e.g., user frame of reference, world frame of reference, another surface or object in the room, etc.)

In the current example, the values stored within the surfaces table 1500 contain physical surfaces (e.g., the vertical surfaces 1182 and second vertical surfaces 1186, and the horizontal surface 1192) identified within the user's physical environment 1105 of FIG. 12 and virtual surfaces (e.g., the virtual Rolodex 1190 and the multi-stack virtual object 1194). For example, in the current embodiment, a first entry of the surface ID 1510 column stores a value of vertical surface ID 1182 corresponding to the vertical surface 1182 of FIG. 12. A width value in the width 1520 column and a height value in the height 1530 column corresponding to the width and height of the vertical surface 1182, respectively, indicate the vertical surface 1182 has a dimension of 48" (W) by 36" (H). Similarly, an orientation value in the orientation 1540 column indicates the vertical surface 1182 has an orientation of "Vertical." Additionally, a real/virtual value in the real/virtual 1550 column indicates the vertical surface 1182 is a "R" (e.g., real) surface. A multiple value in the multiple 1560 column indicates that vertical surface 1182 is "Single" (e.g., can only hold a single content). Finally, a position 1570 column indicates the position of the vertical surface 1182 with respect to the user 1108 with a vector information of $(2.5, 2.3, 1.2)_{user}$.

The remaining rows within the surfaces table 1500 contain information for the remaining surfaces within the user's physical environment 1105. One of ordinary skill in the art may appreciate that storing the results of the determining surfaces at 430 of FIG. 4 improves the functioning of the computer itself because once this analysis has been performed on the surrounding surfaces, it may be retained by the head-mounted system 1160 for future analysis of the user's surrounding surfaces if another user or the same user 1108 is in the same user's physical environment 1105 but interested in different content. The processing steps for determining surfaces at 430 may be avoided since these processing steps have already been completed before. The only differences may include identifying additional or different virtual objects to be available based at least in part on the elements table 1400 identifying the elements with the different content.

In some embodiments, the surfaces table 1500 is stored in the storage devices 1130. In other embodiments, the surfaces table 1500 is stored in the local storage device 1140 of the user 1108 for quick access to recently viewed content or for possible revisit to the recently viewed content. Yet in other embodiments, the surfaces table 1500 may be stored at both the storage devices 1130 located remotely from the user 1108 and the local storage device 1140 located local to the user 1108.

Returning to FIG. 4, the method continues with matching the content elements to the surfaces at 440 using a combination of the identified content elements from the identifying content elements in the content 420 and the determined surfaces from the determining surfaces at 430 and in some embodiments, using virtual objects as additional surfaces. Matching the content elements to the surfaces may involve multiple factors, some of which may include analyzing hints provided by a content designer via HTML tag elements defined by the content designer by using an HTML Page parser such as the example HTML Page parser discussed above. Other factors may include selecting from a pre-defined set of rules of how and where to match/map certain content as provided by an AR browser, AR interface, and/or cloud storage.

Referring briefly to FIG. 7A, it depicts a flow diagram illustrating a method for matching content elements to surfaces, according to some embodiments. At 710, the method determines whether an identified content element contains hints provided by the content designer. The content designer may provide hints as to where to best display the content element. For example, the main video 1220 of FIG. 12 may be a video displayed on a web page within the active tab 1260. The content designer may provide a hint to indicate that the main video 1220 is best displayed on a flat vertical surface in a direct view of the user 1108.

Figure 16:
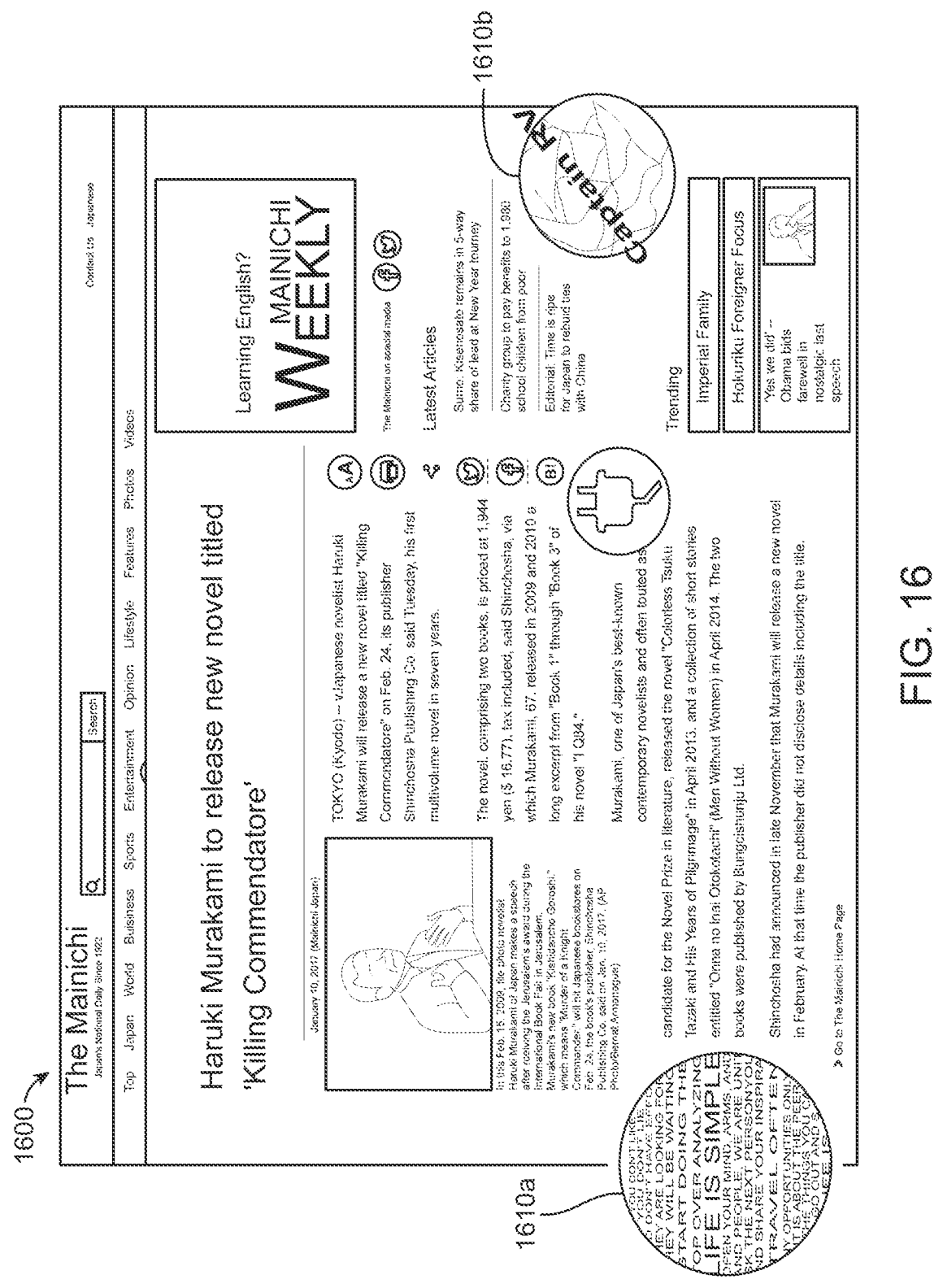

In some embodiments, a 3D preview for web links may be represented as a set of new HTML tags and properties associated to a web page. FIG. 16 shows an example 3D preview for web links, according to some embodiments. A content designer may use the new HTML properties to specify which web link has associated 3D previews to be rendered for. Optionally the content designer/web developers may specify a 3D model to be used to render the 3D web preview on. If a content designer/web developer specifies a 3D model to be used to render a web preview, a web content image may be used as a texture to the 3D model. A web page may be received. If there are preview properties specified for certain link tags, first level web pages (e.g. web pages that are directly linked on the first page) may be retrieved and based on the preview properties, a 3D preview may be generated and loaded onto the 3D model specified by the content designer, or a default 3D model (e.g., a sphere 1610a). Although 3D previews are described with respect to web links, 3D previews may be used for other content types, and may appear separate from the initial content according to their own parsed and matched attribute profiles. One skilled in the art may appreciate there are many other ways a content designer may provide hints as to where a particular content element should be placed in a 3D environment other than what has been disclosed herein and that these are some examples of different ways the content designer may provide hints to display certain or all content elements of the content of the web page.

In another embodiment, a tag standard (e.g., HTML tag standard) may include new tags (e.g., HTML tags) or the creation of a similar mark-up language for providing hints such as in the example web page provided by the content designer discussed above. If the tag standard includes these types of additional tags, certain embodiments of the methods and systems will leverage these tags to further provide a matching/mapping of the identified content elements to identified surfaces.

Figure 17:
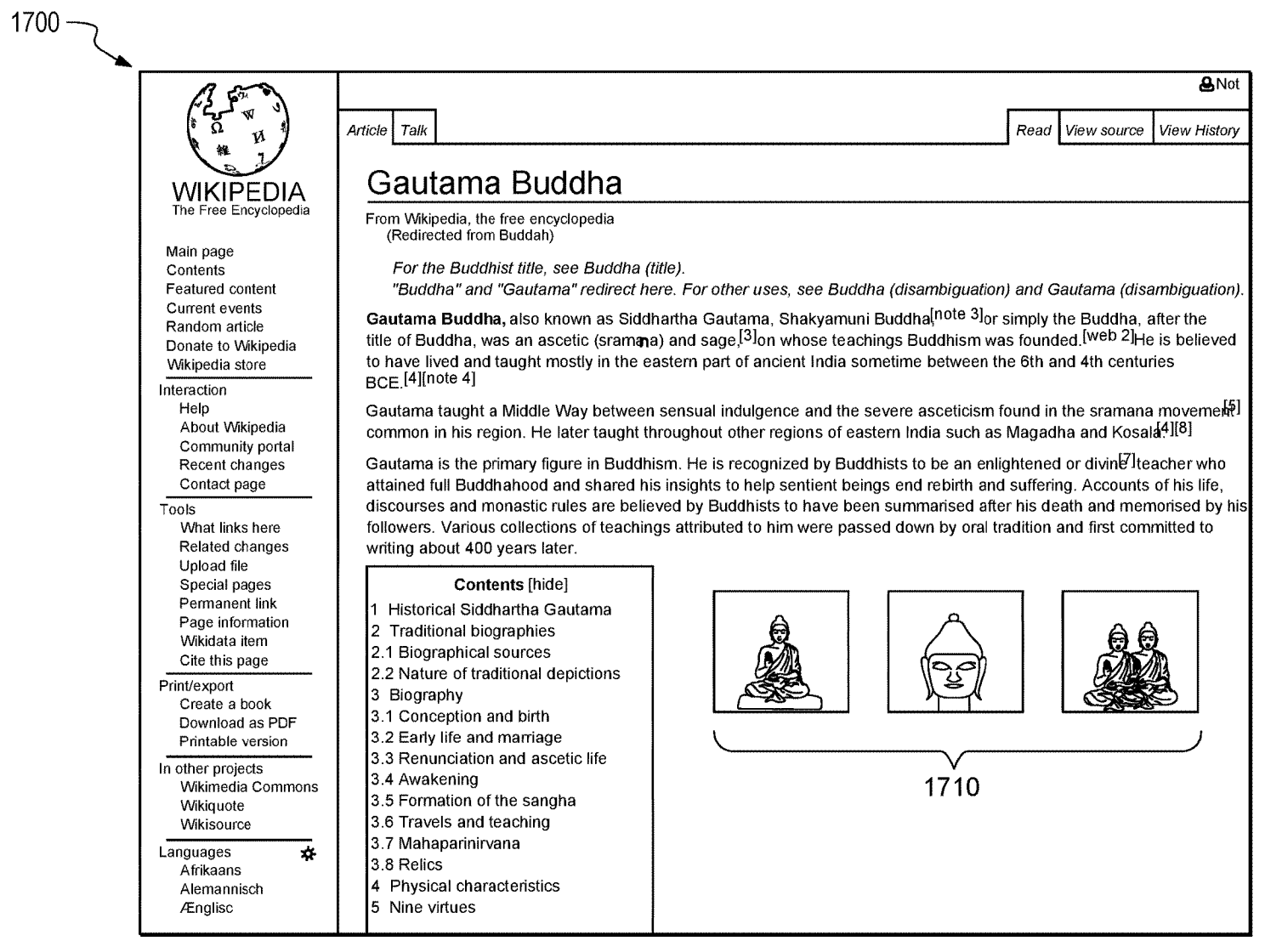

For example, a set of web components may be exposed as new HTML tags for content designers/web developers to use to create elements of a web page which would manifest themselves as 3D volumes sticking out of the 2D web page or 3D volumes etched into a 2D web page. FIG. 17 shows an example of a web page having 3D volumes etched into the webpage (e.g., 1710). These 3D volumes may include web controls (e.g., buttons, handles, joysticks) which would be placed on the web page allowing users to manipulate the web controls to manipulate content displayed within the web page, or may be views of additional content related to the web components themselves. One skilled in the art may appreciate there are many other languages other than HTML that may be modified or adopted to further provide hints for how content elements should best be displayed in a 3D environment and that new HTML tagging standards is just one way to achieve such a goal.

At 720, the method determines whether to use hints provided by the content designer or to use pre-defined sets of rules to match/map the content elements to the surfaces. At 730, if it was determined that using the hints provided by the content designer is the way to proceed, the system and method analyzes the hints and searches the logical structures including identified surrounding surfaces that may be used to display the particular content element based at least in part on the hint (e.g., querying the surfaces table 1500 of FIG. 15).

At 740, the system and method run a best-fit algorithm to choose a best-fit surface for the particular content element based on the provided hints. The best-fit algorithm, for example, may take a hint of for a particular content element and try to identify surfaces that are front and center with respect to the user 1108 in the environment. For example, the main video 1220 of FIG. 12 is matched/mapped to the vertical surface 1182 because the main video 1220 has a preference value of "Main" in the preference attribute 1420 column of the elements table 1400 of FIG. 14A within the active tab 1260 and the vertical surface 1182 is the surface that is in the direct vision of the user 1108 and has an optimal sized dimension to display a main video 1220.

At 750, the system and method store the matching results having matchings of content elements to surfaces. The table may be stored in a non-transitory storage medium to be used by a display algorithm to display the content elements onto their respectively matched/mapped surfaces. The non-transitory storage medium may include a data storage device such as the storage devices 1130 or the local storage device 1140. The matching results may be stored in a particular table, such as the table disclosed in FIG. 18 below.

FIG. 18 shows an example of a table to store the matching of content elements to surfaces, according to some embodiments. Matching/mapping table 1800 is an exemplary table that stores results of the content elements matched to surfaces process into a database. The matching/mapping table 1800 includes, for example, information about the content element (e.g., element ID) and the surfaces that the content element is matched/mapped to (e.g., surface IDs). One of ordinary skill in the art may appreciate the matching/mapping table 1800 may be a table stored in a relational database or in any type of database or storage medium. Additionally, the matching/mapping table 1800 may be an array in a computer memory (e.g., a cache) containing the results of the matching of the content elements to the surfaces at 440 of FIG. 4.

Each row of the matching/mapping table 1800 corresponds to a content element matched to one or more surfaces either in the user's physical environment 1105 or a virtual surfaces/objects that are displayed to the user 1108, wherein the virtual surfaces/objects appears to be surfaces/objects in the user's physical environment 1105. For example, in the current embodiment, a first entry of the element ID column stores a value of element ID 1220 corresponding to the main video 1220. A surface ID value in the surface ID column corresponding to the main video 1220 is 1182 corresponding to the vertical surface 1182. In this manner, the main video 1220 is matched/mapped to the vertical surface 1182. Similarly, the user comments 1230 are matched/mapped to the horizontal surface 1192, the suggested videos 1240 are matched/mapped to the second vertical surface 1186, and the secondary tab 1250 is matched/mapped to the virtual Rolodex 1190. The element IDs in the matching/mapping table 1800 may be associated to element IDs stored in the elements table 1400 of FIG. 14A. The surface IDs in the matching/mapping table 1800 may be associated to surface IDs stored in the surfaces table 1500 of FIG. 15.

Returning to FIG. 7A, at 760, assuming it was determined that using the predefined rules is the way to proceed, the method queries a database containing matching/mapping rules of content elements to surfaces and determines for a particular content element within a web page, which types of surfaces should be considered for matching/mapping the content element. For example, the rules returned for the main video 1220 from FIG. 12 may indicate that main video 1220 should be matched/mapped to vertical surfaces, and thus after searching the surfaces table 1500, multiple candidate surfaces are revealed (e.g., the vertical surfaces 1182 and second vertical surfaces 1186, and the virtual Rolodex 1190). At 770, the pre-defined sets of rules may run a best-fit algorithm to choose from the available candidate surfaces, which surface is the best fit for this main video 1220. Based at least in part on the best-fit algorithm, it is determined that the main video 1220 should be matched/mapped to the vertical surface 1182 because of all of the candidate surfaces, the vertical surface 1182 is a surface that is in the direct line of sight of the user 1108 and the vertical surface 1182 has the best dimension for displaying a video. Once the matching/mapping of the one or more elements is determined, at 750 the method stores the matching/mapping results for the content elements in a matching/mapping of elements to surfaces table in a non-transitory storage medium as described above.

Returning to FIG. 4, the method continues with rendering the content elements as virtual content onto matched surfaces at 450. The head-mounted system 1160 may include one or more display devices within the head-mounted system 1160 such as mini projectors (not shown) to display information. The one or more elements are displayed onto the respective matched surfaces as matched at 440. Using the head-mounted system 1160, the user 1108 will see the content on the respective matched/mapped surfaces. One of ordinarily skill in the art may appreciate the content elements are displayed to appear to be physically attached on the various surfaces (physical or virtual) but in actuality, the content elements are actually projected onto the physical surfaces as perceived by the user 1108 and in the cases of virtual objects, the virtual objects are displayed to appear to be attached on the respective surfaces of the virtual objects. One of ordinarily skill in the art may appreciate that when the user 1108 turns their head or looks up or down, the display devices within the head-mounted system 1160 may continue to keep the content elements affixed to their respective surfaces to further provide the perception to the user 1108 that the content are affixed to the matched/mapped surfaces. In other embodiments, the user 1108 may change the content of the user's physical environment 1105 by a motion made by head, hands, eyes or voice of the user 1108.

Application

Figure 19:
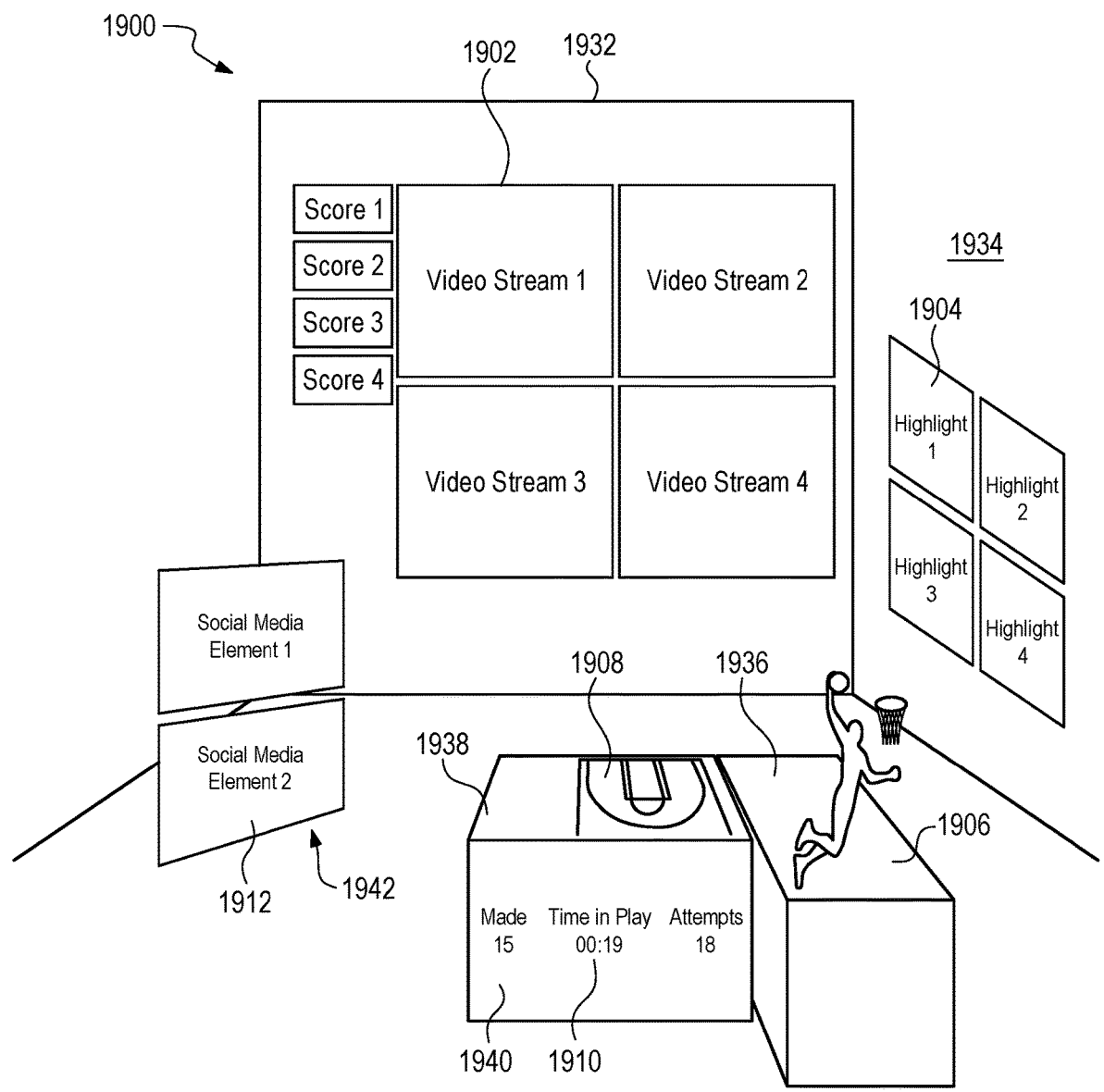
FIG. 19 shows an example of an environment including content elements matched to surfaces, according to some embodiments

FIG. 19 shows an example of an environment 1900 including content elements matched to surfaces, according to some embodiments.

Referring briefly to FIG. 4 with respect to this example, the parser 115 receives 410 content 110 from an application. The parser 115 identifies 420 content elements in the content 110. In this example, the parser 115 identifies a video panel 1902, a highlights panel 1904, a replay 1906, graphic statistics 1908, text statistics 1910, and a social media news feed 1912.

The environment parser 168 determines 430 surfaces in the environment. In this example, the environment parser 168 determines a first vertical surface 1932, a second vertical surface 1934, a top 1936 of a first ottoman, a top 1938 of a second ottoman, and a front 1940 of the second ottoman. The environment parser 168 may determine additional surfaces in the environment; however, in this example, the additional surfaces are not labeled. In some embodiments, the environment parser 168 continuously determine 430 surfaces in the environment. In some embodiments, the environment parser 168 determines 430 surfaces in the environment as the parser 115 receives 410 content 110 and/or identifies 420 content elements in the content 110.

The matching module 142 matches 440 the content elements to the surfaces based on the attributes of the content elements and the attributes of the surfaces. In this example, the matching module 142 matches the video panel 1902 to the first vertical surface 1932, the highlights panel 1904 to the second vertical surface 1934, the replay 1906 to the top 1936 of the first ottoman, the graphic statistics 1908 to the top 1938 of the second ottoman, the text statistics 1910 to the front 1940 of the second ottoman.

The optional creating virtual objects module 144 may create virtual objects for displaying the content elements. During the matching process of the matching module 142, it may be determined that a virtual surface may be an optional surface to display certain content elements. In this example, the optional creating virtual objects module 144 creates a virtual surface 1942. The social media news feed 1912 is matched to the virtual surface 1942. The rendering module 146 renders 450 the content elements to their matched surfaces. The resulting FIG. 19 illustrates what a user of a head-mounted display device running the application would see after the rendering module 146 renders 450 the content elements to their matched surfaces.

Dynamic Environment

In some embodiments, the environment 1900 is dynamic: either the environment itself is changing and objects move in to/out of the user's field of view to create new surfaces, or the user moves to a new environment while receiving content elements such that previously matched surfaces no longer qualify under the previous environment compositing process 140 results. For example, while watching a basketball game in environment 1900 as in FIG. 19, the user may walk into the kitchen.

Figure 20A:
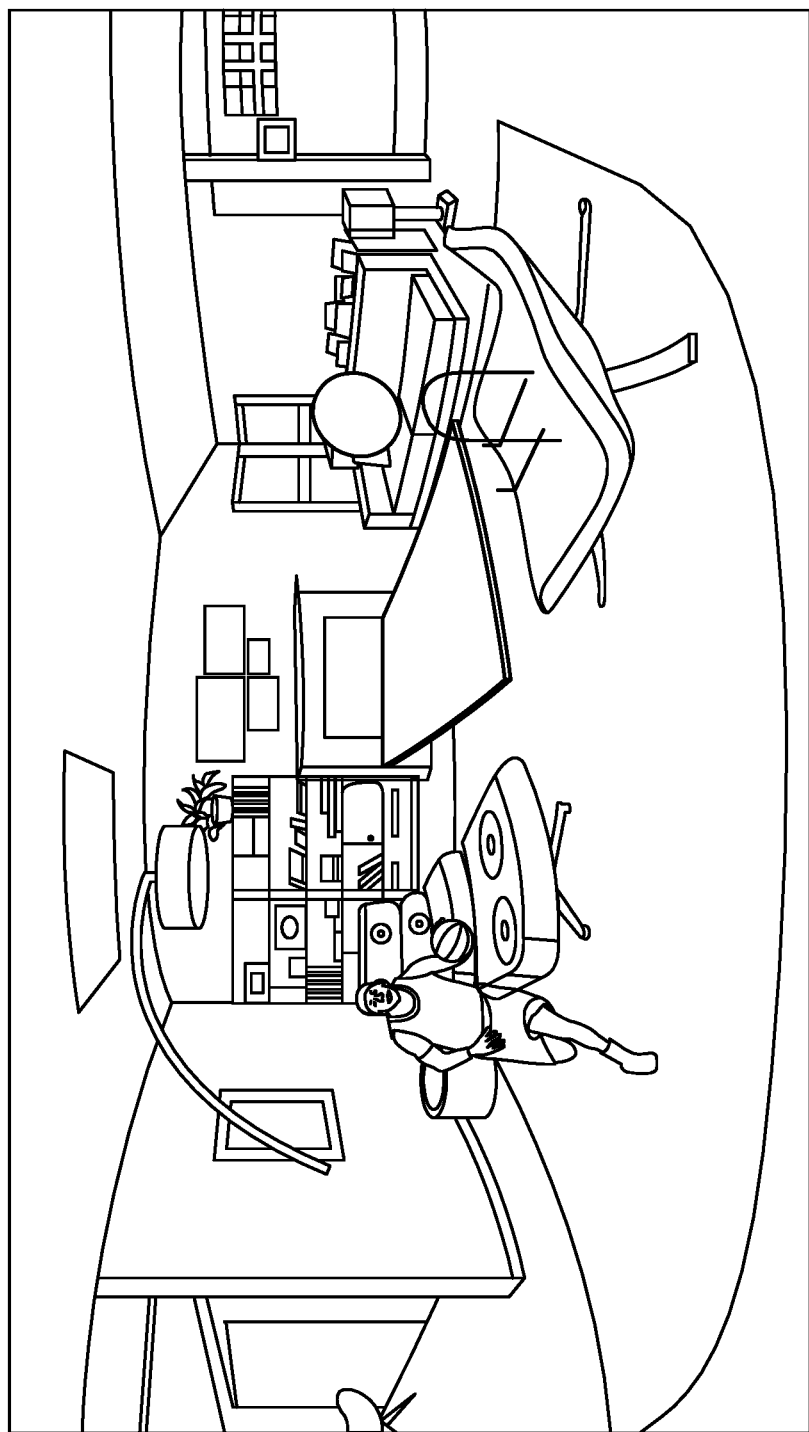
FIGS. 20A-20O illustrate examples of dynamic environment matching protocols for content elements, according to some embodiments.
Figure 20B:
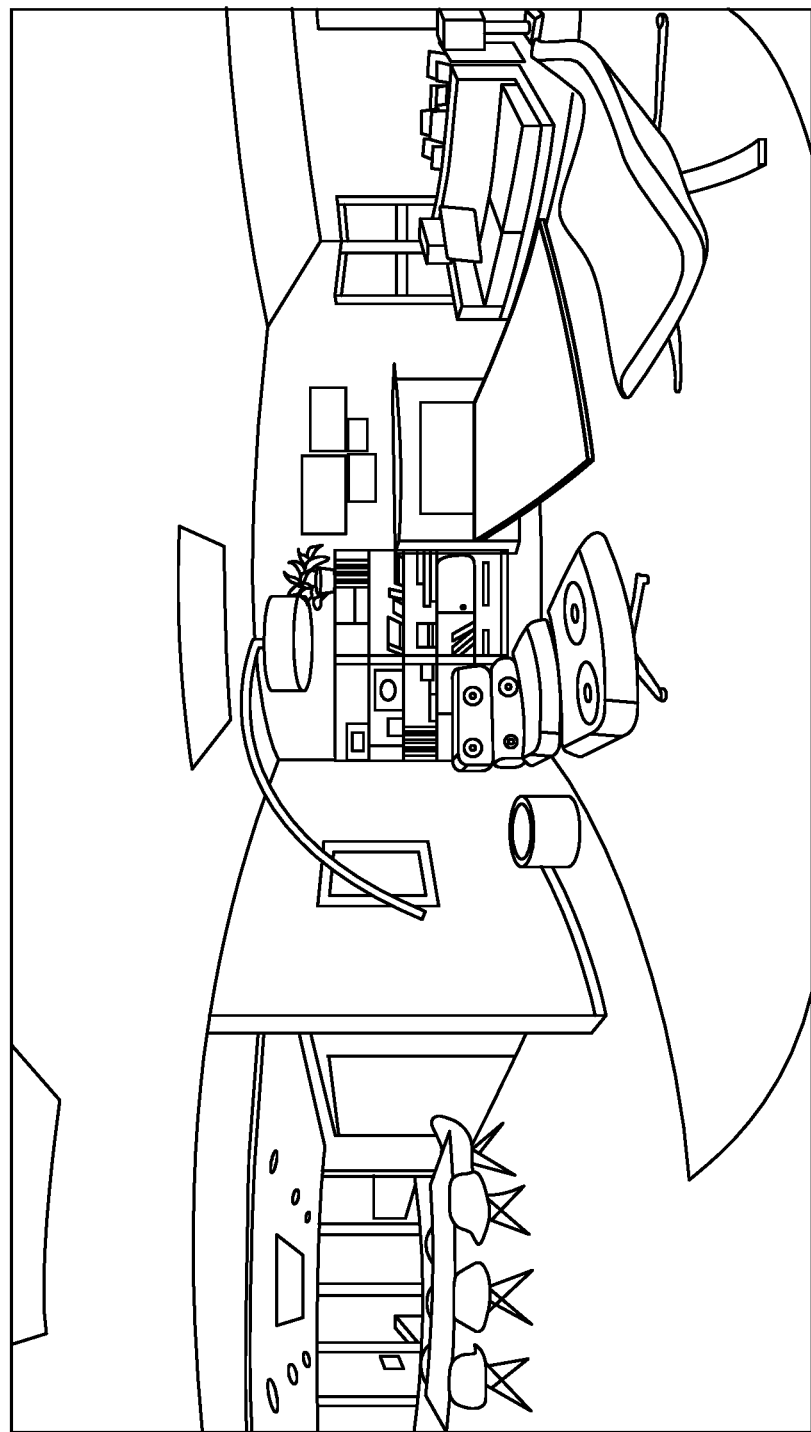

FIGS. 20A-20E depict a change of environment as a function of the user moving, though one of skill in the art will appreciate the following techniques would apply to a changing environment about a static user. In FIG. 20A, a user is watching spatialized display of content, after an environment compositing process 140 as described throughout this disclosure. FIG. 20B illustrates the larger environment that a user may be immersed in, and additional surfaces eligible to the user.

Figure 20C:
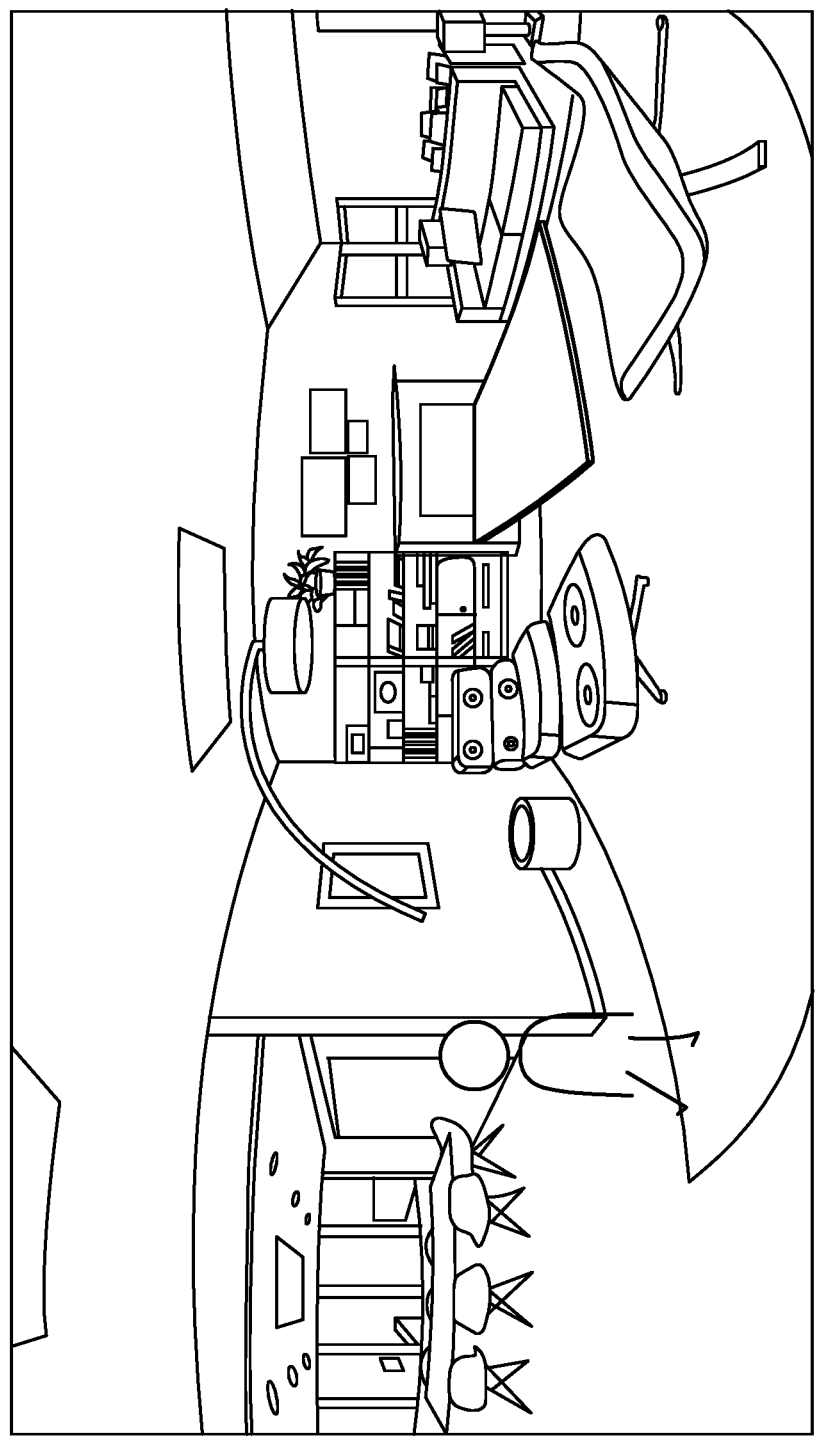

As a user moves from one room to another, as depicted in FIG. 20C, it is readily apparent that the content initially rendered for display in FIG. 20A no longer satisfies the matching of the environment compositing process 140. In some embodiments, sensors 162 prompt the system of a user's change in environment. A change in environment may be a change in depth sensor data (the room on the left side of FIG. 20C produces a new virtual mesh construction than the room to the right of FIG. 20C where content was initially rendered for display), change in headpose data (the IMU produces motion changes in excess of a threshold for the current environment, or cameras on the head-mounted system begin to capture new objects in their field of view). In some embodiments, the change of environment initiates a new environment compositing process 140 to find new surfaces for content elements previously matched and/or currently rendering and displaying. In some embodiments, a change of environment that exceeds a temporal threshold initiates a new environment compositing process 140 to find new surfaces for content elements previously matched and/or currently rendering and displaying. The temporal threshold precludes wasteful computing cycles for minor interruptions to environment data (such as simply turning a head to talk to another user, or brief exits of an environment the user shortly returns from).

Figure 20D:
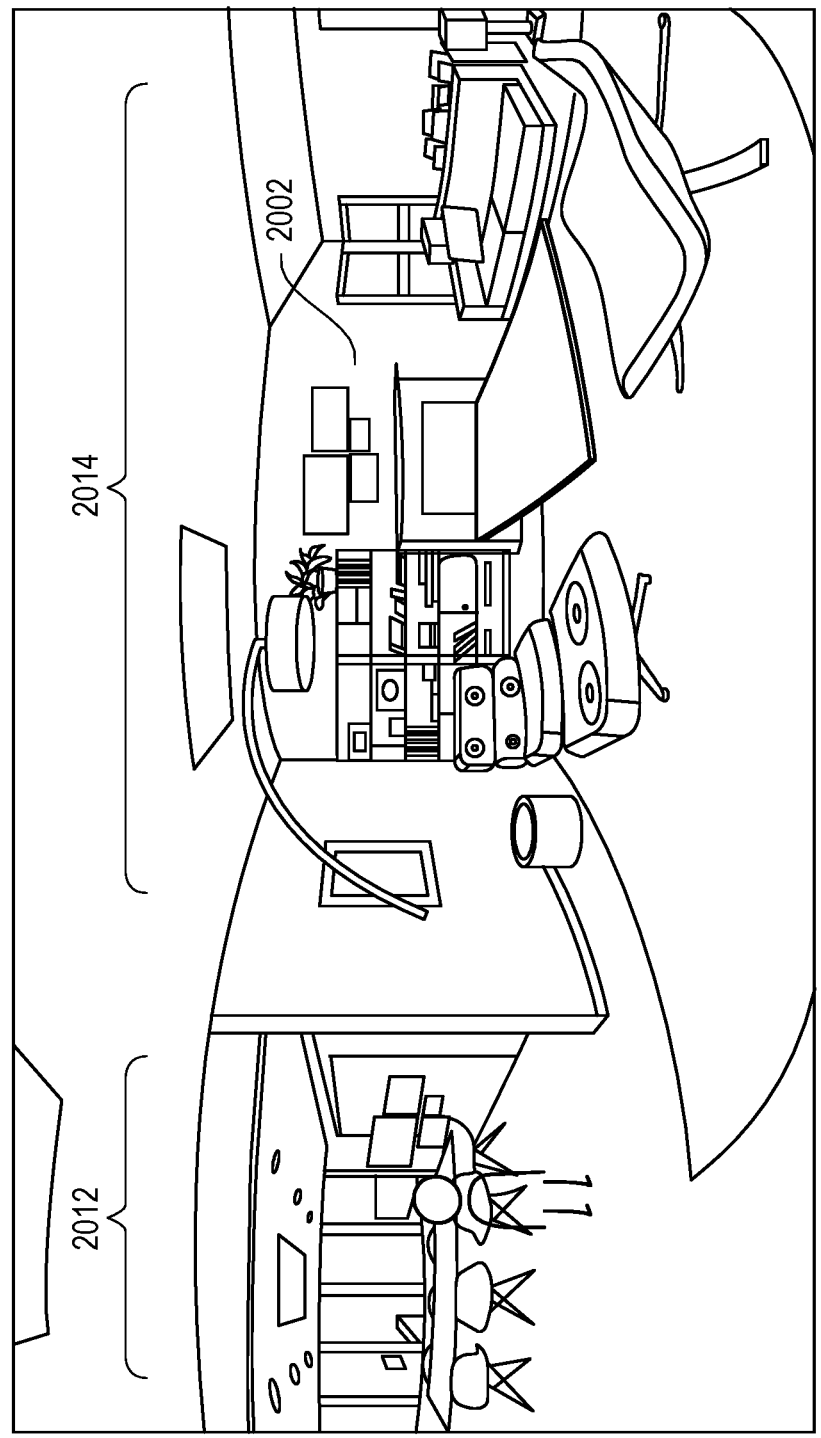

In some embodiments, as the user transitions from one environment to another, sensors 162 or the environment structurization process 160 generally cannot find a suitable surface, or upon selection by the user or determination by the environment compositing process 140 and/or by the environment structurization process 160, active content (such as 2002 as depicted in FIG. 20D) may revert to display on a virtual surface within the user's field of view, such as on a virtual surface at a central portion or off-center. In other words, the content may no longer be world-centric but may be user-centric and fixed relative to the user's field of view. In some embodiments, active content may start off on a virtual surface within the user's field of view, such as on a virtual surface at a central position or off-center. In other words, the content may start as being user-centric and fixed relative to the user's field of view. In some embodiments, the content may remain on the virtual surface and thus stay user-centric. In some embodiments, the content may transition from being on the virtual surface to being on a suitable surface and thus transition from user-centric to world-centric.

In some embodiments, the trigger to display on such virtual surface occurs when sensors 162 detect a translation or rotational movement in excess of a limit (e.g., threshold) in a given duration of time. Limits to translational or rotational movement may be relative to one another, that is there is continuous translational or rotational motion within the duration despite fluctuations in amplitude or degree; in some embodiments, the limit may be met if a certain number of maxima are detected within the duration (in other words the user is making a sufficient number of periodic motions within the duration even if not continuous). In some embodiments, the limit may be content driven, such that the type of content dictates when the content will revert from world centric to user centric. For example, content may include a transition attribute that will revert to user-centric when certain events in the content occur or are about to occur to ensure the user is focused on it.

To facilitate the fixed perspective and adjusted viewing surfaces, the active content 2002 dimension or area attribute (i.e., size) is adjusted during periods of intermittent user-centric display. If a size attribute of content 2002 was initially parsed and matched to a surface, and user transition obviates suitable surfaces, a parameter of the wearable user device, such as the limits of the user device's field of view, becomes the new "working surface" or virtual surface size limit and a dimension or area attribute of the content is temporarily replaced or adjusted to be a function of the user device's field of view (e.g., a dimension attribute is scaled up or down such that an axis of the content matches, is a multiple, or is a fraction of an axis of the user device's field of view). In some embodiments, the user centric display of content is fixed within the user's field of view, such as centrally located within a 60 degree fan as measured from either pupil of the user, or offset to a peripheral region.

In some embodiments, the trigger to display on such virtual surface occurs when the entity (e.g., a content designer) provides the content 110. The entity may be, for example, an application. The entity may indicate that the content 110 is to be displayed on a virtual surface and thus be user-centric. In some embodiments, the entity may indicate that the content 110 is to be displayed on a virtual surface only and thus be user-centric only. In some embodiments, the entity may indicate that the content 110 is to be displayed initially on a virtual surface and then may be displayed on a suitable surface in the environment if such a surface is determined, for example, after a period of time, and thus transition from being user-centric to being world-centric. This may be indicated by a transition attribute that is set to change from user-centric to world-centric, for example, after a period of time.

In some embodiments, as the user enters room 2012 of FIG. 20D, the environment compositing process 140 matches the active content 2002 that was matched to room 2014 with a new surface. In some embodiments, active content 2002 is now active content in both rooms 2012 and 2014, though only displayed in room 2012 (the appearance of active content 2002 in room 2014 in FIG. 20D depicts active content 2002 is still rendering, though not displaying to the user).

In this way, the user may walk between rooms 2012 and 2014 and the environment compositing process 140 need not continually repeat a matching protocol. In some embodiments, active content 2002 in room 2014 is set to an idle or sleep state while the user is located in room 2012, and similarly if the user returns to room 2014, active content in room 2012 is put to an idle or sleep state. Accordingly, a user may automatically continue consumption of content as they dynamically change their environment.

In some embodiments, a user may pause active content 2002 in room 2014 and enter room 2012 and resume the same content at the same interaction point as where they paused in room 2014. Accordingly, a user may automatically resume consumption of content as they dynamically change their environment.

An idle or sleep state may be characterized in the degree of output the content element performs. Active content may have full capacity of the content element rendered, such that the frames of the content continue to update for its matched surface, audio output continues for a virtual speaker associated with the matched surface location, etc. Idle or sleep states may reduce some of this functionality; in some embodiments, audio output of an idle or sleep state reduces in volume or enters a mute state; in some embodiments, rendering cycles slow down so that fewer frames are generated. Such slower frame rate may save computing power overall, but introduce minor latency in resuming content element consumption if the idle or sleep state is returned to an active state (such as a user returning the room the idle or sleep state content element was operating in).

Figure 20E:
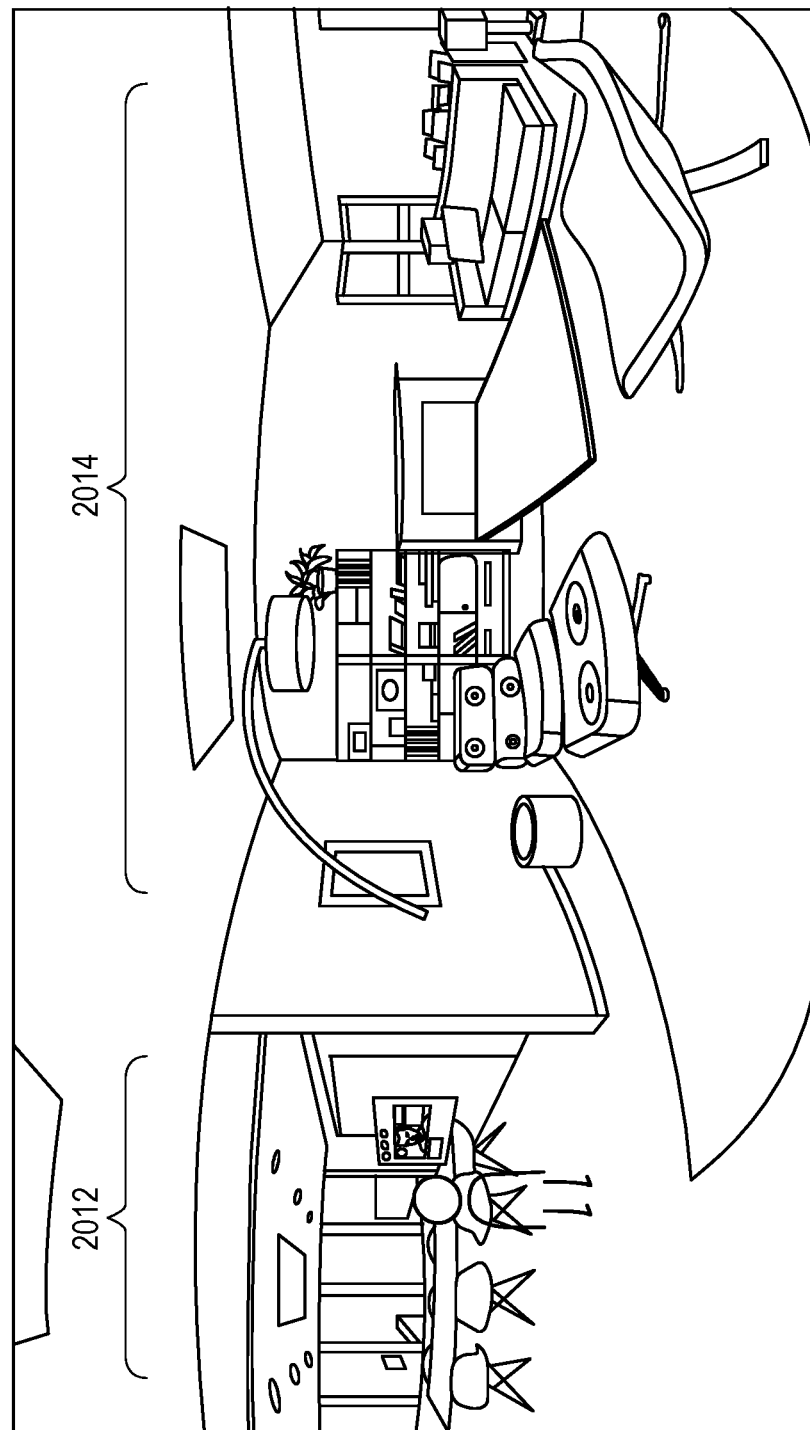

FIG. 20E depicts a cessation of rendering a content element in a different environment, not simply a change to an idle or sleep state. In FIG. 20E, active content in room 2014 has ceased. In some embodiments, the trigger for cessation of rendering is changing the content element from one source to another, such as changing a channel of a video stream from a basketball game to a movie; in some embodiments, the active content immediately ceases rendering once the sensors 162 detect a new environment and a new environment compositing process 140 begins.

In some embodiments, contents rendered and displayed on a first surface in a first location may be paused and then subsequently resumed on a second surface in a second location, for example, based at least in part on a movement of a user from the first location to the second location. For example, a user watching content displayed on a first surface in a first location (e.g., a living room) may physically move from the first location to a second location (e.g., a kitchen). The rendering and/or displaying of the content on the first surface in the first location may be paused upon determination (e.g., based on the sensors 162) that the user has physically moved from the first location to the second location. Once the user moves into the second location, sensors of the AR system (e.g., the sensors 162) may detect that the user has moved into a new environment/location and the environment parser 168 may begin to identify new surfaces in the second location and then may resume displaying the content on a second surface in the second location. In some embodiments, the contents may continue to be rendered on the first surface in the first location while the user moves from the first location to the second location. Once the user is in the second location, for example, for a threshold period of time (e.g., 30 seconds), the contents may stop being rendered on the first surface in the first location and may be rendered on the second surface in the second location. In some embodiments, the contents may be rendered on both the first surface in the first location and the second surface in the second location.

In some embodiments the pausing of the rendering and/or displaying of the content at the first surface in the first location may be automatic in response to a user physically moving from the first location to the second location. The detection of the user's physical movement may trigger the automatic pausing of the content, wherein the trigger of the user's physical movement may be based at least in part on an inertial measurement unit (IMU) in excess of a threshold or a positional indication that the user has moved or is moving (e.g., GPS), for example, outside a predetermined area which may be associated with the first location. The content may auto-resume rendering and/or displaying on the second surface in the second location once the second surface is identified by, for example, the environment parser 168 and matched to the content. In some embodiments, the content may resume rendering and/or displaying on the second surface based at least in part on a selection of the second surface by the user. In some embodiments, the environment parser 168 may refresh within a particular timeframe (e.g., every 10 seconds) to determine whether surfaces within a field of view of the user has changed and/or a physical location of the user has changed. If it is determined that the user has moved to a new location (e.g., the user moved from the first location to the second location) the environment parser 168 may begin to identify new surfaces within the second location for resuming the rendering and/or displaying of the content onto the second surface. In some embodiments, content rendering and/or displayed on a first surface may not automatically pause immediately simply because a user changes the field of view (e.g., the user looks to another person in the first location briefly, for example, to have a conversation). In some embodiments, the rendering and/or displaying of the content may be automatically paused if the user's changed field of view exceeds a threshold. For example, if a user changes headpose and therefore the corresponding field of view for a time period exceeding the threshold, the displaying of the content may be automatically paused. In some embodiments, the content may auto-pause rendering and/or display content on the first surface in the first location in response to the user leaving the first location, and the content may auto-resume rendering and/or displaying on the first surface in the first location in response to the user physically (re)entering to the first location.

In some embodiments, as a field of view of a user and/or a head-mounted device of a user changes, the content on a particular surface may lazily follow the change of field of view of the user. For example, the content may be within a direct field of view of the user. If the user changes the field of view, the content may change position to follow the field of view change. In some embodiments, the content may not be immediately displayed on a surface in a direct field of view of the changed field of view. Instead, there may be a slight latency in the change of the content relative to the change in the field of view wherein the change of the content location may appear to lazily follow the change of the field of view.

Figure 20F:
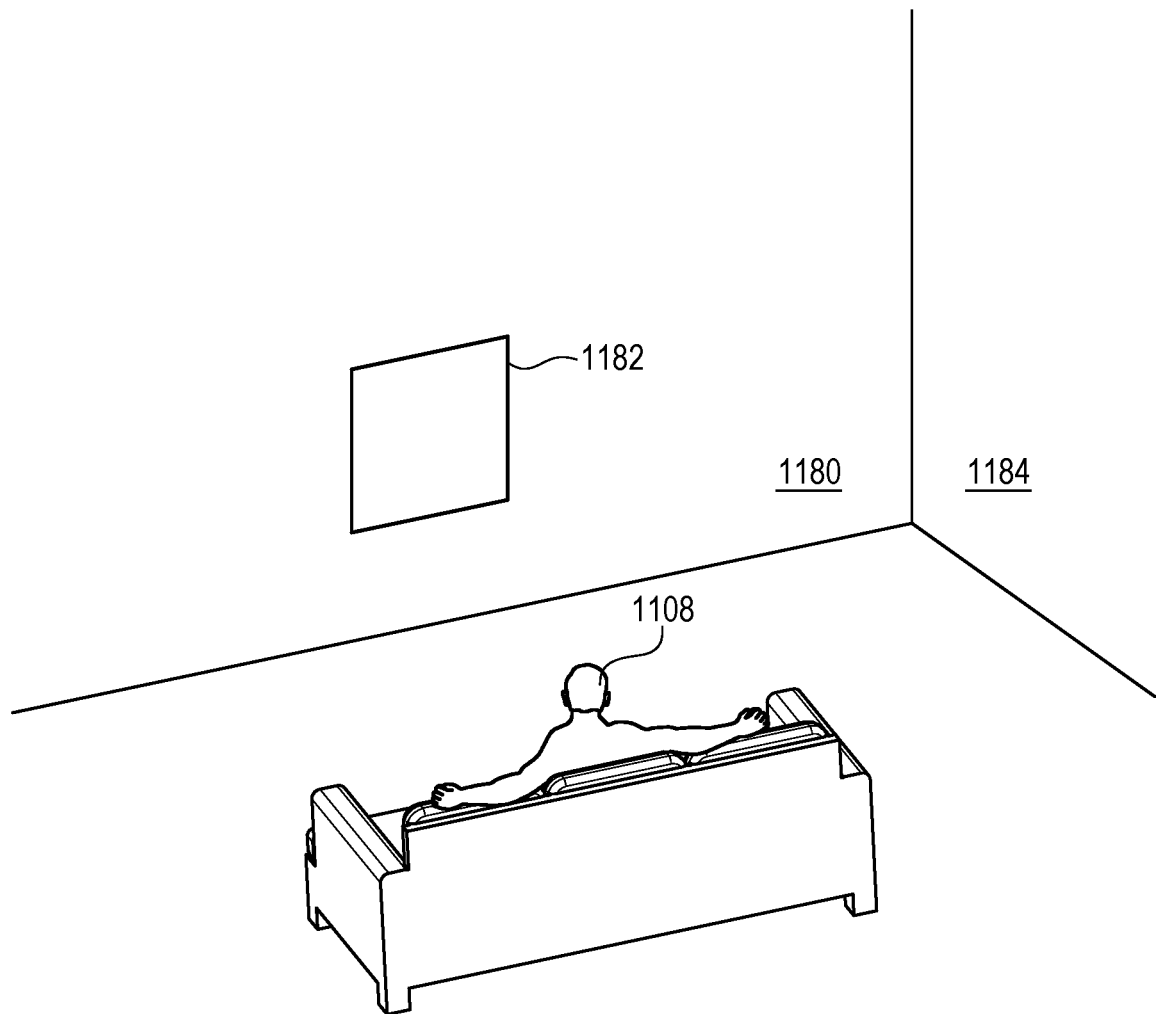
Figure 20G:
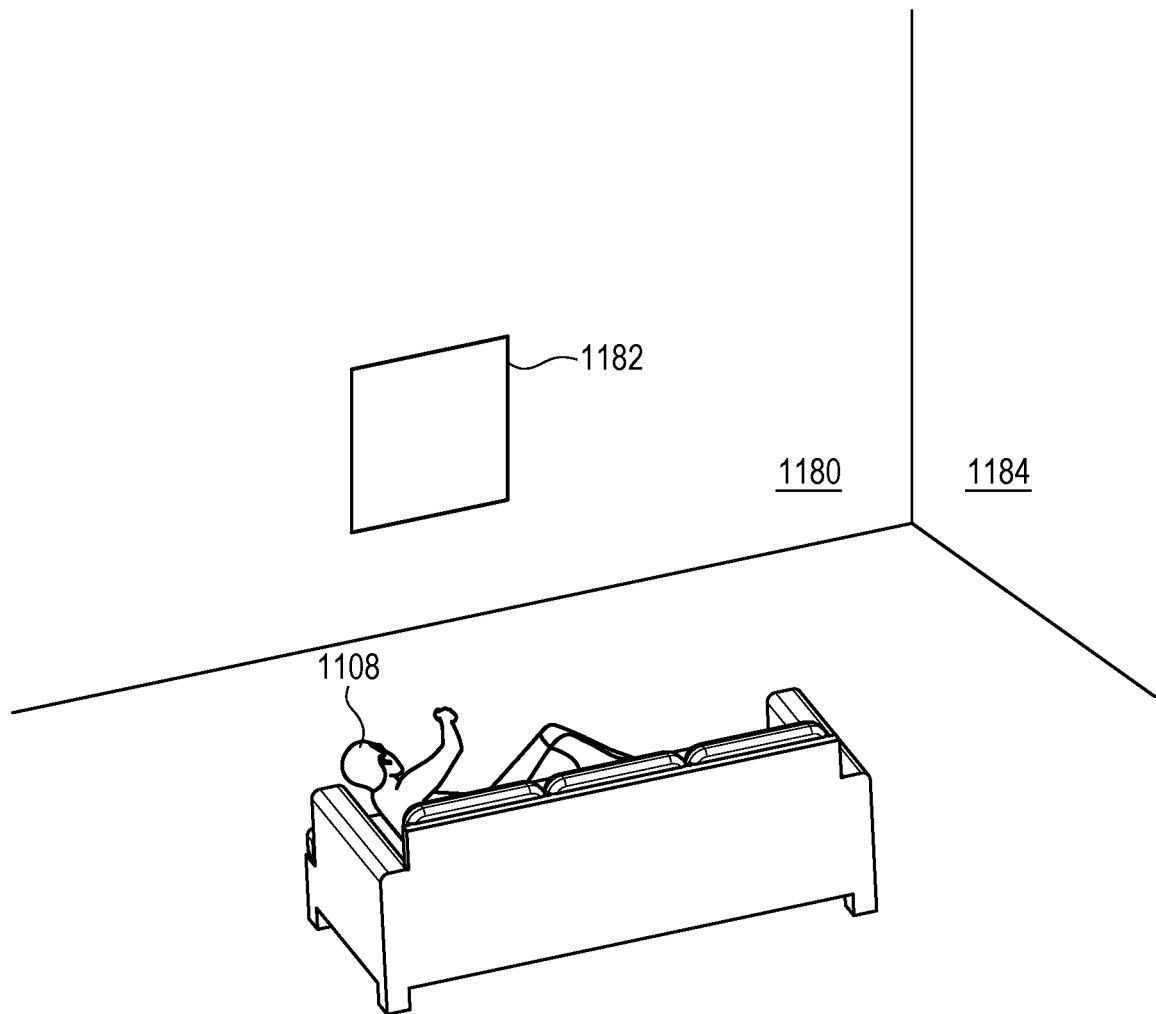
Figure 20H:
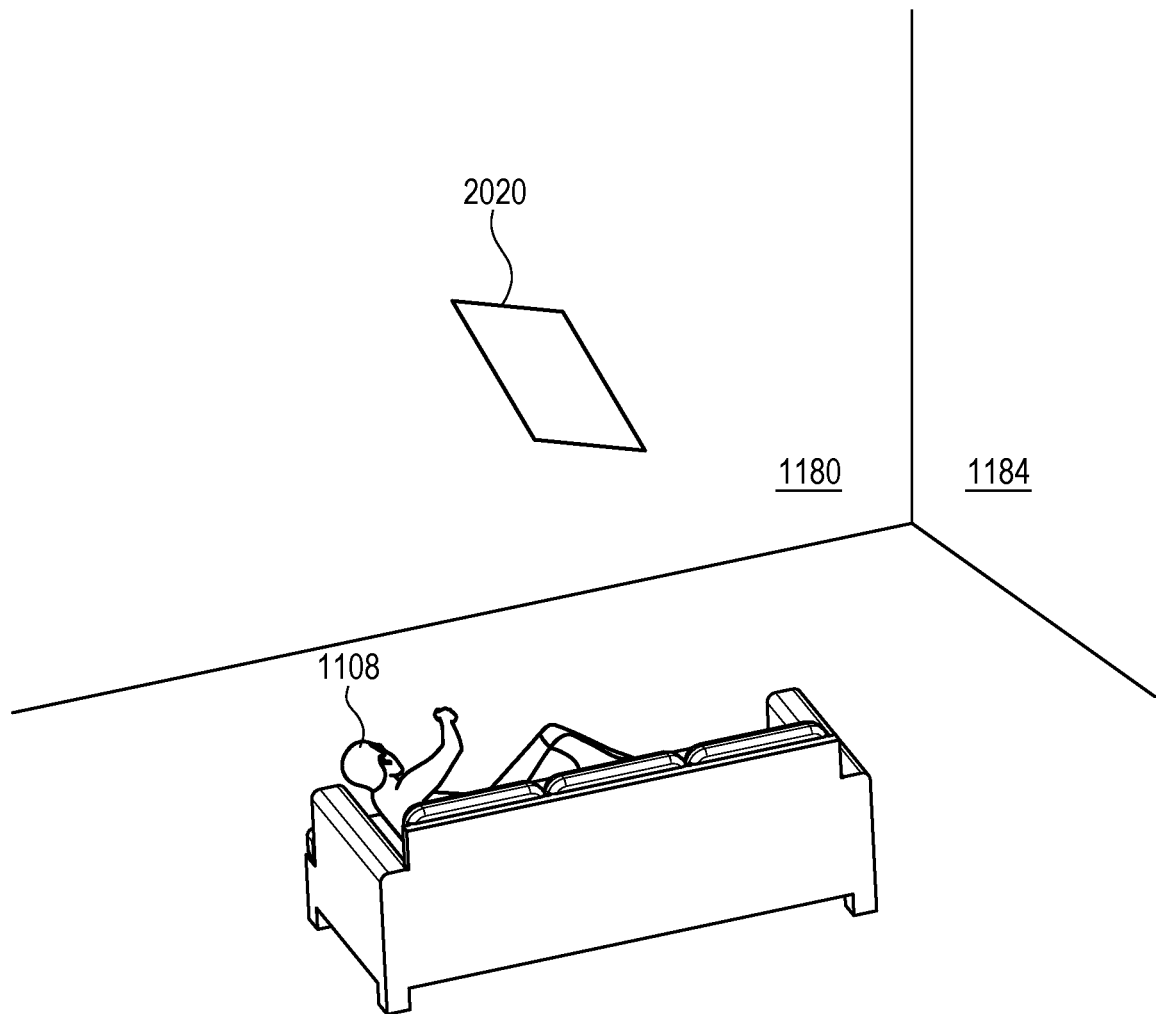
Figure 20I:
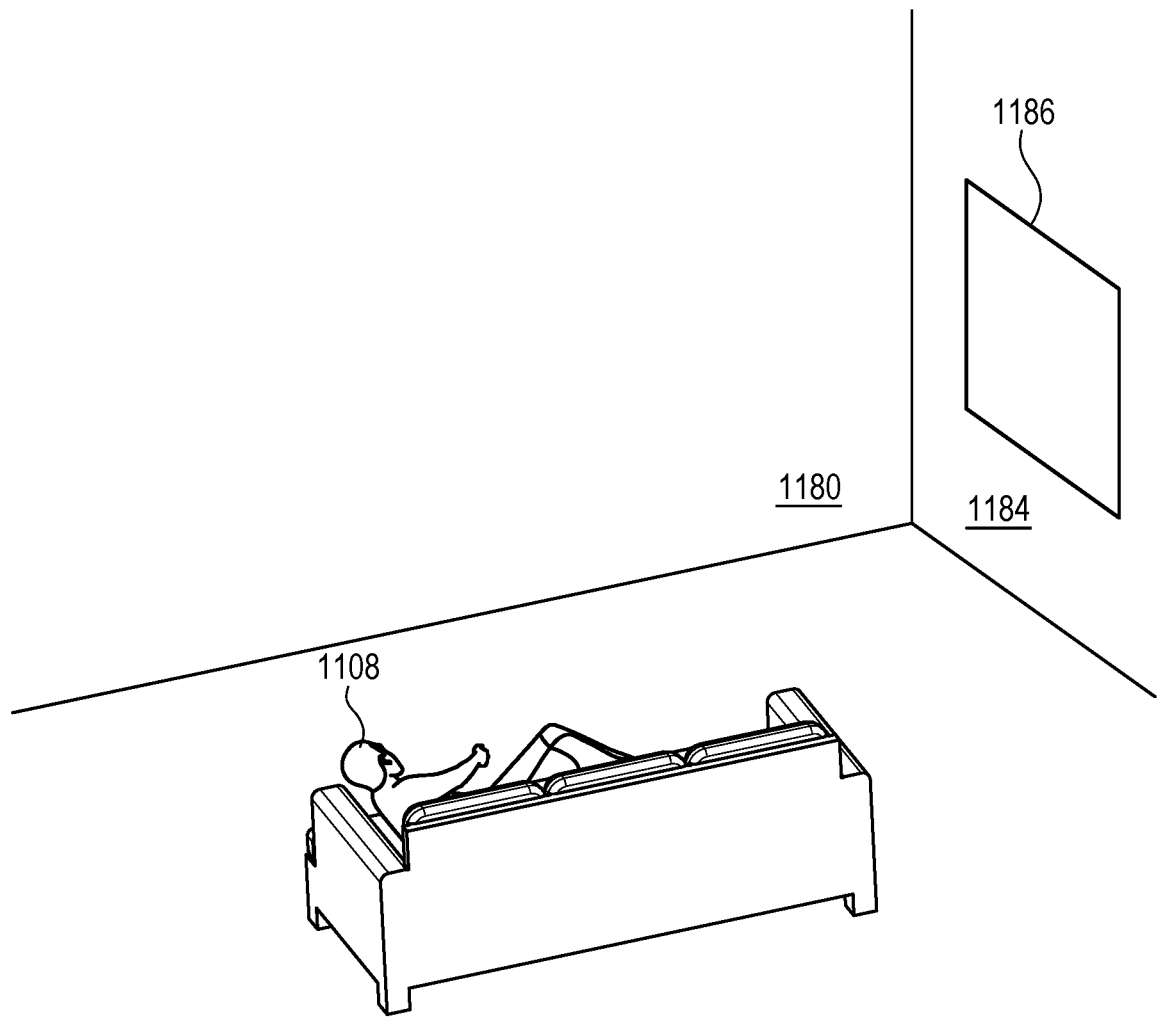

FIGS. 20F-20I illustrate an example of a content displayed on a particular surface may lazily follow a change of a field of view of a user currently watching the content. In FIG. 20F, a user 1108 is in a sitting position on a couch in a room watching spatialized display of content, the sitting position having a first headpose of the user and/or of a head-mounted device of the user facing towards, for example, a main wall 1180. As illustrated in FIG. 20F, the spatialized display of content is displayed at a first location (e.g., a vertical surface 1182) of a main wall 1180 via the first headpose. FIG. 20G illustrates the user 1108 changing positions on the couch from the sitting position to a lying down position, the lying down position having a second headpose facing towards, for example, a side wall 1184 instead of the main wall 1180. The content displayed on the vertical surface 1182 may continue to render/display at the vertical surface 1182 until a time threshold and/or a headpose change threshold has been met/exceeded. FIG. 20H illustrates the content may lazily follow the user, that is move with small discrete incremental positions to a new location corresponding to the second headpose facing towards the side wall 1184 as opposed to a single update, and appear to display at a first display option/surface 2020, for example, after a certain point in time after the user 1108 has changed from the sitting position to the lying down position (e.g., after a certain time threshold). The first display option/surface 2020 may be a virtual display screen/surface within the field of view corresponding to the second headpose since there are no optimal surfaces available within the direct field of view of the user 1108. FIG. 20I illustrates the content may also be displayed at a second display option/surface at a second vertical surface 1186 on a side wall 1184. As disclosed above, in some embodiments, the user 1108 may be provided with display options to choose which display options to display the content (e.g., the first display option 2020 or the second vertical surface 1186) on based on the change of field of view of the user 1108.

In some embodiments, for example, a user may be watching content displayed directly in front of the user in a first field of view. The user may turn their head 90 degrees to the left and maintain a second field of view for about 30 seconds. The content that was displayed directly in front of the user in the first field of view may lazily follow the user to the second field of view by moving a first time by 30 degrees relative to the first field of view towards the second field of view to lazily follow the user after a certain time threshold has passed (e.g., 5 seconds). The AR system may move the content a second time by another 30 degrees to follow the user to the second field of view such that the content is now displayed only 30 degrees behind the second field of view.

Figure 20J:
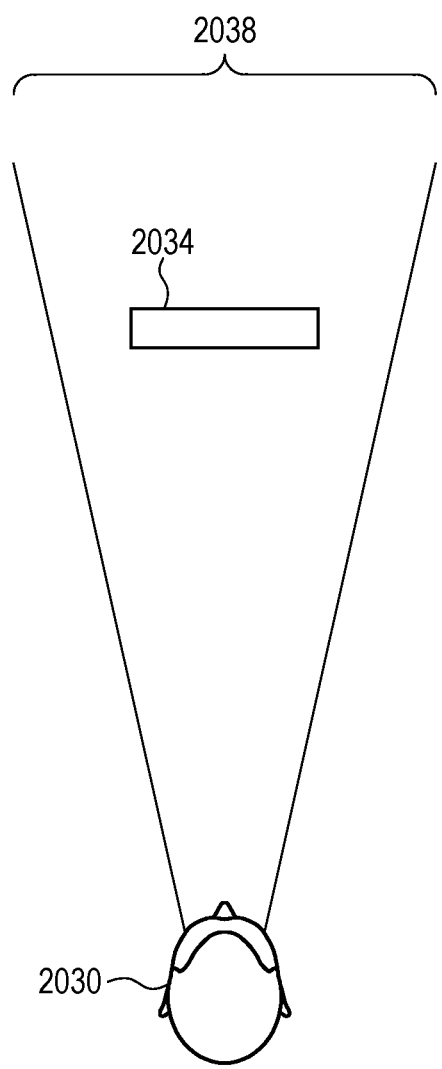
Figure 20K:
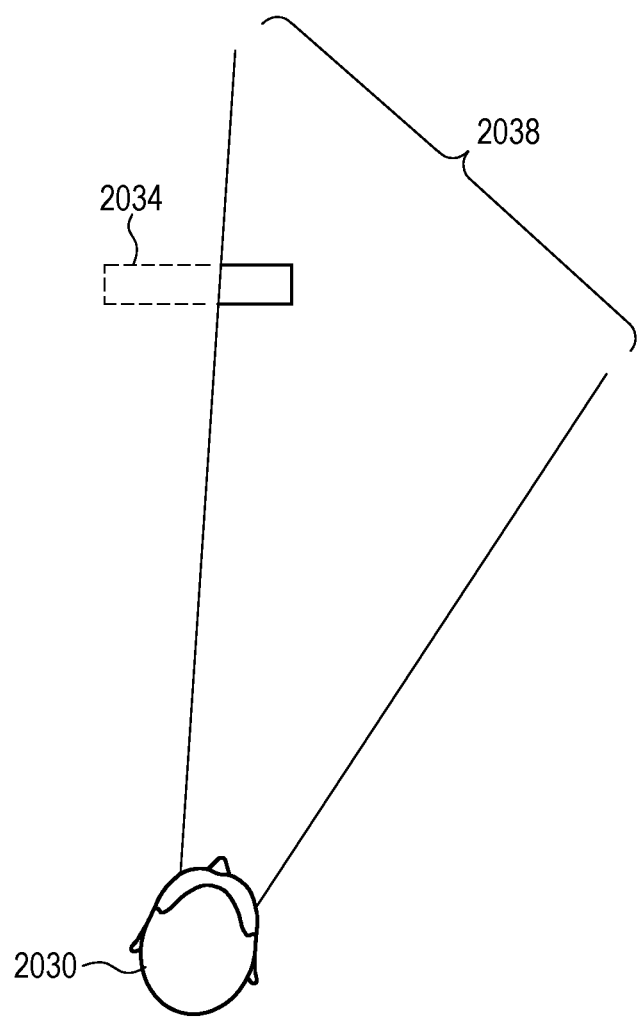

FIGS. 20J-20N illustrate content lazily following a user from a first field of view of the user and/or a device of the user to a second field of view, according to some embodiments. FIG. 20J illustrates a top view of a user 2030 viewing a content 2034 displayed on a surface (e.g., a virtual surface or an actual surface in a physical environment). The user 2030 is viewing the content 2034 such that the entire content 2034 is displayed directly in front of the user 2030 and completely within a first field of view 2038 of the user 2030 and/or a device in a first headpose position of the user and/or the device of the user. FIG. 20K illustrates a top view of the user 2030 rotating, as an example, approximately 45 degrees to the right (e.g., in a clockwise direction) with respect to the first headpose position illustrated in FIG. 20J. Portions of the content 2034 (e.g., as depicted by the dashed lines) are no longer within the field of view of user 2030 and/or the device while portions of the content 2034 (e.g., as depicted by the solid lines) are still being rendered/displayed to the user 2030.

Figure 20L:
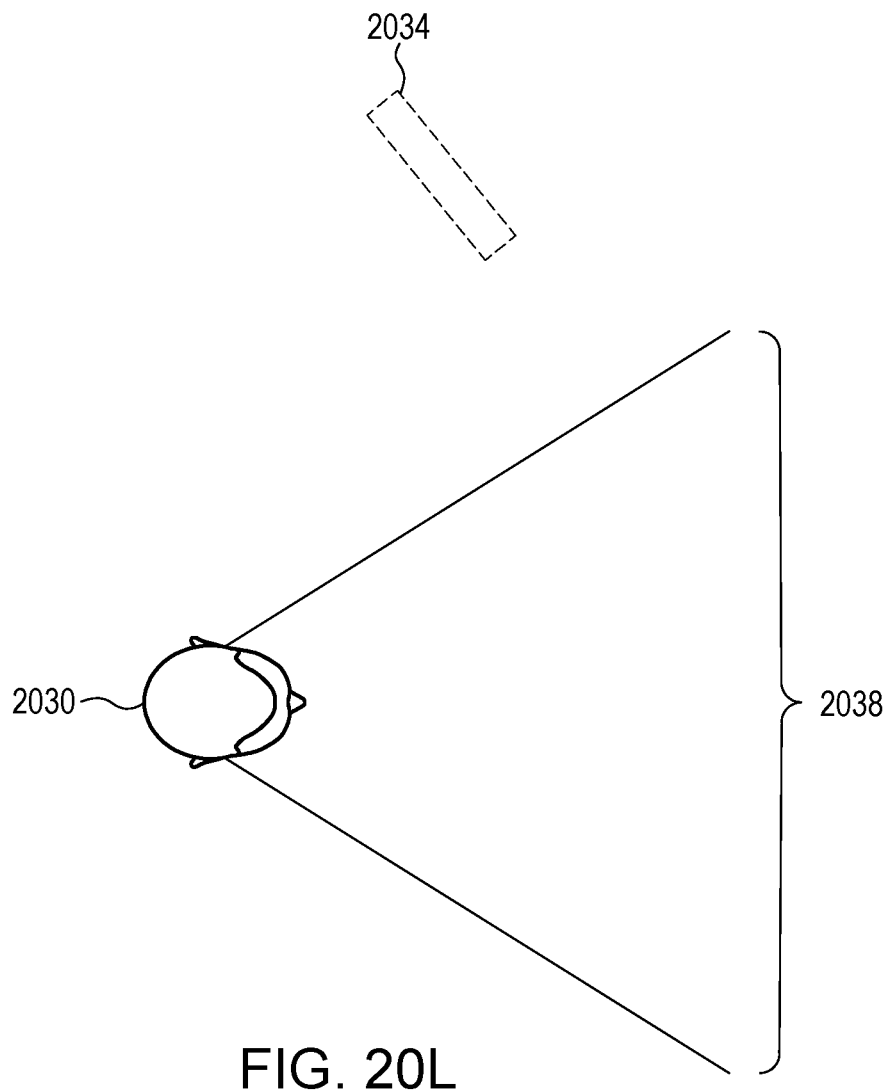

FIG. 20L illustrates a top view of the user 2030 at a completion of the rotation at a second headpose position 90 degrees to the right (e.g., in a clockwise direction) with respect to the first headpose position illustrated in FIG. 20J. The content 2034 is no longer visible to the user 2030 (e.g., as depicted by the dashed lines around the content 2034) because the content 2034 is completely outside of the field of view 2038 of the user 2030 and/or the device. Note, the content 2034 has also lazily moved. Lazily moved correlates to a latency as to when and by how much the content 2034 may move from its original position illustrated in FIG. 20J/20K to catch up to the second headpose position.

Figure 20M:
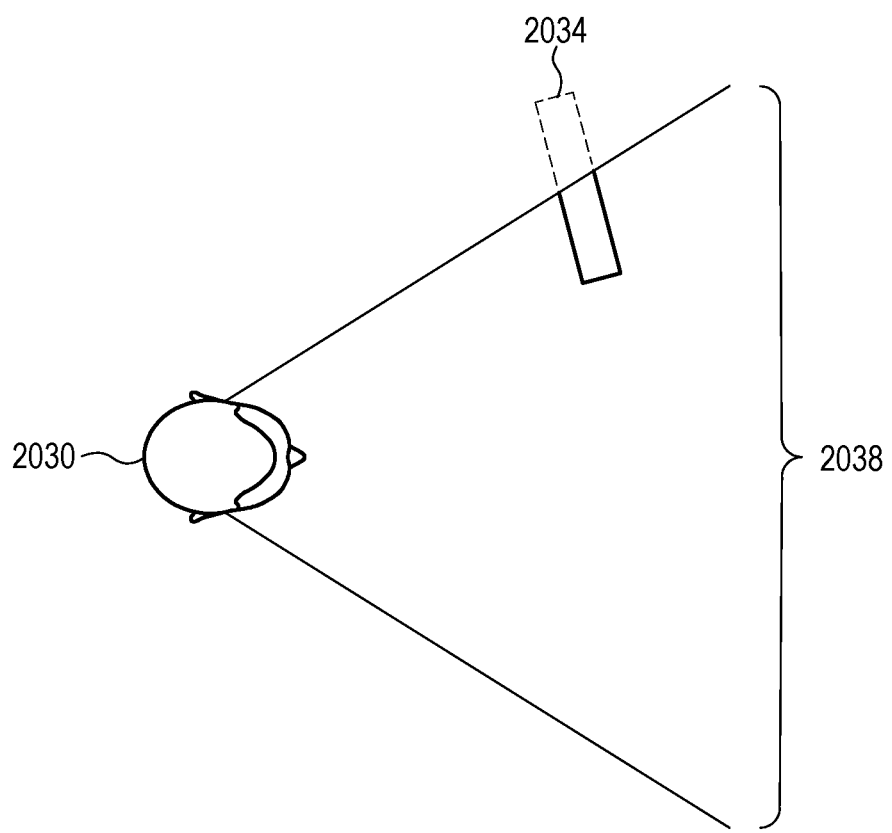
Figure 20N:
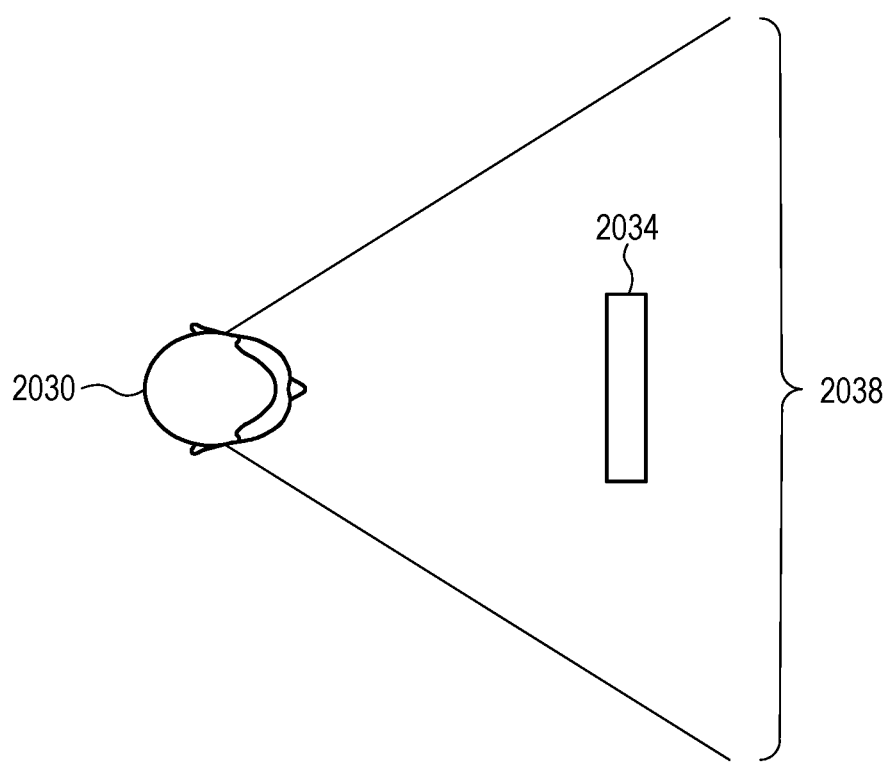
Figures 1, 20N:
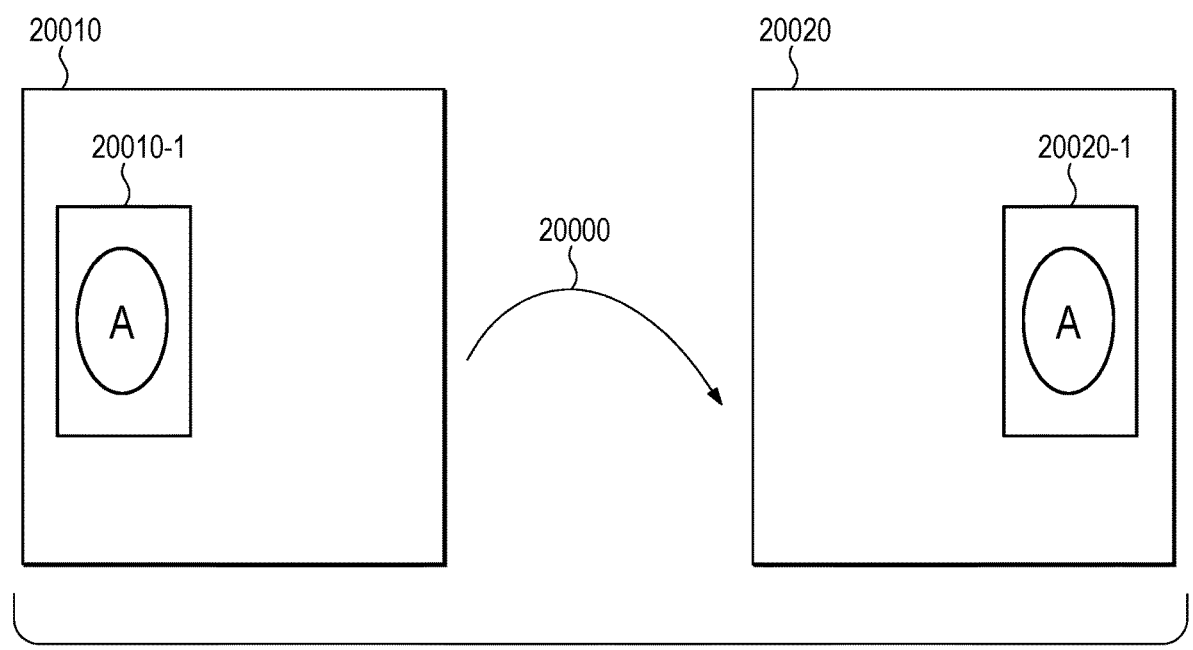

FIG. 20M illustrates the content 2034 has lazily moved to display at a new position such that a portion of the content 2034 is within the field of view 2038 (e.g., as depicted by the solid line encompassing a portion of the content 2034) of the user 2030 and/or the device at the second headpose position. FIG. 20N illustrates the content 2034 has completed its lazily move to fully catch up to the user's second headpose position. The content 2034 is completely within the field of view 2038 of the user 2030 and/or the device as indicated by the solid line encompassing the entire content 2034. One of ordinary skill in the art may appreciate that although a user may have changed the field of view from the first field of view to the second field of view that the content is no longer viewable from, the user may not want the content to be displayed directly in the second field of view. Instead, the user may want the content to slowly follow the user to the second field of view (e.g., new field of view) without being displayed directly in front of the user, until, for example, the system prompts the user to choose whether the user would like the content to be displayed directly in front of the user with respect to the second field of view of the user or to just leave the content displayed peripherally viewable to the user until the user reengages with the content displayed peripherally viewable to the user. In other words, in some embodiments, the displaying of the content/elements onto the one or more surfaces may be moved in response to a change to a field of view a user from a first field of view to a second field of view, wherein the content/elements lazily follow the change of the user's field of view from a first field of view to the second field of view. Furthermore, in some embodiments, the content may only move directly in front of the second field of view upon confirmation from received from the user to move the content directly in front of the second field of view.

In some embodiments, the speed of the content, such as content 2034, following the user's change in headpose position is 90% of the headpose speed; in some embodiments the speed of the follow is as low as 50%. Factors to consider in prescribing a follow speed may include the amount of change within a given time period; for example, if a user is quickly changing headpose back and forth, a follow speed may be 10% of the headpose speed so as not to similarly bounce back and forth haphazardly. In some embodiments, a rotational velocity dictates the speed of follow. Physiological limits preclude effective visual observation at certain saccade speeds (the speed at which the eyes move); in some embodiments the follow speed may be a first follow speed (such as 70% of headpose speed) if rotational velocity as measured by sensors like IMUs on a user device is below a first threshold, and a second follow speed (such as 50% or 90%) if rotational velocity as measured by sensors like IMUs on a user device is below a second threshold. In some embodiments, the follow speed is lower (e.g. 50%) if the rotational velocity is too high as the user cannot effectively view the content anyway and to save rendering cycles for non-observable content; in some embodiments, the follow speed is higher (e.g. 90%) so that when the headpose reaches a final position, the content is already close to the final position as it has closely tracked the use, and "catches up" with the user quicker to resume observation.

Figures 2, 20N:
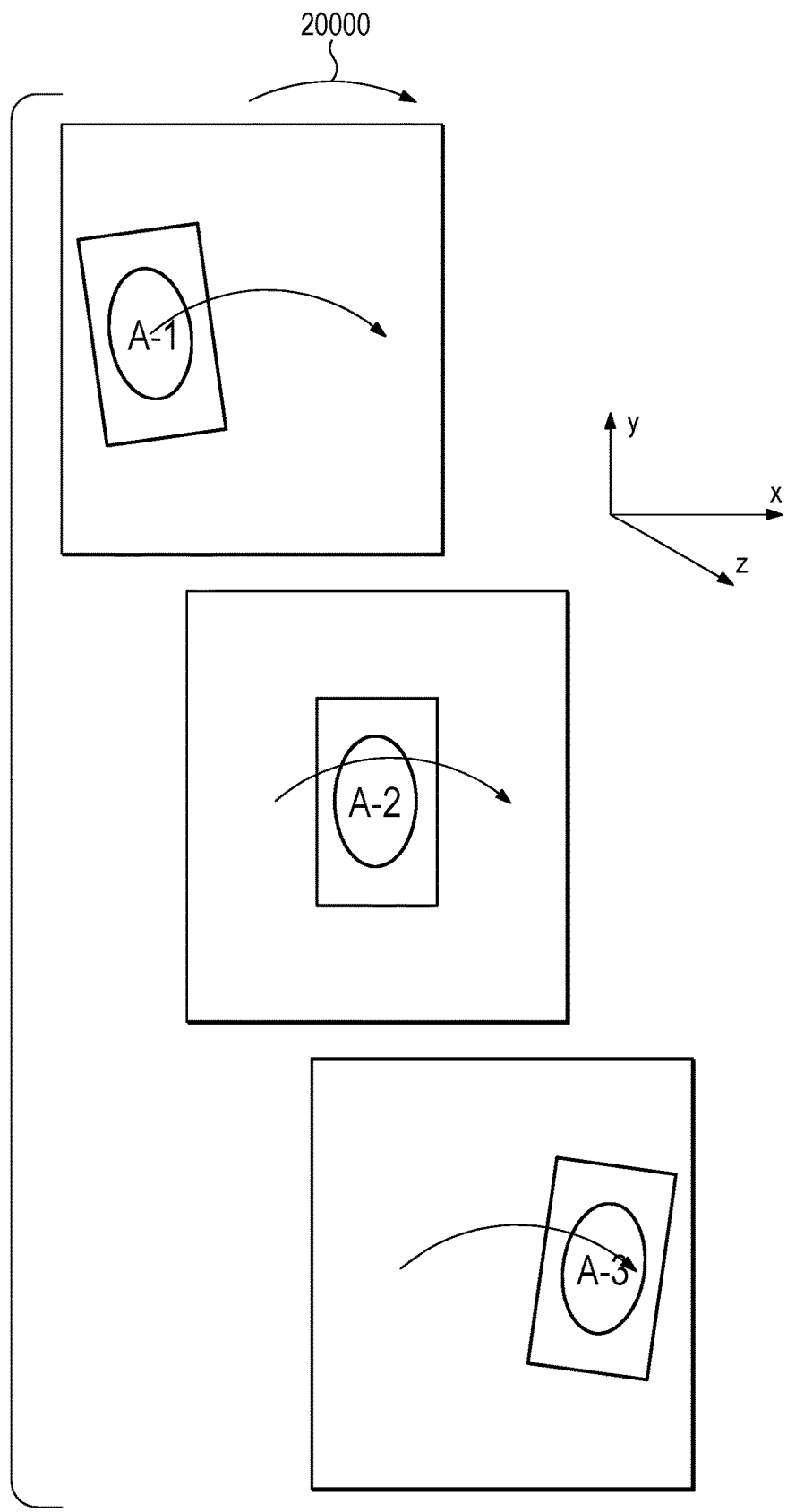

FIGS. 20N-1 and 20N-2 depict a modification of a follow protocol described above in FIGS. 20F-N. FIG. 20N-1 depicts a first field of view 20010 through a display with content 20010-1 disposed, for illustrative purposes only, on the left part of the field of view. In some embodiments, the content 20010-1 is in the center of field of view 20010. Upon a user moving an orientation to field of view 20020, content 20010-1 follows such change in orientation via path 20000 to 20020-1.

FIG. 20N-2 depicts content 20010-1 transition along path 20000 to 20020-1 in greater detail. In some embodiments, content 20010-1 (shown as A-1) is re-oriented within the field of view to a transition orientation based on the path

20000. For example, the re-orientation may be based on a speed that a user moves along path 20000 or the size of path 20000.

In some embodiments, the leading edge (as measured along movement of path 20000) of the content shifts further away in a z-direction from the user relative to the trailing edge and gradually returns to an even depth with the trailing edge at a position A-2 where the trailing edge begins to transition further away from the user relative to the user as A-3.

In some embodiments, the orientation shifts as described in FIGS. 20N-1 and 20N-2 are combined with those of the "lazy follow" of FIGS. 20F-N to create a "soft lock" effect of content following a user's orientation changes.

In some embodiments, a user may (a) view extracted content elements displayed to the user via the AR system and (b) interact with the extracted content elements. In some embodiments, the user may interact with the extracted content by making a purchase of items/services displayed within the extracted content. In some embodiments, similar to an online purchase made by a user interacting with a 2D webpage, the AR system may allow a user to interact with extracted content displayed on surfaces and/or virtual objects (e.g., Prisms or virtual display screens) within the AR system to make, as an example, electronic purchases of items and/or services presented within the extracted content displayed on the surfaces and/or virtual objects of the AR system.

In some embodiments, the user may interact with the extracted content element by further selecting items within the displayed content elements and placing the selected items on different surfaces within the user's physical environment and/or different virtual objects (e.g., Prism). For example, the user may extract a content element such as an image, video, and/or model from a gallery by, as an example, (a) targeting the content element in the gallery with a totem, (b) pressing a trigger on the totem to select the content element and hold for a period of time (e.g., about 1 second), (c) moving the totem around to a desired location in the physical environment of the user, and (d) pressing the trigger on the totem to place the content element at the desired location, wherein a copy of the content element is loaded and displayed at the desired location. In some embodiments, a preview of the content element is created and displayed as a result of the user selecting the content element and holding the trigger for a period of time as visual feedback, the preview of the content being created because creating a full resolution version of the content element for use in placement of the content element may be more resource intensive. In some embodiments, the content element in its entirety is copied/extracted and displayed for visual feedback as the user is placing the extracted content element in a desired location in the physical environment of the user.

Figure 20O:
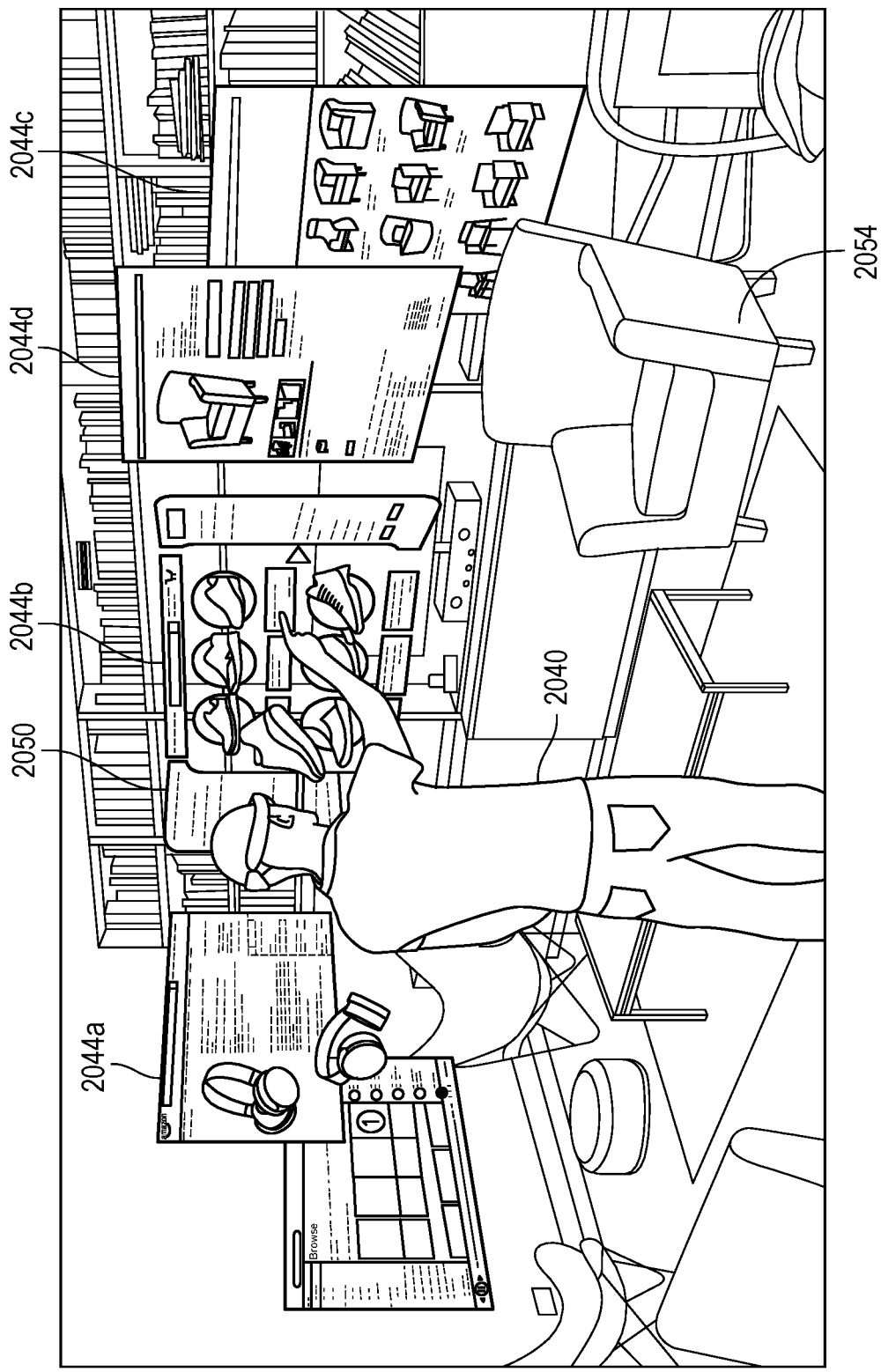

FIG. 20O illustrates an example of a user 2040 viewing extracted contents and interacting with the extracted contents 2050 and 2054. User 2040 may be viewing extracted contents 2044a-2044d on virtual display surfaces because the sensors 1162 was not able to detect suitable display surfaces for displaying the extracted content (e.g., because of the bookshelves). Instead, the extracted contents 2044a-d are displayed on a plurality of virtual display surfaces/screens. Extracted content 2044a is an online website selling an audio headphone. Extracted content 2044b is an online website selling athletic shoes. Extracted content 2044c/2044d is an online furniture website selling furniture. Extracted content 2044d may include a detailed view of a particular item (e.g., chair 2054) displayed from extracted content 2044c. User 2040 may interact with the extracted content by choosing a particular item from the displayed extracted content and placing the extracted item in the physical environment of the user (e.g., chair 2054). In some embodiments, user 2040 may interact with the extracted content by making a purchase of the particular item displayed in the extracted content (e.g., athletic shoes 2050).

As depicted in FIG. 20O, a first content display may spur the display of additional extracted content. In some embodiments, extracted content 2044c initially displays, and then the related content within 2044c may further display in proximity, such as the cascading view of related extracted content 2044d, without the user explicitly opening a separate window to display such content. In other words, the extracted content 2044c may display, and active content within 2044c, such as links or images, may display in spatial relation to the extracted content 2044c. In some embodiments, related extracted content (e.g., the related extracted content 2044d) is displayed on a virtual surface and is given a proxy attribute profile that imposes at least one attribute of the extracted content 2044c into the attributes of the related extracted content 2044d. For example, the related extracted content 2044d may be given a common orientation as the extracted content 2044c, as opposed to being parsed to its own surface or virtual surface orientation. In some embodiments, the related extracted content 2044d is parsed and matched based on its own attributes, independent of the attributes of the extracted content 2044c.

In some embodiments, display of related content with respect to initial content is automatic, and only continues to a first layer of relation (meaning the related content is only that which appears in the initial content). In some embodiments, the related content may be displayed with a common attribute of the initial content or may be displayed with its own parsed and matched attributes. In some embodiments, the display of related content includes additional layers, such as a display of content related to the related content; such additional layers may be displayed with a common attribute of the initial content or of the first related content, or may be displayed with its own parsed and matched attributes. In some embodiments, the additional layers removed from the initial content may be reflected in a relation attribute. A relation attribute may cause the display of that content to scale to a size corresponding to the inverse of the layer (e.g., content that is three layers removed from the initial content may be displayed as one third the size of the initial content). A relation attribute may cause a positional relationship, such that each layer of related content is rendered and displayed at a certain relative position from the initial content in an x, y, or z dimension to show attenuation of that related content from the initial content.

In some embodiments, the display of related content is persistent with the display of the initial content, or may only appear if the user selects a preview function or directs attention to the initial content (such as by headpose, eye gaze, hand gesture, and/or controller orientation).

Figure 21:
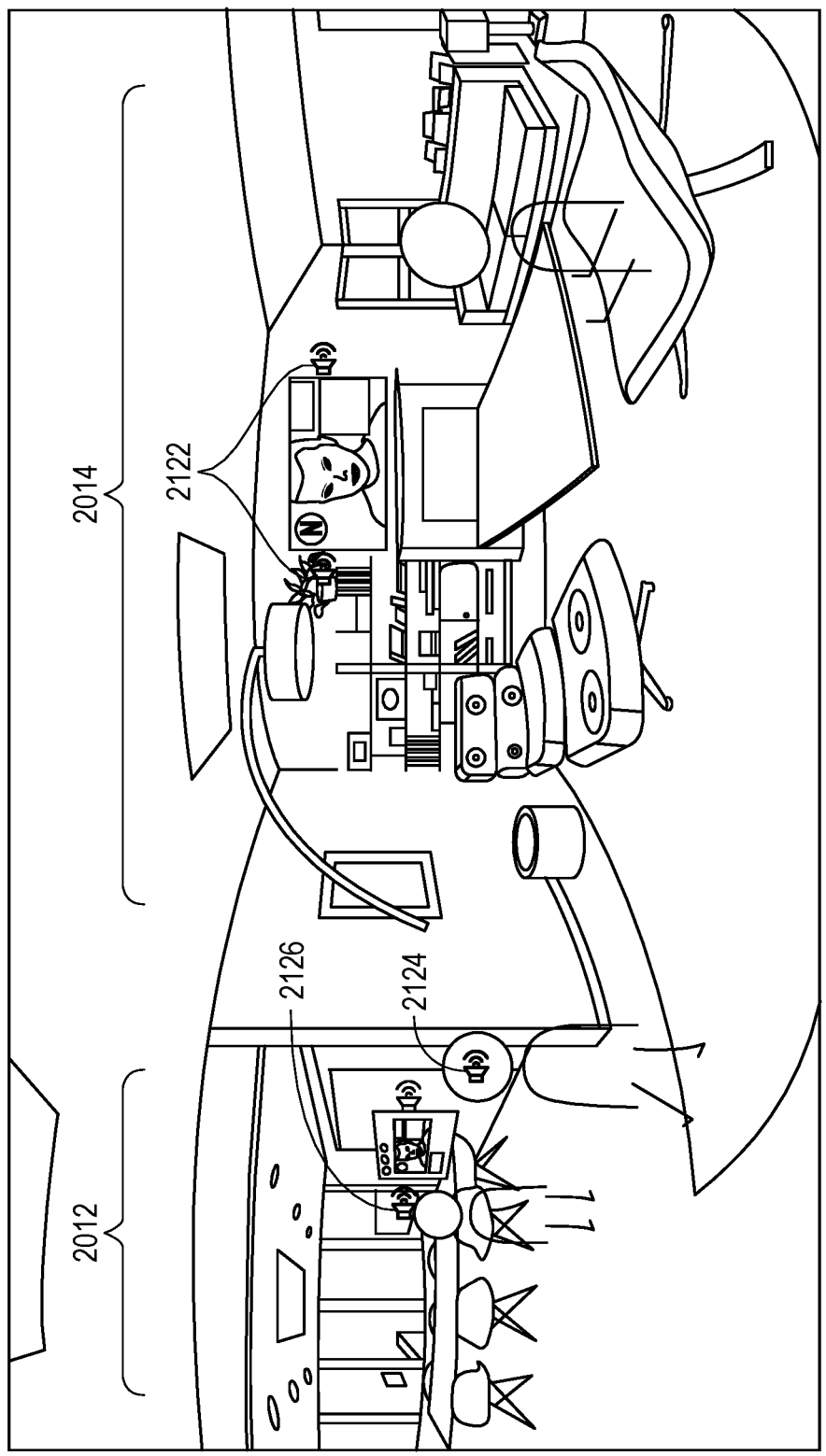
FIG. 21 illustrates audio transitions during environment changes, according to some embodiments.

FIG. 21 illustrates audio transitions during such environment changes. Active content in room 2014 may have virtual speakers 2122 delivering, for example, spatialized audio to the user from a location associated with the content element in room 2014. As the user transitions to room 2012, the virtual speakers may follow the user by positioning and directing audio to virtual speakers 2124 in the center of the user's head (much the same way as conventional headphones), and ceasing audio play from the virtual speakers 2122. As the environment compositing process 140 matches the content element to a surface in room 2012, audio output may shift from the virtual speakers 2124 to virtual speakers 2126. Audio output in this case maintains constant consumption of the content element, at least the audio output component, during the environment transition. In some embodiments, the audio component is always a virtual speaker in the center of the user's head, obviating the need to adjust the position of spatialized audio virtual speakers.

System Architecture Overview

Figure 22:
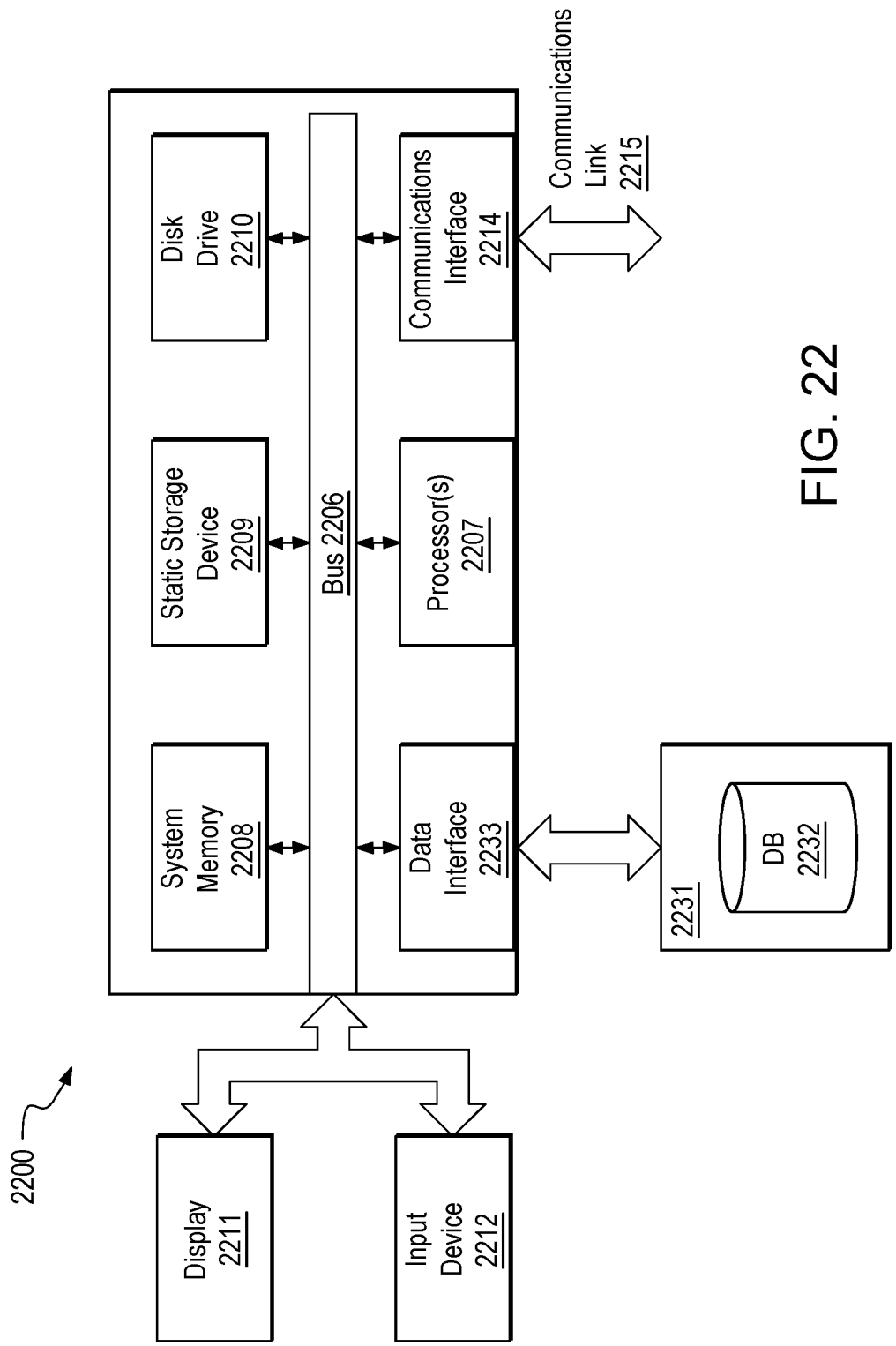
FIG. 22 is a block diagram of an illustrative computing system suitable for implementing an embodiment of the present disclosure.

FIG. 22 is a block diagram of an illustrative computing system 2200 suitable for implementing an embodiment of the present disclosure. The computing system 2200 includes a bus 2206 or other communication mechanism for communicating information, which interconnects subsystems and devices, such as a processor 2207, system memory 2208 (e.g., RAM), a static storage device 2209 (e.g., ROM), a disk drive 2210 (e.g., magnetic or optical), a communications interface 2214 (e.g., modem or Ethernet card), a display 2211 (e.g., CRT or LCD), an input device 2212 (e.g., keyboard and mouse).

According to one embodiment of the disclosure, the computing system 2200 performs specific operations by the processor 2207 executing one or more sequences of one or more instructions contained in the system memory 2208. Such instructions may be read into the system memory 2208 from another computer readable/usable medium, such as the static storage device 2209 or the disk drive 2210. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to the processor 2207 for execution. Such a medium may take many forms, including but not limited to, non-volatile media and volatile media. Non-volatile media includes, for example, optical or magnetic disks, such as the disk drive 2210. Volatile media includes dynamic memory, such as the system memory 2208.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computing system 2200. According to other embodiments of the disclosure, two or more computing systems 2200 coupled by a communications link 2215 (e.g., LAN, PTSN, or wireless network) may perform the sequence of instructions required to practice the disclosure in coordination with one another.

The computing system 2200 may transmit and receive messages, data, and instructions, including program (i.e., application code) through the communications link 2215 and the communications interface 2214. Received program code may be executed by the processor 2207 as it is received, and/or stored in the disk drive 2210, or other non-volatile storage for later execution. The computing system 2200 may communicate through a data interface 2233 to a database 2232 on an external storage device 2231.

Figure 23:
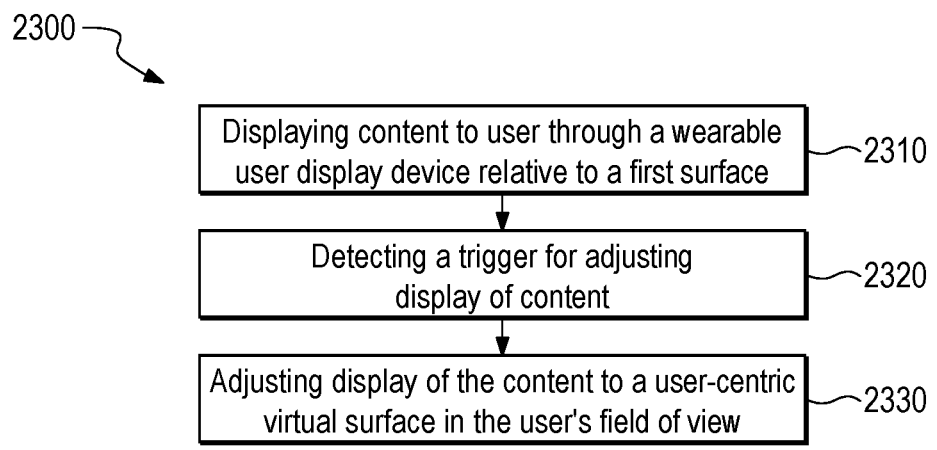
FIG. 23 is a flow diagram illustrating a method for displaying content to a user transitioning between surfaces.

FIG. 23 depicts a method 2300 for adjusting display of content to a user field of view centric mode, according to some embodiments. The method 2300 begins at 2310 with content being displayed to a user on a first surface. Such first surface may be a virtual surface or physical surface. At 2320 a system detects a triggering event to adjust content. In some embodiments, the triggering event is motion of the user or a user device. As the user moves, sensors (e.g., the sensors 162) of the system described herein detects motion at 2320, either as persistent or continuous motion in a translation or rotational direction in a certain duration or as at least one amplitude fluctuation within a duration. In some embodiments the trigger is content driven and provided by an attribute of the content. Subsequent to detection of the trigger, at 2330 the display of the content is adjusted to a user-centric virtual surface within the user's field of view.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method, comprising:
    displaying, by a wearable display device, a representation of a virtual content within a first field of view of a user at a first position or in a first pose;
    detecting a change for a temporal period from the first position or the first pose of the user to a second position or a second pose of the user, the change resulting in a view change from the first field of view to a second field of view of the user; and
    continuing the representation of the virtual content to the user at the second position or in the second pose in response to the change in the first position or the first pose of the user;
    determining whether to display the virtual content in the second field of view on a physical surface in an environment where the user is located or on a virtual surface for the second field of view;
    identifying a first number of surfaces for the first field of view;
    identifying a second number of surfaces for the second field of view; and
    determining a number of display options as an interactive element for displaying the virtual content to the user.

2. The method of claim 1, the set of acts further comprising:
    receiving an instruction that corresponds to a selection of a display option from the number of display options; and
    rendering the virtual content within the second field of view to the user based at least in part upon the selection of the display option.

3. The method of claim 2, the set of acts further comprising displaying the number of display options as a graphic element within the second field of view of the user.

4. The method of claim 1, further comprising:
identifying an image captured by the wearable display device for a portion of the environment pertaining to the second field of view;
determining a set of points from the image;
reconstructing a set of connected points among the set of points;
creating a virtual mesh representing the portion of the environment based at least in part upon the set of connected points; and
determining one or more surfaces in the portion of the environment using plane extraction or analysis based at least in part upon one or more properties of the virtual mesh.

5. The method of claim 4, further comprising:
determining pose data pertaining to a pose or a rate of change of the first or the second pose of the user based at least in part upon inertial data of the wearable display device or the image;
associating the one or more surfaces with one or more respective surface attributes based at least in part upon the pose data;
identifying one or more content elements in the virtual content; and
matching the one or more content elements to at least one of the one or more surfaces based at least in part upon the one or more respective surface attributes and one or more content attributes of virtual content or the one or more content elements.

6. The method of claim 5, matching the one or more content elements to at least one surface of the one or more surfaces further comprising:
determining whether a content element of the one or more content elements includes a hint for displaying the content element;
determining whether to use the hint or a set of rules to match or map the one or more content elements to the at least one surface;
analyzing the hint and one or more candidate surfaces in a logical structure based at least in part upon the one or more content elements;
determining a candidate surface in the logical structure as the at least one surface for the one or more content elements; and
storing a matching result pertaining to the at least one surface and the one or more content elements.

7. The method of claim 5, matching the one or more content elements to at least one surface of the one or more surfaces further comprising:
determining the one or more content elements at least by performing a content structurization process;
determining a priority respectively pertaining to the one or more content elements;
ordering the one or more content elements based at least in part upon the priority;
determining a matching score for a pair of a content element and a surface based at least in part upon a result of comparing multiple content element attributes of the content element to at least one surface attribute of the surface;
determining a respective aggregate matching score for each of a plurality of combinations of at least one content element of the one or more content elements and at least one candidate surface of the one or more surfaces; and
determining the at least one surface from the one or more surfaces based at least in part upon aggregate matching scores.

8. The method of claim 7, matching the one or more content elements to at least one surface of the one or more surfaces further comprising:
determining whether to display the virtual content in the second field of view on the physical surface in the environment in which the user is located or on the virtual surface for the second field of view based at least in part upon the respective aggregate matching score; and
resolving one or more conflicts among mapping between the one or more content elements and the one or more surfaces.

9. The method of claim 1, displaying the virtual content comprising:
in response to receipt of an instruction to adjust the representation in response to the change detected, determining at least a portion of the virtual content within the first field of view;
handing off the at least the portion of the virtual content from the first field of view to the second field of view to continue the representation of the at least the portion of the virtual content within the second field of view; and
modifying a state of at least the representation of the virtual content within the first field of view based at least in part upon continuing the at least the portion of the virtual content in the second field of view.

10. The method of claim 9, displaying the virtual content further comprising:
modifying the state comprising altering a frame rate of the representation of the at least the portion of the virtual content within the first field of view into an altered frame rate, wherein altering the frame rate comprises pausing or ceasing the representation of the at least the portion of the virtual content within the first field of view.

11. A computer program product comprising a non-transitory computer readable medium having stored thereupon a sequence of instructions which, when executed by a microprocessor, causes the microprocessor to perform a set of acts, the set of acts comprising:
displaying, by a wearable display device, a representation of a virtual content within a first field of view of a user at a first position or in a first pose;
detecting a change from the first position or the first pose of the user to a second position or a second pose of the user, the change resulting in a view change from the first field of view to a second field of view of the user;
continuing the representation of the virtual content to the user at the second position or in the second pose in response to the change in the first position or the first pose of the user;
determining whether to display the virtual content in the second field of view on a physical surface in an environment in which the user is located or on a virtual surface for the second field of view;
identifying a first number of surfaces for the first field of view;
identifying a second number of surfaces for the second field of view; and
determining a number of display options as an interactive element for displaying the virtual content to the user.

12. The computer program product of claim 11, the set of acts further comprising:

receiving an instruction that corresponds to a selection of a display option from the number of display options; and rendering the virtual content to the user based at least in part upon the selection of the display option.

13. The computer program product of claim 12, wherein the number of display options is determined based at least in part upon both the first number and the second number, and the number of display options is determined based at least in part upon only the first number but not the second number.

14. The computer program product of claim 12, the set of acts further comprising:

determining whether the display option selected corresponds to the first field of view or the second field of view;

when the display option corresponds to the first field of view while the user has the second field of view, displaying to the user a graphic or textual indication for navigating back to the first field of view;

determining a recommended surface from the second number of surfaces for the second field of view; and providing the user with an option that moves the virtual content from the first field of view to the second field of view, wherein the user has a second pose at the second location, and a pose change between the first pose and the second pose is greater than a pose change threshold.

15. The computer program product of claim 14, the set of acts further comprising:

altering a color of at least a portion of the recommended surface based at least in part upon a display attribute of the virtual content, wherein the recommended surface comprises the physical surface, and altering the color comprises generating a virtual surface portion for the at least the portion of the recommended surface;

determining a content color schema for the virtual content;

determining a real-world color schema for the environment having at least the recommended surface; and adjusting the content color schema based at least in part upon a readability index attribute of at least a portion of the virtual content and the real-world color schema.

16. The computer program product of claim 12, the set of acts further comprising:

determining the recommended surface based at least in part upon a surface type attribute associated with at least a portion of the virtual content; and displaying a remaining portion of the virtual content on the recommended surface without displaying the at least the portion of the virtual content on the recommended surface when a type of the recommended surface does not satisfy the surface type attribute associated with the at least the portion of the virtual content.

17. A system for displaying virtual content to a user, comprising:

a wearable display device that displays virtual content;

a processor;

a memory for holding programmable code executable by the processor, wherein the programmable code includes instructions which, when executed by the processor, cause the processor to perform a set of acts, the set of acts comprising:

displaying, by a wearable display device, a representation of a virtual content within a first field of view of a user at a first position or in a first pose;

detecting a change for a temporal period from the first position or the first pose of the user to a second position or a second pose of the user, the change resulting in a view change from the first field of view to a second field of view of the user; and continuing the representation of the virtual content to the user at the second position or in the second pose in response to the change in the first position or the first pose of the user;

determining whether to display the virtual content in the second field of view on a physical surface in an environment where the user is located or on a virtual surface for the second field of view;

identifying a first number of surfaces for the first field of view;

identifying a second number of surfaces for the second field of view; and determining a number of display options as an interactive element for displaying the virtual content to the user.

18. The system of claim 17, the set of acts further comprising:

receiving an instruction that corresponds to a selection of a display option from the number of display options; and rendering the virtual content to the user based at least in part upon the selection of the display option.

19. The system of claim 17, the set of acts further comprising:

identifying an image captured by the wearable display device for a portion of the environment pertaining to the second field of view;

determining a set of points from the image;

reconstructing a set of connected points among the set of points;

creating a virtual mesh representing the portion of the environment based at least in part upon the set of connected points; and determining one or more surfaces in the portion of the environment using plane extraction or analysis based at least in part upon one or more properties of the virtual mesh.

20. The system of claim 17, the set of acts further comprising:

in response to receipt of an instruction to adjust the representation in response to the change detected, determining at least a portion of the virtual content within the first field of view;

handing off the at least the portion of the virtual content from the first field of view to the second field of view to continue the representation of the at least the portion of the virtual content within the second field of view;

modifying a state of at least the representation of the virtual content within the first field of view based at least in part upon continuing the at least the portion of the virtual content in the second field of view; and modifying the state comprising altering a frame rate of the representation of the at least the portion of the virtual content within the first field of view into an altered frame rate, wherein altering the frame rate comprises pausing or ceasing the representation of the at least the portion of the virtual content within the first field of view.

* * * * *